(12) United States Patent
Eberle et al.

(10) Patent No.: US 7,508,936 B2
(45) Date of Patent: Mar. 24, 2009

(54) HARDWARE ACCELERATOR FOR ELLIPTIC CURVE CRYPTOGRAPHY

(75) Inventors: Hans Eberle, Mountain View, CA (US); Nils Gura, San Carlos, CA (US); Daniel Finchelstein, Toronto (CA); Sheueling Chang-Shantz, Cupertino, CA (US); Vipul Gupta, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 884 days.

(21) Appl. No.: 10/387,007

(22) Filed: Mar. 11, 2003

(65) Prior Publication Data
US 2003/0206629 A1 Nov. 6, 2003

Related U.S. Application Data

(60) Provisional application No. 60/426,783, filed on Nov. 15, 2002, provisional application No. 60/400,223, filed on Aug. 1, 2002, provisional application No. 60/389,135, filed on Jun. 14, 2002, provisional application No. 60/379,316, filed on May 10, 2002, provisional application No. 60/376,742, filed on May 1, 2002.

(51) Int. Cl.
| H04L 9/00 | (2006.01) |
| H04L 9/32 | (2006.01) |
| H04L 9/30 | (2006.01) |
| H04L 9/28 | (2006.01) |
| G06F 1/02 | (2006.01) |
| G06F 7/38 | (2006.01) |

(52) U.S. Cl. .................. 380/30; 380/28; 708/270; 708/490; 708/491; 708/492

(58) Field of Classification Search ......... 708/490–492, 708/270; 380/30, 28
See application file for complete search history.

(56) References Cited

U.S. PATENT DOCUMENTS
4,852,098 A * 7/1989 Brechard et al. ............ 714/782
(Continued)

FOREIGN PATENT DOCUMENTS
EP 0247383 12/1987

OTHER PUBLICATIONS

Blake-Wilson, S., "Additional ECC Groups for IKE", IPSec Blake-Wilson, Dierks, Hawk—Working Group, Jul. 23, 2002, pp. 1-17.
(Continued)

*Primary Examiner*—Syed A. Zia
*Assistant Examiner*—Trang Doan
(74) *Attorney, Agent, or Firm*—Robert C. Kowert; Meyertons, Hood, Kivlin, Kowert & Goetzel, PC

(57) ABSTRACT

An elliptic curve processing apparatus that performs operations on elliptic curves specified over binary polynomial fields includes a functional unit that has a digit serial multiplier with a digit size of at least two bits. The elliptic curve processing apparatus performs reduction for respective generic curves using arbitrary irreducible polynomials, which correspond to respective ones of the generic curves. The elliptic curve processing apparatus may include hardwired reduction circuits in the functional unit for use with respective named curves. A storage location in the elliptic curve processing apparatus may be used to specify whether an operation is for one of the named curves or for one of the generic curves. The elliptic curve processing apparatus responds to an arithmetic instruction to utilize a respective one of the hardwired reduction circuits for reduction for respective named curves and a multiplier circuit for reduction for a plurality of generic curves, the multiplier coupled to perform reduction for respective generic curves using arbitrary irreducible polynomials, the arbitrary irreducible polynomials corresponding to respective ones of the generic curves. The elliptic curve processing apparatus operable on elliptic curves specified over binary polynomial fields performs a conditional branch according to whether a curve being processed is a generic curve or a named curve.

53 Claims, 39 Drawing Sheets

| Register | Meaning | Size |
|---|---|---|
| R0..R7 | general - purpose registers | 256 bits |
| RM | irreducible polynomial | 256 bits |
| RC | configuration register<br>nc: named curve RC[7..0]<br>m: field degree RC[16..8] | 17 bits |
| CC | condition code<br>MZ: MSB is zero<br>EQ: result is equal zero<br>NC: named curve | 1 bit<br>1 bit<br>1 bit |

U.S. PATENT DOCUMENTS

| | | | |
|---|---|---|---|
| 5,121,431 | A | 6/1992 | Wiener |
| 5,210,710 | A | 5/1993 | Omura |
| 5,347,481 | A * | 9/1994 | Williams ............... 708/503 |
| 5,351,297 | A * | 9/1994 | Miyaji et al. ............ 380/28 |
| 5,442,707 | A * | 8/1995 | Miyaji et al. ............ 380/30 |
| 5,497,423 | A * | 3/1996 | Miyaji .................... 380/30 |
| 5,627,893 | A * | 5/1997 | Demytko ................ 380/30 |
| 6,049,815 | A | 4/2000 | Lambert et al. |
| 6,199,087 | B1 | 3/2001 | Blake et al. |
| 6,446,205 | B1 * | 9/2002 | Lenstra ................. 713/168 |
| 6,633,896 | B1 | 10/2003 | Moore |
| 6,748,410 | B1 | 6/2004 | Gressel et al. |
| 6,766,345 | B2 * | 7/2004 | Stein et al. ............ 708/492 |
| 6,820,105 | B2 | 11/2004 | Blaker |
| 7,181,484 | B2 | 2/2007 | Stribaek et al. |
| 2001/0054053 | A1 * | 12/2001 | Lambert et al. ....... 708/492 |
| 2002/0018560 | A1 * | 2/2002 | Lauter et al. ........... 380/28 |
| 2002/0044649 | A1 * | 4/2002 | Gallant et al. .......... 380/30 |
| 2002/0103843 | A1 | 8/2002 | McGregor et al. |
| 2003/0123654 | A1 * | 7/2003 | Lambert ................. 380/28 |
| 2003/0123655 | A1 | 7/2003 | Lambert et al. |
| 2003/0206628 | A1 | 11/2003 | Gura et al. |
| 2004/0158597 | A1 * | 8/2004 | Ye et al. ................ 708/492 |

OTHER PUBLICATIONS

Gupta, V., "ECC Cipher Suites for TLS", Blake-Wilson, Dierks, Hawk—TLS Working Group, 'Aug. 2002, pp. 1-31.
Standards for Efficient Cryptography, "SEC 2: Recommended Elliptic Curve Domain Parameters", Certicom Research, Sep. 20, 2000, pp. i-45.
"RFC 2246 on the TLS Protocol Version 1.0", http://www.ietf.org/mail-archive/ietf-announce/Current/msg02896.html, Mar. 26, 2003, 2 pages, including Dierks, T., "The TLS Protocol Version 1.0", Dierks & Allen, Jan. 1999, pp. 1-80.
Song, Leilei and Parhi, Keshab K., "Low-Energy Digit-Serial/Parallel Finite Field Multipliers", Journal of VLSI Signal Processing 19, 1988, pp. 149-166.
Agnew, G.B., et al., An Implementation of Elliptic Curve Cryptosystems Over $F_2^{155}$, IEEE Journal on Selected Areas in Communications, vol. 11, No. 5, Jun. 1993, pp. 804-813.
Halbutogullari, A. and Koc, Cetin K., "Mastrovito Multiplier for General Irreducible Polynomials", IEEE Transactions on Computers, vol. 49, No. 5, May 2000, pp. 503-518.
Yanik, T., et al., "Incomplete reduction in modular arithmetic", IEE Proc.-Comput. Digit. Tech., vol. 149, No. 2, Mar. 2002, pp. 46-52.
Blum, Thomas and Paar, Christof, "High-Radix Montgomery Modular Exponentiation on Reconfigurable Hardware", IEEE Transactions on Computers, vol. 50, No. 7, Jul. 2001, pp. 759-764.
Gao, L.; Shrivastava, S.; Lee, H.; Sobelman, G., A Compact Fast Variable Key Size Elliptic Curve Cryptosystem Coprocessor, Proceedings of the Seventh Annual IEEE Symposium on Field-Programmable Custom Computing Machines, 1998.
Ernst, M.; Klupsch, S.; Hauck, O.; Huss, S.A., Rapid Prototyping for Hardware Accelerated Elliptic Curve Public-Key Cryptosystems, 12th IEEE Workshop on Rapid System Prototyping, Monterey, CA, Jun. 2001; pp. 24-29.
Orlando, G.; Paar, C., Aug. 2000, A High-Performance Reconfigurable Elliptic Curve Processor for GF($2^m$), CHES 2000 Workshop on Cryptographic Hardware and Embedded Systems, Springer-Verlag, Lecture Notes in Computer Science 1965; pp. 41-56.
Lopez, J.; Dahab, R., Aug. 1999, Fast Multiplication on Elliptic Curves over GF($2^m$) without Precomputation, CHES '99 Workshop on Cryptographic Hardware and Embedded Systems, Springer-Verlag, Lecture Notes in Computer Science 1717; pp. 316-327.
Hankerson, D.; Hernandez, J.L.; Menezes, A., Aug. 2000, Software Implementation of Elliptic Curve Cryptography over Binary Fields, CHES '2000 Workshop on Cryptographic Hardware and Embedded Systems, Springer-Verlag, Lecture Notes in Computer Science 1965; pp. 1-24.

Koblitz, Neal, "Elliptic Curve Cryptosystems", Mathematics of Computation, vol. 48, No. 177, Jan. 1987, pp. 203-209.
Schroeppel, R.; Orman, H.; O'Malley, S., 1995, Fast Key Exchange with Elliptic Curve Systems, Advances in Cryptography, Crypto '95, Springer-Verlag, Lecture Notes in Computer Science 963; pp. 43-56.
Woodbury, A.D.; Bailey, D. V.; Paar, C., Sep. 2000, Elliptic Curve Cryptography on Smart Cards Without Coprocessors, The Fourth Smart Card Research and Advanced Applications (CARDIS2000) Conference, Bristol, UK; pp. 71-92.
Miller, V., Use of Elliptic Curves of Cryptography, In Lecture Notes in Computer Science 218; Advances in Crytology—CRYPTO '85, pp. 417-426, Springer-Verlag, Berlin, 1986.
Itoh, Toshiya and Tsujii, Shigeo, "A Fast Algorithm for Computing Multiplicative Inverses in GF($2^m$) Using Normal Bases", Information and Computation vol. 78, No. 3, 1988, pp. 171-177.
Bednara, M., et al., "Reconfigurable Implementation of Elliptic Curve Crypto Algorithms", Proceedings of the International Parallel and Distributed Processing Symposium, IEEE Computer Society, 2002, 8 pages.
U.S. Department of Commerce/National Institute of Standards and Technology, "Digital Signature Standard (DSS)", Federal Information Processing Standards Publication, Jan. 27, 2000, pp. 1-74.
Blake-Wilson, Simon et al., "ECC Cipher Suites for TLS", Blake-Wilson, Dierks, Hawk—TLS Working Group March 15, 2001, pp. 1-22.
Goodman, James, "An Energy-Efficient Reconfigurable Public-Key Cryptography Processor", IEEE Journal of Solid-State Circuits, vol. 36, No. 11, Nov. 2001, pp. 1808-1820.
Shantz, Sheueling Chang, "From Euclid's GCD to Montgomery Multiplication to the Great Divide", Sun Microsystems, Jun. 2001, pp. 1-10.
Blake, Ian; Seroussi, Gadiel; & Smart, Nigel, Elliptic Curves in Cryptography, London Mathematical Society Lecture Note Series 265, Cambridge University Press, United Kingdom, 1999; pp. vii-204.
U.S. Appl. No. 10/387,009, entitled "Modular Multiplier".
U.S. Appl. No. 10/387,104, entitled "Generic Implementations of Elliptic Curve Cryptography Using Partial Reduction".
U.S. Appl. No. 10/387,008, entitled "Generic Modular Multiplier Using Partial Reduction".
Alekseev, V. B., "From the Karatsuba Method for Fast Multiplication of Numbers to Fast Algorithms for Discrete Functions," Proceedings of the Steklov Institute of Mathematics, vol. 218, 1997, pp. 15-22.
Guajardo, Jorge, and Paar, Christof, "Efficient Algorithms for Elliptic Curve Cryptosystems," ECE Department, Worcester Polytechnic Institute, 100 Institute Road, Worcester, MA 01609, USA, pp. 1-16 (CRYPTO '97, Springer-Verlag, LNCS 1294, pp. 342-356, 1997).
Weimerskirch, André and Paar, Christof, "Generalizations of the Karatsuba Algorithm for Polynomial Multiplication," Communication Security Group, Department of Electrical Engineering & Information Sciences, Ruhr-Universität Bochum, Germany; submitted to Design, Codes and Cryptography, Mar. 2002, pp. 1-23.
Yvonne Hitchcock, et al., "Implementing an Efficient Elliptic Curve Cryptosystem over GF(p) on a Smart Card," Anziam J. 44(E), Apr. 2003, pp. C354-C377.
Koc, Cetin Kaya, "High-Speed RSA Implementaion," Version 2.0, RSA Laboratories, Nov. 1994, pp. i-70.
National Institute of Standards and Technology, "Recommended Elliptic Curves for Federal Government Use," Aug. 1999, 43 pages.
Hasegawa, et al., "A Practical Implementaion of Elliptic Curve Cryptosystems over GF(p) on a 16-Bit Microcomputer," In Public Key Cryptography PKC, '98, vol. 1431 of Lecture Notes in Computer Science.
Woodbury, et al., Sep. 2000, "Elliptic Curve Cryptography on Smart Cards Without Coprocessors," The Fourth Smart Card Research and Advanced Applications (CARDIS2000) Conference, Bristol, UK, pp. 71-92.
H. Cohen, et al., "Efficient Elliptic Curve Exponentiation Using Mixed Coordinates," in K. Ohta and D. Pei, editors, Advances in Cryptology ASIACRYPT 98, pp. 51-65, Springer Verlag, 1998, LNCS 1514.
D. Bailey, et al., "Optimal Extension Fields for Fast Arithmetic in Public-Key Algorithms," In H. Krawczyk, editor, Advances in Cryptography—CRYPTO '98, vol. LNCS 1462, pp. 472-485, Pringer-Verlag 1998. http://citeseer.ist.psu.edu/article/bailey98optimal.html, 14 pages.

Intel® Itanium™ Processor, "High Performance on Security Algorithms (RSA Decryption Kernel)," Intel Corporation 2001, pp. 1-8.

Intel® Itanium™, "Architecture Software Developer's Manual, vol. 1, Application Architecture," Revision 2.1, Oct. 2002, 2 pages.

GroBschadl, Johann, "Instruction Set Extension for Long Integer Modulo Arithmetic on RISC-Based Smart Cards," Proceedings of the 14th Symposium on Computer Architecture and High Performance Computing 2002, 7 pages.

H. Pietilainen, "Elliptic Curve Cryptography on Smart Cards," Master's Theses, Helsinki University of Technology, Oct. 12, 2000, pp. i-81.

F. Morain, et al., "Speeding Up the Computations on an Elliptic Curve Using Addition-Subtraction Chains," Rapport de Recherche 983, INRIA, France, Mar. 1989, http://citeseer.ist.psu.edu/morain90speeding.html, pp. 119-130.

Cohn, Leonard Allen, "Generate-Propgate Adders," ChoPP Computer Corporation, prioir 2000, pp. 1-16.

Mano, M. Morris, "Computer System Architecture," Prentice-Hall, Inc., 1976, pp. 244-249.

Erdem, et al., "A Less Recursive Variant of Karatsuba-Ofman Algorithm for Multiplying Operands of Size a Power of Two," Proceedings of the 16th IEEE Symposium on Computer Arithmetic (ARITH-16'03), Jun. 15-18, 2003.

Gupta, V., et al, "Speeding up Secure Web Transactions Using Elliptic Curve Cryptography," Sun Microsystems, Inc., http://research.sun.com/projects/crypto/, 9 pages.

Comba, P.G., "Exponentiation Cryptosystems on the IBM PC," IBM Systems Journal, vol. 29, No. 4, 1990, pp. 526-538.

Kaliski, Burt, "Twirl and RSA Key Size," Technical Notes, May 1, 2003, RSA Laboratories, 5 pages, downloaded from Internet http://www.orsasecurity.com/rsalabs/node.asp?id=2004 as of Sep. 13, 2006.

Gura, Nils, et al., "Comparing Elliptic Curve Cryptographic and RSA on 8-bit CPUs," Cryptographic Hardware and Embedded Systems—CHES 2004: 6th International Workshop (Cambridge, MA, USA), Aug. 11-13, 2004, LNCS, vol. 3156, ISBN 3-540-22666-4, pp. 119-132, Springer.

Karatsuba, A., et al., "Ymnozhenie mnogozhachnix chisel na avtomatax," Doklady Academi Nauk SSSR, Vo. 145. No. 2, pp. 293-294, 1962.

Hankerson, et al., "Guide to Elliptic Curve Cryptography," pp. 48-53, 95-113, 129-147, 205-212 and 224-226, Springer-Verlag, 2004.

* cited by examiner

| Register | Meaning | Size |
|---|---|---|
| R0..R7 | general - purpose registers | 256 bits |
| RM | irreducible polynomial | 256 bits |
| RC | configuration register<br>nc: named curve RC[7..0]<br>m: field degree RC[16..8] | 17 bits |
| CC | condition code<br>MZ: MSB is zero<br>EQ: result is equal zero<br>NC: named curve | <br>1 bit<br>1 bit<br>1 bit |

FIG. 3

| INSTRUCTION TYPE/ OPCODE | Instruction Name | Meaning | Registers |
|---|---|---|---|
| MEMORY INSTRUCTIONS | | | |
| LD  DMEM,RD | Load | DMEM → RD | RD = {R0..R7,RM,RC} |
| ST  RS,DMEM | Store | RS → DMEM | RS = {R0..R7} |
| Arithmetic Instructions | | | |
| DIV  RS0,RS1,RD | Divide | (RS1 / RS0) mod RM → RD | RS0,RS1,RD = {R0..R7} |
| MUL  RS0,RS1,RD | Multiply | RC.nc=0: (RS0 * RS1) mod RM → RD<br>RC.nc≠0: (RS0 * RS1) mod M → RD | RS0,RS1,RD = {R0..R7} |
| MULPR  RS0,RS1,RD | Multiply with Partial Red. | (RS0 * RS1) mod RM → RD | RS0,RS1,RD = {R0..R7} |
| MULNR  RS0,RS1,RD0,RD1 | Multiply with No Reduction | (RS0 * RS1) → RD0,RD1 | RS0,RS1,RD0,RD1 = {R0..R7} |
| ADD  RS0,RS1,RD | Add | RS0 + RS1 → RD;<br>(RD == 0) → EQ | RS0,RS1,RD = {R0..R7} |
| SQR  RS,RD | Square | ( RS * RS) mod M  → RD;<br>(RD == 0) → EQ | RS,RD = {R0..R7} |
| SL  RS,RD | Shift Left | {RS[254..0],0} → RD \|<br>RS[255] → MZ;<br>(RD == 0) → EQ | RS,RD = {R0..R7} |
| Control Instructions | | | |
| BMZ  ADDR | Branch | branch if MZ is set | |
| BEQ  ADDR | Branch | branch if EQ is set | |
| BNC  ADDR | Branch | branch if NC is set | |
| JMP  ADDR | Jump | jump | |
| END | End | end program execution | |
| NOP | No Operation | no operation | |

FIG. 4

Arithmetic Instructions

| 4 | 4 | 4 | 4 |
|---|---|---|---|
| OpCode | RS0 | RS1 | RD |

DIV,MUL,MULPR,MULNR,ADD

| 4 | 4 | 4 | 4 |
|---|---|---|---|
| OpCode | RS | | RD |

SQR,SL

Memory Instructions

| 4 | 8 | 4 |
|---|---|---|
| OpCode | DMEM Addr. | RD |

LD

| 4 | 4 | 8 |
|---|---|---|
| OpCode | RS | DMEM Addr. |

ST

Control Instructions

| 4 | 3 | 9 |
|---|---|---|
| OpCode | | IMEM Addr. |

BMZ,BEQ,BNC,JMP

| 4 | |
|---|---|
| OpCode | |

END,NOP

FIG. 5

| BAR | Offset | Name | Meaning | Size |
|---|---|---|---|---|
| BAR0 | 0000h | CSR | Command and Status Register | 3 bits |
| | 0004h | MCC | Cycle Counter Register | 32 bits |
| BAR1 | 0000h | DMEM | Data Memory | 8k Bytes, 256 x 256-bit operands |
| | 2000h | IMEM | Instruction Memory | 1k Bytes, 512 x 16-bit instructions |

(a)

(b)

| Name | Meaning | Location | Host Access | Accelerator Access |
|---|---|---|---|---|
| Reset | While Reset is 1, the state machine remains in the idle state. | bit 0 | W | R |
| Start | When Start goes from 0 to 1, program execution is started. | bit 1 | W | R |
| Done | Done is set to 1 when an END instruction is executed. | bit 2 | R | W |

FIG.11

| Address | Name | Meaning | Size |
|---|---|---|---|
| 0h | nc | named curve (bits 7..0) | 8 |
|  | m | field degree (bits 16..8) | 9 |
| 1h | b | curve coefficient | 256 |
| 2h | M | irreducible polynomial | 256 |
| 3h | Px | point x coordinate | 256 |
| 4h | Py | point y coordinate | 256 |
| 5h | k | point multiplier | 256 |
| 6h | $t^{256-m}$ | Multiplying factor used for partial reduction | 256 |
| 10h | kPx | result point x coordinate | 256 |
| 11h | kPy | result point y coordinate | 256 |

FIG.12

X(t)  $\quad$  Y(t)

$\boxed{1\ 0\ 1\ 1}$  ×  $\boxed{1\ 0\ 0\ 1}$

Z(t)

i = 0:  $\boxed{1\ 0\ 0\ 1\ 0\ 0\ 0}$ i = 1:  $\quad$ 1 0 0 1 0 0  $\quad$ SHIFT
$\quad\quad\quad\quad$ 1 0 0 1  $\quad\quad\quad\quad$ ADD
$\quad\quad\quad$ $\boxed{1\ 1\ 0\ 1\ 1\ 0\ 0}$ i = 2:  $\quad$ 1 1 0 1 1 0
$\quad\quad\quad\quad$ ——
$\quad\quad\quad$ $\boxed{0\ 1\ 1\ 0\ 1\ 1\ 0}$ i = 3:  $\quad$ 0 1 1 0 1 1
$\quad\quad\quad\quad$ 1 0 0 1
$\quad\quad\quad$ $\boxed{1\ 0\ 1\ 0\ 0\ 1\ 1}$  $\quad$ $Z(t) = t^6 + t^4 + t + 1$

FIG. 14

$m = 4$
$Z(t) = t^6 + t^4 + t + 1$     $Z = 1\ 0\ 1\ 0\ 0\ 1\ 1$
$M(t) = t^4 + t^3 + 1$     $M = 1\ 1\ 0\ 0\ 1$
$M'(t) = M(t) - t^m = t^3 + 1$     $M' = \ \ \ 1\ 0\ 0\ 1$ $Z_h$ : $\boxed{1\ 0\ 1}$     $M'$ : $\boxed{1\ 0\ 0\ 1}$ $Z_h$: $1\ 0\ 1$   $Z_h * M'$: $1\ 0\ 1\ 1\ 0\ 1$
$Z_l$            $0\ 0\ 1\ 1$
                 $\boxed{1\ 0\ 1\ 1\ 1\ 0}$ $Z_h * M'$: $1\ 0\ 0\ 1\ 0$
            $Z_l$        $1\ 1\ 1\ 0$
$Z_h$: $1\ 0$    $\boxed{1\ 1\ 1\ 0\ 0}$ $Z_h * M'$: $1\ 0\ 0\ 1$
            $Z_l$        $1\ 1\ 0\ 1$
$Z_h$: $1$      $\boxed{0\ 1\ 0\ 1}$     $P(t) = t^2 + 1$

FIG. 15

$$(X_h 2^k + X_l) * (Y_h 2^k + Y_l) \qquad k=n/2$$

$$= X_h Y_h 2^{2k} + \underbrace{(X_l Y_h + X_h Y_l)} 2^k + X_l Y_l$$

$$= X_h Y_h + X_l Y_l - (X_h - X_l) * (Y_h - Y_l)$$

$$= \cancel{X_h Y_h} + \cancel{X_l Y_l} - (\cancel{X_h Y_h} - X_h Y_l - X_l Y_h + \cancel{X_l Y_l})$$

$$= X_h Y_l + X_l Y_h$$

|   63 ... 0   | × | 255      192 | 191      128 | 127       64 | 63         0 |
|     X0       |   |      Y3      |      Y2      |      Y1      |      Y0      |

P0: | X0 * Y0 |

\+

P1: | X0 * Y1 |

\+

P2: | X0 * Y2 |

\+ P3: | X0 * Y3 |

| $X0_h * Y0_h$ | $X0_l * Y0_l$ |

(+) | $X0_h * Y0_h$ |

(+) | $X0_l * Y0_l$ |

(−) | $(X0_h - X0_l) *$ $(Y0_h - Y0_l)$ |

―――――――

| P0+P1+P2+P3 |

|  | $r_h$ |  | $r_l$ |  |
|---|---|---|---|---|
| 0............................0 |  | a |  | 0 |

2n　　　　　　　　　　　n　　　　　　　　　n-m　0

$r := r_l * b = c_0 * t^{n-m}$

| 0 | $c_{0,h}$ | $c_{0,l}$ | 0 |

2n　n+m-1　　　　　　　n　　　　　　n-m　0 while ($r_h$ <> 0)
　　$r := r_h*(M-t^m)*t^{n-m}+r_l$

| 0 | $c_{j,h}$ | $c_{j,l}$ | 0 |

2n　n+m-1-j(m-k)　　　n　　　　　n-m　0

$r := r_l * t^m$

| 0 | $c_{j,l}$ | 0............................0 |

|  | $r_h$ | $r_l$ |
|---|---|---|
| 0 | $c_{0,h}$ | $c_{0,l}$ |

2n　2n-1　　　　　　　　n　　　　　　　　　　　0 while ($r_h$ <>0)
　　$r := r_h *(M-t^m)*t^{n-m}+r_l$

| 0 | $c_{j,h}$ | $c_{j,l}$ |

| State | $X$ | $Y$ | $Y'$ | $P$ | $Z$ |
|---|---|---|---|---|---|
| Named Curves | | | | | |
| S0 | - | - | $y$ | - | - |
| S1 | $x$ | $Y'$ | - | - | - |
| S2 | shift_right($X$) | shift_left($Y$)mod$M$ | - | $X_l * Y$ | 0 |
| S3 | shift_right ($X$) | shift_left($Y$)mod$M$ | - | $X_l * Y$ | ($P$mod$M$)+$Z$ |
| S4 | shift_right ($X$) | shift_left($Y$)mod$M$ | - | $X_l * Y$ | ($P$mod$M$)+$Z$ |
| S5 | - | - | - | $X_l * Y$ | ($P$mod$M$)+$Z$ |
| S6 | - | - | - | - | ($P$mod$M$)+$Z$ |
| Generic Curves | | | | | |
| S0 | $\{0, y_h\}$ | $M'$ | $y$ | - | - |
| S1 | $x$ | $Y'$ | - | $X_l * Y$ | - |
| S2 | $\{X_h, (shift\_left(Y) + P)_h\}$ | $M'$ | shift_left($Y$) + $P$ | $X_l * Y$ | 0 |
| S3 | shift_right($X$) | $Y'$ | - | $X_l * Y$ | $P + Z$ |
| S4 | $\{X_h, (shift\_left(Y) + P)_h\}$ | $M'$ | shift_left($Y$) + $P$ | $X_l * Y$ | $Z$ |
| S5 | shift_right($X$) | $Y'$ | - | $X_l * Y$ | $P + Z$ |
| S6 | $\{X_h, (shift\_left(Y) + P)_h\}$ | - | shift_left($Y$) + $P$ | $X_l * Y$ | $Z$ |
| S7 | shift_right($X$) | $Y'$ | - | $X_l * Y$ | $P + Z$ |
| S8 | - | - | - | $X_l * Y$ | $Z$ |
| S9 | $P_h + Z_h$ | $M'$ | - | - | $P + Z$ |
| S10 | - | - | - | $X_l * Y$ | $Z$ |
| S11 | - | - | - | - | $P + Z$ |

FIG. 36

| State | $X$ | $Y$ | $Y'$ | $P$ | $Z$ |
|---|---|---|---|---|---|
| Named Curves | | | | | |
| S0 | - | - | $Y$ | - | - |
| S1 | $x$ | $Y'$ | $Y'$ | - | - |
| S2 | $shift\_left(X)$ | $Y'$ | $Y'$ | $X_h * Y$ | 0 |
| S3 | $shift\_left(X)$ | $Y'$ | $Y'$ | $X_h * Y$ | $(P+shift\_left(Z))mod M$ |
| S4 | $shift\_left(X)$ | $Y'$ | - | $X_h * Y$ | $(P+shift\_left(Z))mod M$ |
| S5 | - | - | - | $X_h * Y$ | $(P+shift\_left(Z))mod M$ |
| S6 | - | - | - | - | $(P+shift\_left(Z))mod M$ |
| Generic Curves | | | | | |
| S0 | - | - | $y$ | - | - |
| S1 | $x$ | $Y'$ | $Y'$ | - | - |
| S2 | $shift\_left(X)$ | $Y'$ | $Y'$ | $X_h * Y$ | 0 |
| S3 | $\{(P + shift\_left(Z))_h, X_l\}$ | $M'$ | $Y'$ | $X_h * Y$ | $P + shift\_left(Z)$ |
| S4 | $shift\_left(X)$ | $Y'$ | $Y'$ | $X_h * Y$ | $P + shift\_left(Z)$ |
| S5 | $\{(shift\_left(P) + Z)_h, X_l\}$ | $M'$ | $Y'$ | $X_h * Y$ | $shift\_left(P) + Z$ |
| S6 | $shift\_left(X)$ | $Y'$ | $Y'$ | $X_h * Y$ | $P + shift\_left(Z)$ |
| S7 | $\{(shift\_left(P) + Z)_h, X_l\}$ | $M'$ | $Y'$ | $X_h * Y$ | $shift\_left(P) + Z$ |
| S8 | $\{(P + shift\_left(Z))_h, X_l\}$ | $M'$ | $Y'$ | $X_h * Y$ | $P + shift\_left(Z)$ |
| S9 | | - | - | $X_h * Y$ | $shift\_left(P) + Z$ |
| S10 | | - | - | - | $shift\_left(P) + shift\_left(Z)$ |

FIG. 39

| Instructions | | Execution for Named Curves | Execution for Generic Curves |
|---|---|---|---|
| | $R0 = X_1, R1 = Z_1, R2 = X_2, R3 = Z_2$ | | |
| MUL(R1, R2, R2) | $R2 = Z_1 * X_2$ | MUL(R1, R2, R2); SQR(R1, R1) | MUL(R1, R2, R2) |
| SQR(R1, R1) | $R1 = Z_1^2$ | | SQR(R1, R1) |
| MUL(R0, R3, R4) | $R4 = X_1 * Z_2$ | MUL(R0, R3, R4); SQR(R0, R0) | MUL(R0, R3, R4) |
| SQR(R0, R0) | $R0 = X_1^2$ | | SQR(R0, R0); ADD(R2, R4, R3) |
| ADD(R2, R4, R3) | $R3 = Z_1 * X_2 + X_1 * Z_2$ | ADD(R2, R4, R3) | |
| MUL(R2, R4, R2) | $R2 = Z_1 * X_2 * X_1 * Z_2$ | MUL(R2, R4, R2); SQR(R1, R4) | MUL(R2, R4, R2) |
| SQR(R1, R4) | $R4 = Z_1^4$ | | SQR(R1, R4) |
| MUL(R0, R1, R1) | $R1 = Z_1^2 * X_1^2$ | MUL(R0, R1, R1); SQR(R3, R3) | MUL(R0, R1, R1) |
| SQR(R3, R3) | $R3 = Z_3 = (Z_1 * X_2 + X_1 * Z_2)^2$ | | SQR(R3, R3) |
| LD(data_mem_b, R5) | $R5 = b$ | LD(data_mem_b, R5) | LD(data_mem_b, R5) |
| MUL(R4, R5, R4) | $R4 = b * Z_1^4$ | MUL(R4, R5, R4); SQR(R0, R0) | MUL(R4, R5, R4) |
| SQR(R0, R0) | $R0 = X_1^4$ | | SQR(R0, R0) |
| LD(data_mem_Px, R5) | $R5 = X$ | LD(data_mem_Px, R5) | LD(data_mem_Px, R5) |
| MUL(R3, R5, R5) | $R4 = X * (Z_1 * X_2 + X_1 * Z_2)^2$ | MUL(R3, R5, R5); ADD(R4, R0, R0) | MUL(R3, R5, R5); ADD(R4, R0, R0) |
| ADD(R4, R0, R0) | $R0 = X_1^4 + b * Z_1^4$ | | |
| ADD(R2, R5, R2) | $R2 = X * Z_3 + (Z_1 * X_2) * (X_1 * Z_2)$ | ADD(R2, R5, R2) | ADD(R2, R5, R2) |

FIG. 41

HARDWARE ACCELERATOR FOR ELLIPTIC CURVE CRYPTOGRAPHY

CROSS-REFERENCE TO RELATED APPLICATION(S)

This application claims the benefit under 35 U.S.C. § 119(e) of the following provisional applications: 60/376,742, filed May 1, 2002; 60/379,316, filed May 10, 2002; 60/389,135 filed Jun. 14, 2002; 60/400,223 filed Aug. 1, 2002; and 60/426,783, filed Nov. 15, 2002; all of which are incorporated herein by reference.

BACKGROUND

1. Field of the Invention

This invention relates to elliptic curve cryptography and particularly to hardware and software related to processing of elliptic curve operations.

2. Description of the Related Art

Elliptic Curve Cryptography (ECC) is evolving as an attractive alternative to other public-key schemes such as RSA by offering the smallest key size and the highest strength per bit and efficient computation. Internet standards such as Secure Socket Layer (SSL), IP security (IPsec), and Pretty Good Privacy (PGP) rely on public-key cryptosystems for key management.

The mathematical simplicity of RSA and the Diffie-Hellman key exchange allows for a straightforward implementation of the underlying arithmetic operations. Implementations are available in various cryptographic libraries. Arithmetically, RSA and the Diffie-Hellman key exchange operate on integer fields and primarily involve modular multiplication. In comparison, ECC is more complex. It is specified over both integer and binary polynomial fields and involves modular division in addition to modular multiplication. Implementing ECC is further complicated by algorithmic choices. Algorithms may be chosen according to the characteristics of the system architecture and constraints such as processor speed, data path width or memory size.

Different fields can underlie elliptic curves, including integer fields $GF(p)$ and binary polynomial fields $GF(2^m)$, which are well suited for cryptographic applications. In particular, binary polynomial fields allow for fast computation in software as well as in hardware.

To make ECC commercially viable, its integration into secure protocols needs to be standardized. As an emerging alternative to RSA, the US government has adopted ECC for the Elliptic Curve Digital Signature Algorithm (ECDSA) and recommended a set of named curves over binary polynomial fields for key sizes of 163, 233, 283, 409 and 571 bit. Additional curves for commercial use were recommended by the Standards for Efficient Cryptography Group (SECG). However, only few ECC-enabled protocols have been deployed so far. Today's dominant secure Internet protocols such as SSL and IPsec rely on RSA and the Diffie-Hellman key exchange. Although standards for the integration of ECC into secure Internet protocols have been proposed, they have not yet been finalized.

The evolving wireless and web-based environment has millions of client devices including portable and desktop computers, cell phones, PDAs and SmartCards connecting to servers over secure connections. The aggregation of connections and transactions requested by client devices leads to high computational demand on the server side. Small key sizes and computational efficiency of both public and private key operations make ECC attractive to both server systems that need to process large numbers of secure connections and client devices which may have limited processing capabilities. While small key sizes and computational efficiency of both public and private key operations allow secure protocols based on ECC standards to be handled in software on the client side, the aggregation of secure connections demands high computational power on the server side that easily exceeds the capabilities of a general-purpose CPU.

While optimized implementations for specific named curves and field degrees can provide high performance, it is a desired security feature for server-side implementations to provide both ECC software libraries and hardware accelerators that support generic elliptic curves over a wide range of binary polynomial fields $GF(2^m)$. Support for generic curves on the server side is desirable since clients might choose different key sizes and curves depending on vendor preferences, security requirements and processor capabilities. Also, different types of transactions may require different security levels. In addition, the implementer of an ECC library or hardware platform may not know all curves that will eventually be used. Vendors may change their selection of curves according to security considerations, computational efficiency, market conditions and corporate policies. For hardware implementations in ASIC technology, that may result in architectural changes and costly redesigns. Also, there may be a need to support curves that are infrequently used and do not call for optimized performance.

Accordingly, it would be desirable to provide a hardware accelerator for ECC-based cryptosystems that meets the high computational power demanded on the server side.

SUMMARY

In one embodiment, an elliptic curve processing apparatus for performing at least one operation on elliptic curves specified over binary polynomial fields is provided that includes at least one functional unit including a digit serial multiplier with a digit size of at least two bits, operable to perform reduction for respective generic curves using arbitrary irreducible polynomials, the arbitrary irreducible polynomials corresponding to respective ones of the generic curves. The elliptic curve processing apparatus may include hardwired reduction circuits in the functional unit for use with respective named curves. A storage location in the elliptic curve processing apparatus may be used to specify whether an operation is for one of the named curves or for one of the generic curves. Also, at least one storage location may be used to specify an irreducible polynomial associated with one of the generic curves.

In another embodiment, an elliptic curve processing apparatus is provided that is responsive to a first arithmetic instruction to utilize respective hardwired reduction logic for reduction of respective named curves and responsive to a second arithmetic instruction to utilize a generic reduction circuit for a plurality of generic curves, the generic reduction circuit operable to perform reduction for respective ones of the generic curves using arbitrary irreducible polynomials, respective ones of the arbitrary irreducible polynomials corresponding to respective ones of the generic curves.

In another embodiment, an elliptic curve processing apparatus is provided comprising hardwired reduction circuits and a multiplier circuit, the elliptic curve processing apparatus responsive to an arithmetic instruction to utilize a respective one of the hardwired reduction circuits for reduction for respective named curves and the multiplier circuit for reduction for a plurality of generic curves, the multiplier coupled to perform reduction for respective generic curves using arbitrary irreducible polynomials, the arbitrary irreducible polynomials corresponding to respective ones of the generic curves. In an embodiment, the arithmetic instruction may specify a multiplication and the multiplication utilizes one of the hardwired reduction circuits for reduction for a named curve and the multiplier for reduction for a generic curve, according to a stored value, the stored value indicating whether the curve being processed is the generic curve or the named curve.

In another embodiment a method is provided for performing at least one arithmetic operation on elliptic curves specified over binary polynomial fields. The method includes performing the arithmetic operation on respective named curves using respective hardwired reduction logic for reduction operations; and performing the arithmetic operation on generic curves using a multiplier circuit for reduction.

In another embodiment an elliptic curve processing apparatus operable on elliptic curves specified over binary polynomial fields is provided that is responsive to a conditional branch instruction according to whether a curve being processed is a generic curve or a named curve.

In another embodiment a method is provided that includes performing a conditional branch instruction according to a value of a storage location indicating whether a curve being processed in an elliptic curve processing apparatus is a generic curve or a named curve.

In another embodiment a computer program product encoded on computer readable media is provided that inclues an arithmetic instruction causing an elliptic curve processing apparatus to utilize, according to whether a curve being processed is a generic curve or a named curve, hardwired reduction logic for the arithmetic operation for named curves and to utilize a multiplier operable to perform reduction for respective generic curves using arbitrary irreducible polynomials, the arbitrary irreducible polynomials corresponding to respective ones of the generic curves.

In another embodiment a computer program product encoded on computer readable media for an elliptic curve processor is provided that includes a first arithmetic instruction causing the elliptic curve processor to utilize respective hardwired reduction logic for respective named curves; and a second arithmetic instruction causing the elliptic curve processor to utilize a multiplier for reduction for a plurality of generic curves, the multiplier operable to perform reduction for respective generic curves using arbitrary irreducible polynomials corresponding to respective ones of the generic curves.

In another embodiment a computer program product encoded on computer readable media for execution on an elliptic curve processing apparatus is provided that includes a conditional branch instruction causing a branch according to whether an elliptic curve being processed is a generic curve or a named curve.

BRIEF DESCRIPTION OF THE DRAWINGS

The present invention may be better understood, and its numerous objects, features, and advantages made apparent to those skilled in the art by referencing the accompanying drawings.

FIG. 3 illustrates a register set of an exemplary accelerator.

FIG. 4 illustrates an instruction set of an exemplary accelerator.

FIG. 5 illustrates exemplary instruction formats.

FIG. 11 illustrates the contents of the Command and Status Register (CSR).

FIG. 12 illustrates the organization of the program call frame.

FIG. 14 illustrates polynomial multiplication using a serial shift-and-add algorithm.

FIG. 15 illustrates modular reduction of a multiplication result.

FIG. 26 illustrates use of the Karatsuba algorithm.

FIG. 32 shows an alternative approach to reduction.

FIG. 33 illustrates the use of partial reduction.

FIG. 36 shows the state diagram for the generic LSD multiplier.

FIG. 39 shows the state diagram for the generic MSD multiplier

FIG. 41 illustrates an assembly code fragment for implementing projective Montgomery point multiplication.

The use of the same reference symbols in different drawings indicates similar or identical items.

DESCRIPTION OF THE PREFERRED
EMBODIMENT(S)

Figure 1A:
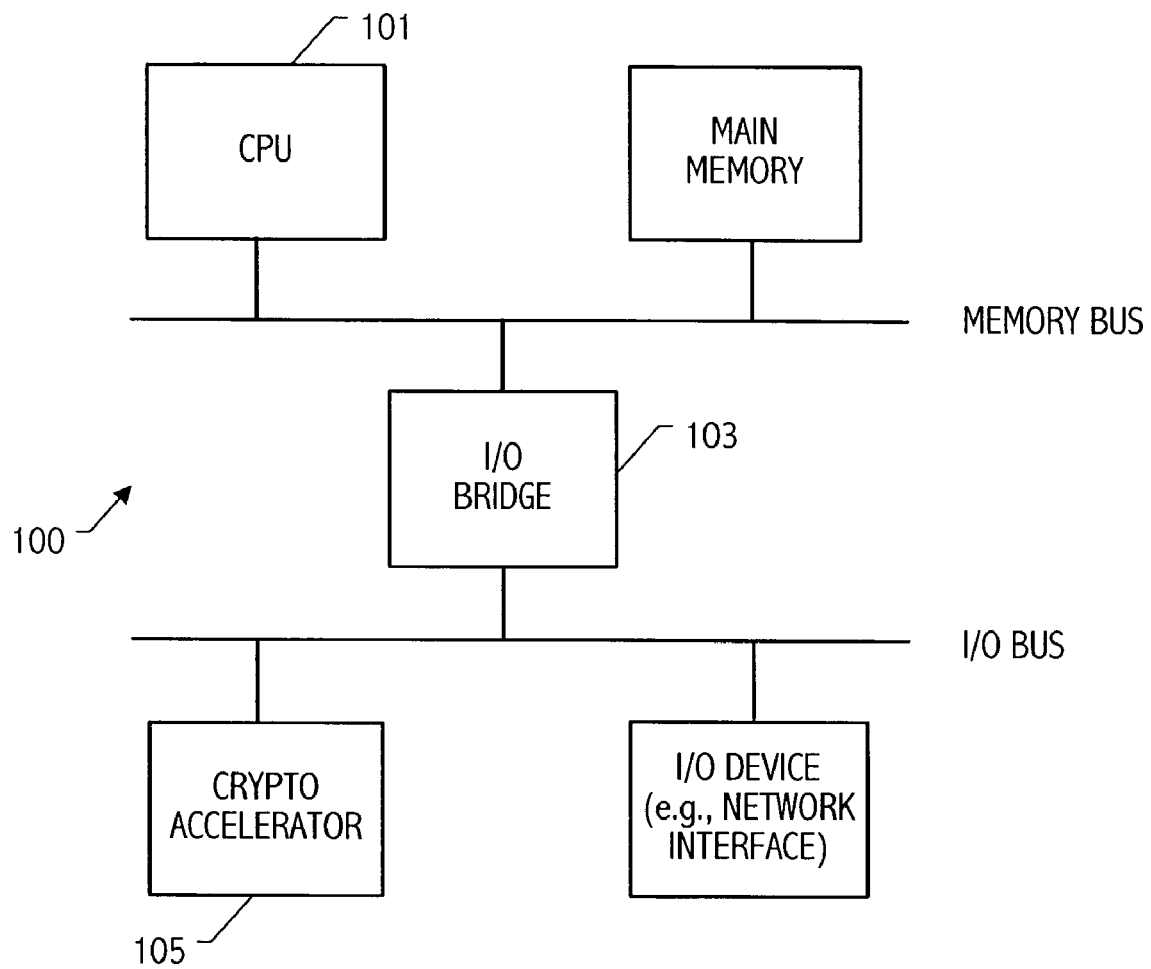
FIG. 1A illustrates an embodiment of a system utilizing ECC hardware acceleration.
Figure 1B:
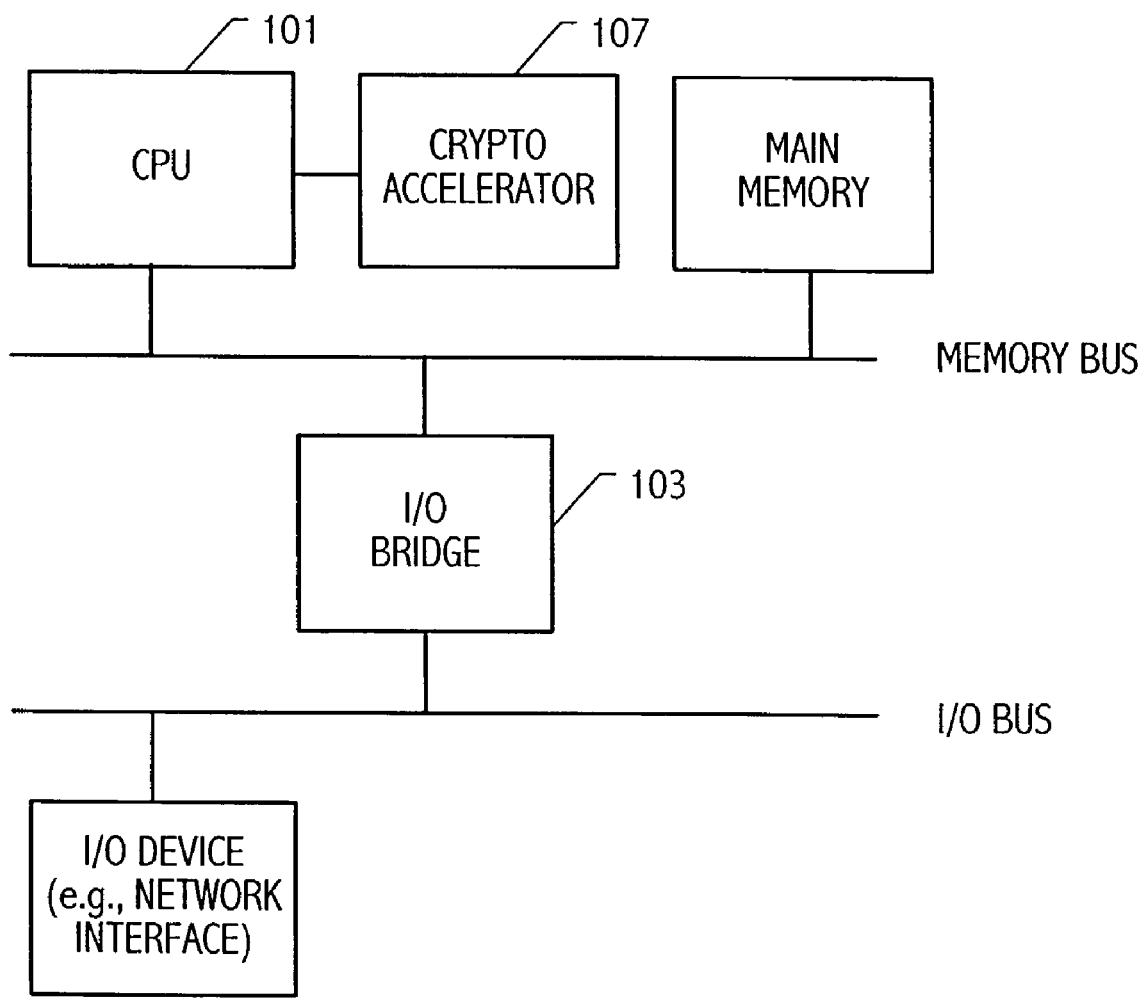
FIG. 1B illustrates another embodiment of a system utilizing ECC hardware acceleration.

Referring to FIG. 1A a system 100 includes hardware acceleration for ECC-based cryptosystems. System 100 includes one or more central processing units 101 and an I/O Bridge 103 providing access to input output (I/O) devices. In one embodiment, as illustrated in FIG. 1A, the crypto accelerator 105 is implemented as an I/O card. As shown in FIG. 1B, another embodiment is illustrated in which the crypto accelerator 107 is implemented as a coprocessor located next to the main CPU 101. In another embodiment, the crypto accelerator may be incorporate into the CPU integrated circuit.

The exemplary accelerator provides the basic functions needed to execute point multiplications on elliptic curves specified over binary polynomial fields. In one embodiment the accelerator is an FPGA-based PCI card that implements a co-processor for accelerating elliptic curve cryptography (ECC). More specifically, it enhances the performance of point multiplications on elliptic curves specified over binary polynomial fields. The hardware accelerator provides high performance for named elliptic curves (e.g., those named curves for key sizes of 163, 233, 283, 409, and 571) and supports point multiplications on other arbitrary curves, which may be less frequently used or unknown at implementation time.

Figure 2A:
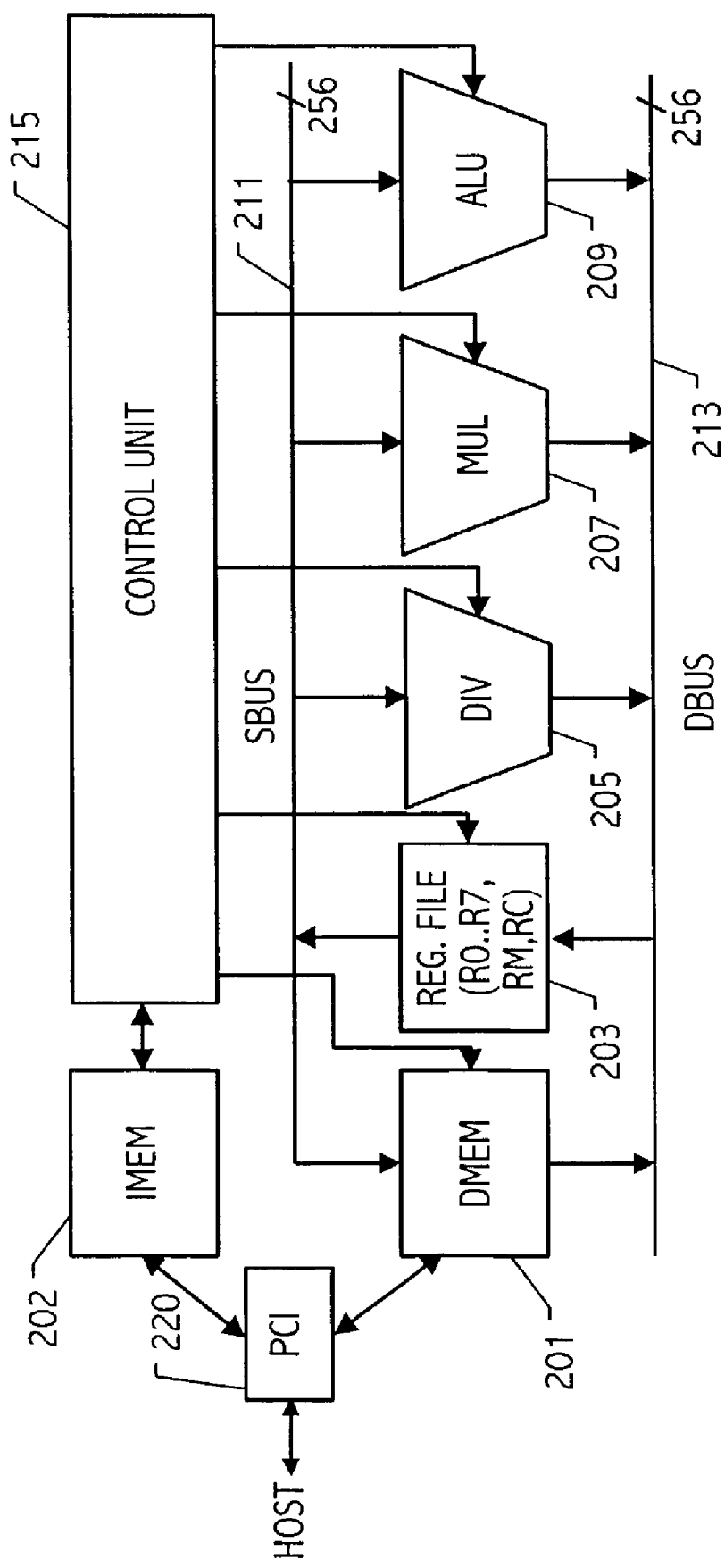
FIG. 2A illustrates an exemplary block diagram of a hardware accelerator.

FIG. 2A shows an exemplary block diagram of the data and control path of the hardware accelerator. The hardware accelerator is implemented as a programmable processor designed to execute ECC point multiplication. The data path of the exemplary hardware accelerator illustrated in FIG. 2A implements a 256-bit architecture. The exemplary hardware accelerator includes a data memory DMEM 201, an instruction memory IMEM 202, register file 203, and several arithmetic units. The arithmetic units include a divider 205, a multiplier 207, and a multifunction arithmetic and logic unit 209 providing addition, squaring/reduction, shift, and comparison functions. Parameters and variables are stored in data memory DMEM, which is an 8 kb data memory in the exemplary embodiment, and program instructions are contained in instruction memory IMEM (1 kb in the exemplary embodiment). The data memory and arithmetic units are connected by the source bus SBUS 211 and the destination bus DBUS 213. The SBUS is used to transfer operands from the register file to either the arithmetic units or the data memory DMEM, and the DBUS is used to transfer operands from either the DMEM or the arithmetic units to the register file. The data path implements a 256-bit architecture. That is, the arithmetic units operate on 256-bit operands and the widths of the busses SBUS and DBUS, the registers and the memory are 256 bits. In the embodiment illustrated, both memories are dual-ported and accessible by the host machine through a PCI interface 220.

Figure 2B:
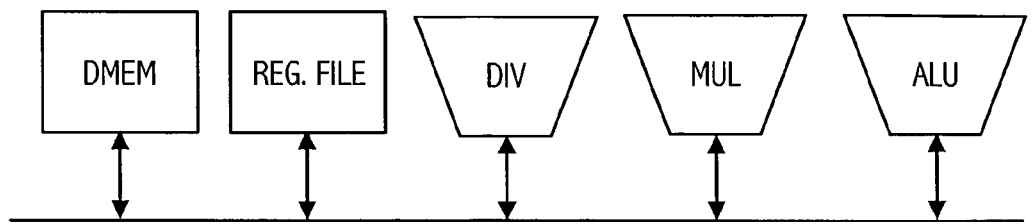
FIGS. 2B-2D illustrate high level block diagrams of additional embodiments of a hardware accelerator.
Figure 2C:
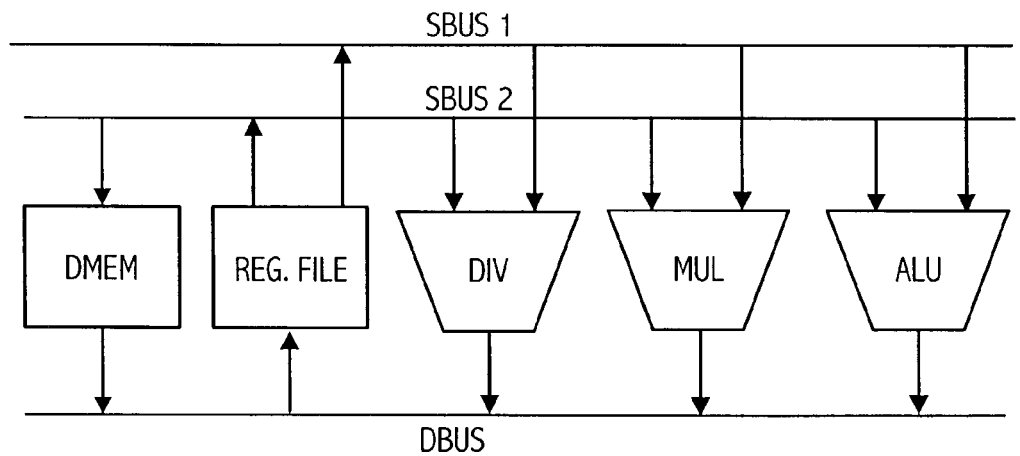
Figure 2D:
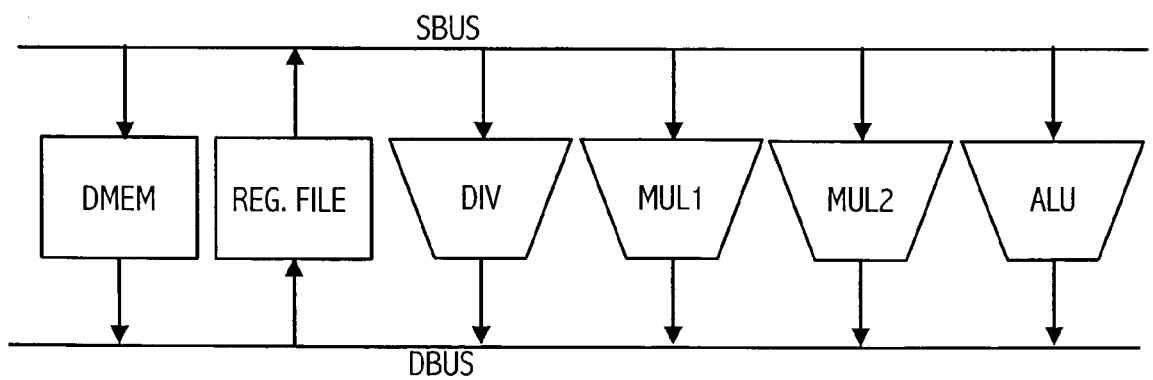

FIG. 2B illustrates an alternative embodiment that uses only one bus shared by source and destination operands. FIG. 2C illustrates another embodiment that uses two source buses (SBUS 1 and SBUS 2) and one destination bus. With more buses available, higher performance can be achieved since more operands can be transferred in parallel. FIG. 2D illustrates an embodiment in which two multipliers are available, thus allowing more parallel execution.

The register set includes general-purpose registers R0 . . . R7 and special-purpose registers RM, RC, CC. FIG. 3 lists the registers and their meanings. The register file 203 contains the eight general purpose registers R0-R7, the register RM to hold the irreducible polynomial, and the register RC for curve-specific configuration information. The RC register serves to specify if the curve to be processed is a named curve or a generic curve. Bits 7:0 specify the named curve (nc) and bits 16:8 specify the field degree m. Condition code bits MZ, EQ, and NC are explained in more detail herein.

Referring again to FIG. 2A, program execution is orchestrated by the micro-programmed control unit 215, which fetches instructions from the IMEM 202 and controls the DMEM 201, the register file 203 an micro-program is stored in the instruction memory IMEM 202 and can be written by the host via the PCI bus interface 220. Thus, the operation of the accelerator can be changed simply by replacing the code in the instruction memory. By changing the micro-program the accelerator can, for example, execute different algorithms or be upgraded without changes in the hardware. Typically, RM is loaded with the argument M of the Program Call Frame, and RC is loaded with the arguments nc and m of the Program Call Frame as described further herein.

Memory instructions LD and ST transfer operands between the DMEM 201 and the register file 203. The arithmetic and logic instructions include MUL, MULPR, MULNR, DIV, ADD, SQR and shift left (SL). That is, arithmetic and logic instructions can only access operands in the register file. The execution of arithmetic instructions can take multiple cycles and, in the case of division, the execution time may even be data dependent. To control the flow of the program execution, the conditional branch instructions BMZ and BEQ, the unconditional branch instruction JMP and the program termination instruction END can be used. The data path allows instructions to be executed in parallel and/or overlapped. The Control Unit examines subsequent instructions and decides on the execution model based on the type of instruction and the data dependencies.

FIG. 4 illustrates the instruction set utilized by an embodiment of the accelerator. The instruction set is composed of memory instructions, arithmetic/logic instructions and control instructions. In one embodiment the accelerator implements a load/store architecture. Thus, in an embodiment, memory can be accessed by load and store operations only, and all arithmetic instructions use register operands only. The memory instructions define two operands, a register and a memory operand. Memory instructions LD and ST transfer operands between the DMEM and the register file. The memory operand is specified by an 8-bit absolute address. Memory is accessed in 256-bit words aligned to 256-bit word addresses.

The arithmetic instructions DIV, MUL, MULPR, MULNR, ADD, and SQR are defined for binary polynomial fields. The operands contain bit strings $b_{n-1} \ldots b_1 b_0$ that represent binary polynomials $b_{n-1}X^{n-1}+b_{n-2}X^{n-2}+ \ldots +b_1 X+b_0$ with n being the field degree. The arithmetic instructions DIV, MUL, MULPR, and SQR include reduction as described further herein. The reduction is implemented by the divider for DIV, by the multiplier for MUL and MULPR, and by the ALU for SQR. The MUL instruction multiplies two polynomials of degree less than the field degree m and returns a reduced result of degree less than m. The MULPR instruction multiplies two polynomials of degree less than the register width n and returns a partially reduced result of degree less than n. MULNR (multiply with no reduction) multiplies two polynomials up to order of the register width n and returns a 2n bit result.

The reduction may be implemented in different ways. The multiplier contains hardwired reduction logic for named curves and generic reduction logic (the multiplier) is used for generic curves. More specifically, the MUL instruction uses the hardwired reduction logic for named curves (when the parameter nc is not equal to 0) and uses generic reduction logic for generic curves (when the parameter nc is equal to 0). The parameter nc is defined by the program call frame as explained further herein. The MULPR instruction uses the reduction logic for generic curves (i.e., the multiplier, various embodiments of which are described further herein). For named curves, the irreducible polynomial is implicitly specified by the configuration register RC, whereas for generic curves the polynomial used for reduction is explicitly given by the contents of the register RM. In the latter case when reduction is based on the partial reduction method, RM contains $(M-t^m)*t^{n-m}$.

The DIV instruction executed by the divider performs a reduction by the polynomial held in RM. The SQR instruction executed by the ALU uses hardwired reduction for named curves. Reduction for generic curves may not be implemented in the ALU. Therefore, in one embodiment, SQR instructions are translated into MUL instructions by the instruction decoder if nc specifies a generic curve.

There are three conditional branch instructions and one unconditional branch instruction to implement non-sequential program execution. BMZ is a conditional branch that is taken if condition code MZ is set to one. The condition code MZ is generated when a shift left (SL) instruction is executed. More specifically, if the most significant bit of the operand shifted is zero, MZ is set to one. BEQ is a conditional branch instruction that is taken if the condition code EQ is set to one. EQ is set to one if the result of the last ADD, SQR, or SL instruction executed is zero. BNC is a conditional branch that is taken if NC is set to one (NC is 1 when RC.nc≠0 and NC is 0 when RC.nc=0). RC.nc specifies the named curve and is equal to 0 if a generic curve rather than a named curve is specified. JMP implements an unconditional branch. BMZ, BEQ, BNC, and JMP specify the target of the branch with a 9-bit absolute address. Program execution is ended by the END instruction. The NOP instruction is provided as a way to remove data dependencies. The instructions given are exemplary. Additional instructions or fewer instructions may be implemented in a given embodiment.

Exemplary instruction formats are shown in FIG. 5. In the illustrated embodiment, instructions have a uniform size of 16 bits. Four bits are utilized for the opcode. Four bits are used to specify each source and destination register. An 8-bit instruction field specifies DMEM addresses making it possible to address a total of 256 256-bit words. A 9-bit instruction field specifies IMEM addresses allowing for addressing 512 16-bit instructions.

The execution of arithmetic instructions can take multiple cycles and, in the case of division, the execution time may even be data dependent. To control the flow of the program execution, the conditional branch instructions BMZ and BEQ, the unconditional branch instruction JMP and the program termination instruction END can be used.

Figure 6:
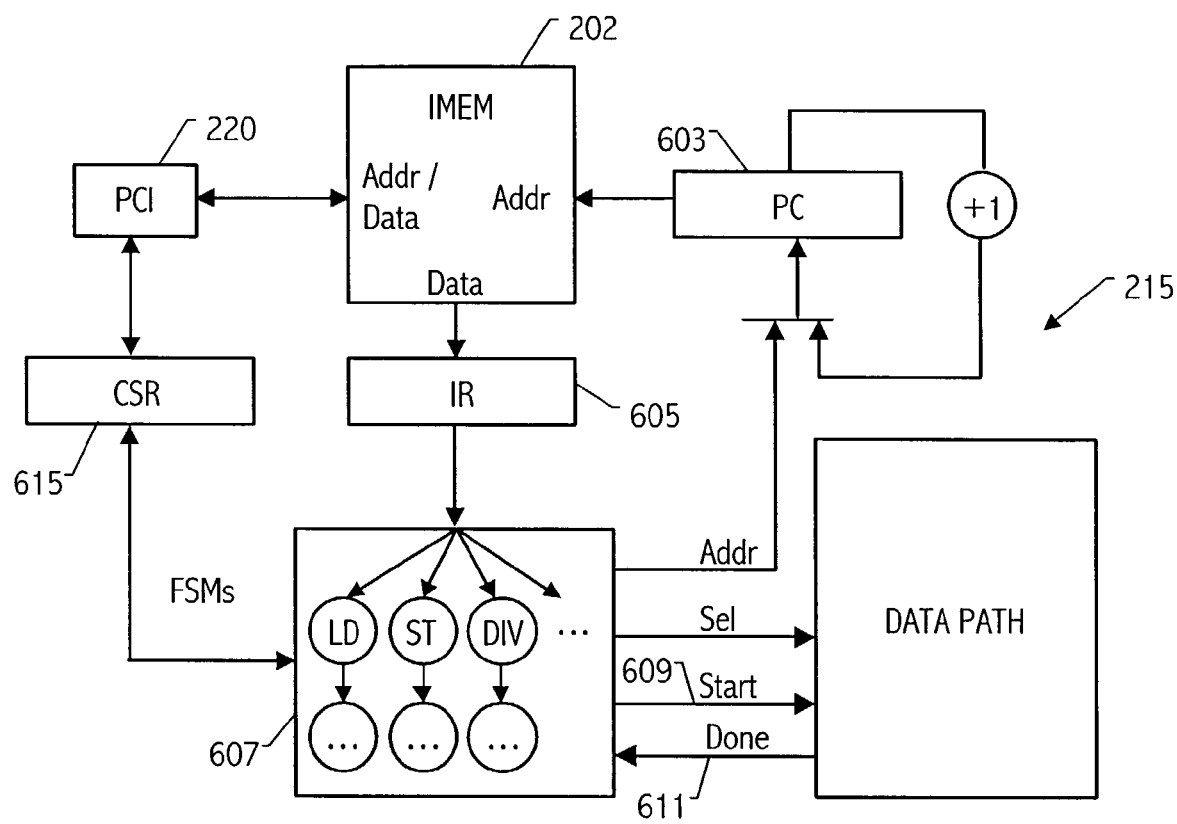
FIG. 6 illustrates additional detail of an exemplary control unit for the accelerator.

FIG. 6 illustrates additional details of exemplary microprogrammed control unit 215. The microprogram is stored in the instruction memory IMEM 202. The IMEM 202 has two ports, one connected to the PCI bus 220, the other connected to the program counter PC 603 and the instruction register IR 605. In one embodiment the PCI port 220 is 32 bits and the port connected to the instruction register IR is 16 bits wide.

The execution of an arithmetic instruction consists of the following stages:

1. Fetch: The instruction is fetched from the IMEM and decoded.
2. Load RS: The source operands are transferred over the SBUS from the register file into the arithmetic unit.
3. Execute: The instruction is executed in the arithmetic unit. The execution time varies with the instruction and can take several clock cycles.
4. Store RD: The result is transferred over the DBUS from the arithmetic unit into the register file.

The finite state machines (FSMs) 607 of the control unit use the handshake signals Start 609 and Done 611 to coordinate with the arithmetic units. Start indicates to the arithmetic unit that source operands are to be loaded and Done indicates to the control unit that destination operands are to be stored in the register file. While the number of cycles is fixed for memory and control instructions, it can vary for arithmetic instructions according to the values of the operands.

Figure 7:
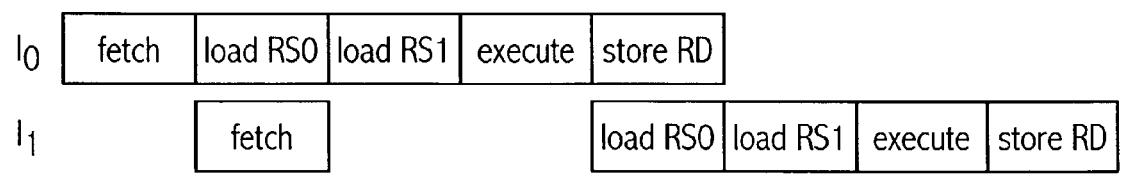
FIG. 7 illustrates overlapping instruction execution.

The data path may allow instructions to be executed in parallel and/or overlapped. In one embodiment, the control unit overlaps the execution of arithmetic instructions by prefetching the instruction as well as preloading the first source operand. This is illustrated in FIG. 7. While instruction $I_0$ is being "executed" (referring to the overall execution of the instruction and not just to the execute stage in the arithmetic unit), the next instruction $I_1$ is prefetched and register RS0 of $I_1$ is transferred over the SBUS from the register file to an arithmetic unit. Since RS0 of $I_1$ is loaded at the same time as RD of $I_0$ is stored, there must not be a data dependency between RS0 of $I_1$ and RD of $I_0$. Such dependencies may be detected by the assembler and are considered programming errors. If a data dependency exists between RD of $I_0$ and RS of $I_1$, the data dependency can be resolved by swapping RS0 and RS1 of $I_1$. If $I_0$ is followed by an instruction that uses one source register only (SQR, SL, ST) and the source register depends on RD of $I_0$, a NOP instruction can be inserted after $I_0$.

Figure 8:
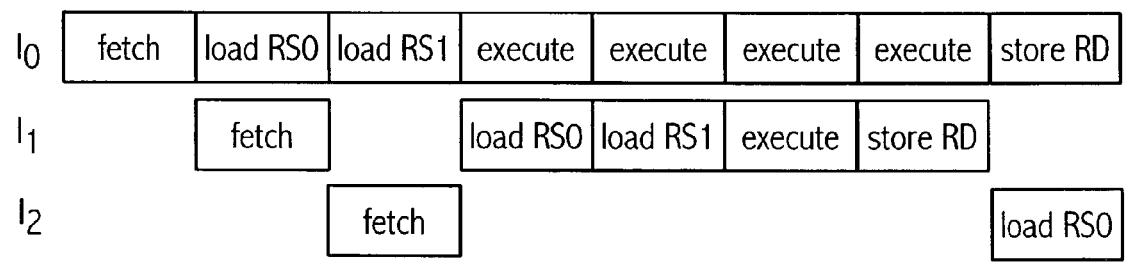
FIG. 8 illustrates parallel instruction execution.

Parallel execution of instructions is implemented for the instruction sequence $I_0$; $I_1$ if $I_0$ is a MUL, MULPR, or MULNR instruction and $I_1$ is an ADD or SQR instruction and there are no data dependencies. FIG. 8 illustrates the timing: $I_1$ is executed in parallel to $I_0$, and $I_2$ is prefetched while $I_0$ and $I_1$ are being executed. The following data dependencies need to be considered: $I_0$ and $I_1$ can be executed in parallel if RS0, RS1, and RD of $I_1$ are different from either RD of $I_0$ in the case of a MUL or MULPR instruction, or RD0 and RD1 in the case of a MULNR instruction; the execution of $I_2$ can be overlapped with the execution of $I_0$ and $I_1$ if RS0 of $I_2$ does not depend on RD of $I_0$ in the case of the MUL or MULPR instructions and RD0 and RD1 in the case of a MULNR instruction. Note that the dependency rules for overlapped execution are different from the one given for overlapped instruction execution in association with FIG. 7 in that the execution of $I_2$ depends on $I_0$ and not $I_1$.

In one embodiment, the memory and registers implemented by a PCI device are mapped by a device driver into user and kernel address spaces of the host machine with the help of Base Address Registers (BARs). The memory space with Base Address 0 (BAR0) contains the accelerator control registers. The memory space with Base Address 1 (BAR1) contains the DMEM and the IMEM. The memory map is given in FIG. 9. One embodiment accesses these memory spaces with 32-bit programmed IO operations. In other embodiments burst transfers may be supported instead of or in addition to, programmed IO operations. Note that the byte order for all PCI transactions is little-endian.

Figures 9, 10:
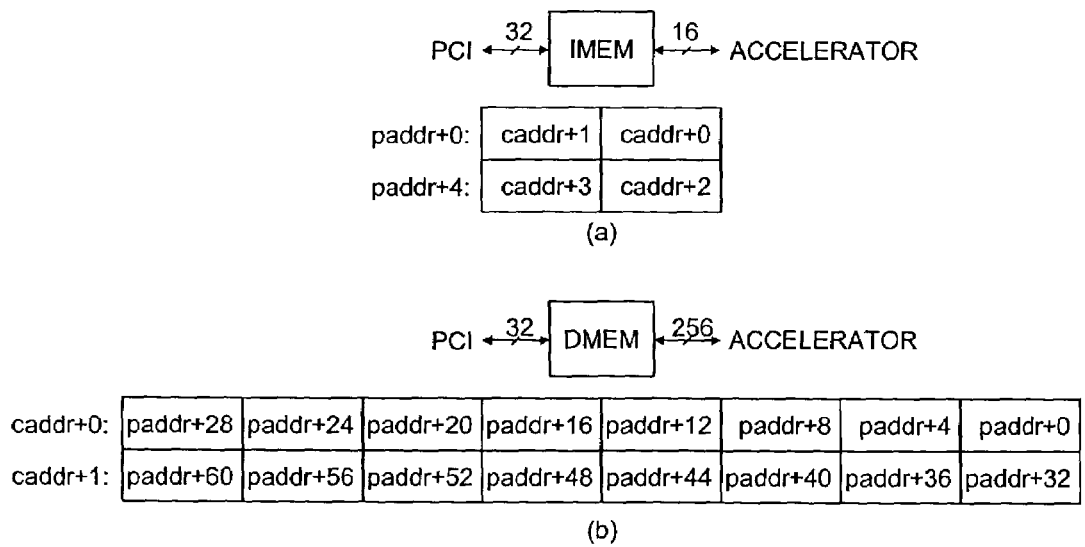
FIG. 9 shows an exemplary memory mapping of accelerator addresses.
FIG. 10 illustrates the word order for the DMEM and IMEM.

In the illustrated embodiment, control registers are in little-endian order. The order for the DMEM and the IMEM is shown in FIG. 10. As described previously, accelerator memories have two ports, one connected to the PCI bus and the other one connected to the control unit and the accelerator data path, respectively. On the PCI side, addresses are byte addresses with paddr referring to the base addresses of the memories. On the accelerator side, addresses are 16-bit-word addresses for the IMEM and 256-bit-word addresses for the DMEM with caddr referring to the memories' base addresses.

FIG. 11 defines the Command and Status Register (CSR) 615 (see FIG. 6). As shown in FIG. 11 the Reset bit is write accessible by the host and can be read by the accelerator. While Reset is 1, the state machine remains in the idle state. The Start and Done bits are specified similarly. The Cycle Counter Register MCC (see FIG. 9) counts the clock cycles it takes to execute a program. Counting starts when Start goes from 0 to 1 and ends when an END instruction is encountered. The host has write access to the Start bit and read access to the Done bit while the accelerator has read access to the Start bit and write access to the Done bit.

The host, (e.g. CPU 101 in FIG. 1) exchanges program arguments with the ECC accelerator via a Program Call Frame located in the DMEM 201 (see FIG. 2A). The organization of the Program Call Frame is given in FIG. 12. Addresses reference 256-bit words. Words 0 to 6 contain program arguments that need to be initialized before program execution is started. Words 3 and 4 contain the X and Y coordinates of a point P and word 5 contains the integer k used for the point multiplication kP. Word 6 indicates the length of k in bits and is used to calculate $M'=(M-t^m)*t^{n-m}$. Words 10 and 11 contain the result available after program execution ended. The call frame may contain additional custom arguments. The "nc" parameter specifies the elliptic curve. nc=0 specifies a generic curve that is characterized by field degree specified by the parameter "m" and the irreducible polynomial specified by parameter "M". nc>0 specifies a named curve with values for m and M as given in, e.g., IETF2001. In one embodiment, m and M are specified not only for generic curves but also for named curves. In other embodiments, only the generic curves need to have m and M specified. The irreducible polynomial M is represented by m+1 bits, thus, the largest possible field degree is 255 in an embodiment using the particular Call Frame illustrated in FIG. 12.

The sequence of steps for executing a program is as follows:

1. Host transfers code into IMEM.
2. Host initializes Program Call Frame in DMEM.
3. Host sets the CSR bit Start to 1.
4. ECC Accelerator sets CSR bit Done to 0.
5. Host sets CSR bit Start to 0.
6. ECC Accelerator executes the program. When the END instruction is encountered, ECC Accelerator sets CSR bit Done to 1.
7. Host polls CSR bit Done until it is set to 1.
8. Host reads result from Program Call Frame in DMEM.

Step 1 is only needed for a first program execution and can be omitted thereafter.

Before describing the various arithmetic units in more detail a brief background on ECC arithmetic in $GF(2^m)$ will be presented.

The fundamental and most expensive operation underlying ECC is point multiplication, which is defined over finite fields. For a non-supersingular elliptic curve C: $y^2+xy=x^3+ax^2+b$; $x, y \in GF(2^m)$ with curve parameters a, b $\in GF(2^m)$ over a binary polynomial field $GF(2^m)$, an additive Abelian group of points G=(S,+) can be defined. S={(x, y)|(x, y) satisfies C} $\cup$ 0 includes all points on C and a point at infinity denoted by 0. The neutral element of G is 0 and the inverse of a point P=(x, y) is $-P=(x, x+y)$. The addition of two points is defined by $$P = (x,y) = P_1 + P_2 = \quad (1a)$$

$$\begin{cases} \text{if } P_1 = 0: \\ P_2 \\ \text{if } P_2 = 0: \\ P_1 \\ \text{if } P_1 \neq P_2, P_1 \neq -P_2: \\ x = \left(\frac{y_1 + y_2}{x_1 + x_2}\right)^2 + \left(\frac{y_1 + y_2}{x_1 + x_2}\right) + a + x_1 + x_2 \\ y = \left(\frac{y_1 + y_2}{x_1 + x_2}\right)*(x_1 + x) + x + y_1 \\ \text{if } P_1 \neq P_2, P_1 = -P_2: \quad (1b) \\ P = 0 \\ \text{if } P_1 = P_2, x_1 \neq 0: \quad (1c) \\ x = x_1^2 + \frac{b}{x_1^2} \\ y = x_1^2 + \left(x_1 + \frac{y_1}{x_1}\right)*x + x \\ \text{if } P_1 = P_2, x_1 = 0: \quad (1d) \\ P = 0 \end{cases}$$

Cases (1a) and (1b) describe a point addition and cases (1c) and (1d) describe a point doubling. For a point P in G and a positive integer k, the point multiplication kP is defined by adding P (k−1) times to itself, e.g. 4P=P+P+P+P. One suitable algorithm to efficiently compute point multiplications is Montgomery's point multiplication algorithm using projective coordinates. That algorithm allows for simple implementations in both hardware and software. It avoids expensive divisions by representing affine point coordinates (x,y) as projective triples (X,Y,Z) with x=X/Z and y=Y/Z. In addition, it reduces the number of arithmetic operations by only computing the x-coordinate of intermediate points. Hardware implementations can exploit the fact that most multiplications can be executed in parallel to squarings or additions. Using projective coordinate representation, Montgomery point multiplication requires $6\lfloor\log_2(k)\rfloor+9$ multiplications, $5\lfloor\log_2(k)\rfloor+3$ squarings, $3\lfloor\log_2(k)\rfloor+7$ additions and 1 division.

Elliptic curve cryptography over finite fields is based on modular addition, subtraction, multiplication, squaring and division. These operations are specific to the underlying field. The notation $GF(2^m)$ is used herein for an element of a set of binary polynomial fields that have a common definition of field addition and multiplication. Each individual field is an extension field of $GF(2)=(\{0,1\},+,*)$ and can be characterized by its irreducible (prime) polynomial $$M = t^m + t^k + \left(\sum_{j=1}^{k-1} M_j t^j\right) + 1, M_j \in GF(2), 1 \leq k < m.$$

M is of degree m, which is also referred to as the field degree. Note that while an irreducible polynomial M defines the field degree m, there can be different irreducible polynomials of the same field degree. Elements of a field $GF(2^m)$ are binary polynomials of degree less than m. The elements of the field can be represented using different bases such as polynomial basis and normal basis. With polynomial basis, a polynomial in reduced canonical representation a $\in GF(2^m)$ can be written as $a=a_{m-1}t^{m-1}+a_{m-2}t^{m-2}+\ldots+a_1t+a_0$. The coefficients $a_i$ are elements of GF(2), i.e., they can be either 0 or 1. For efficient computation, polynomials can be stored as bit strings representing their coefficients $(a_{m-1}a_{m-2}\ldots a_1a_0)$.

The field addition of two elements a; b $\in GF(2^m)$ is defined as the sum of the two polynomials obtained by adding the coefficients, i.e. $c=a+b=(a_{m-1}+b_{m-1})t^{m-1}+(a_{m-2}+b_{m-2})t^{m-2}+\ldots+(a_1+b_1)t+(a_{0+b0})$. The addition of two coefficients $a_i+b_i$ corresponds to a logical XOR and can be implemented efficiently in both software and hardware. Since every element is identical to its additive inverse, subtraction is identical to addition.

Field multiplication of two elements a,b $\in GF(2^m)$ is carried out in two steps. First, the operands are multiplied using polynomial multiplication resulting in $$c_0 = a*b = c_{0,2(m-1)}t^{2(m-1)} + c_{0,2(m-1)-1}t^{2(m-1)-1} + \ldots + c_{0,1}t + c_{0,0}$$

of degree less than 2m−1, i.e., $\deg(c_0)<2m-1$. The coefficients of $c_0$ are calculated through convolution of a and b $$c_{0,i} = \sum_{k=0}^{i} a_k b_{i-k}$$

Note that $c_0$ may not be in reduced canonical representation since its degree may be greater than m−1. In the second step, $c_0$ is reduced by the irreducible polynomial M to a polynomial of less than the field degree m. The reduced result, $c \equiv c_0$ mod M, c $\in GF(2^m)$, is defined as the residue of the polynomial division of $c_0$ by M.

The first step of a squaring operation, which is a special case of polynomial multiplication, does not require a full multiplication since all mixed terms $c_{0,i}c_{0,j}t^k$, $k=1\ldots 2(m-1)$, $k=i+j$, $i\neq j$ occur twice canceling each other out. Therefore, the square of a polynomial $a \in GF(2^m)$, $a^2=a_{m-1}t^{2(m-1)}+a_{m-2}t^{2(m-2)}+\ldots+a_1t^2+a_0$ can be compute by inserting zeros into the corresponding bit string. For example, squaring $(t^3+t^2+t+1)$ results in $(1111)^2=1010101$.

Division $$\frac{a}{b}, a, b \in GF(2^m)$$

is defined as a multiplication of the dividend a with the multiplicative inverse of the divisor b.

Field multiplication and squaring operations require reduction by an irreducible polynomial M. Rather than computing a full polynomial division, reduction can be done by executing a sequence of polynomial multiplications and additions based on the congruency $$u \equiv u+kM \bmod M \quad (1)$$

Note that u and k can be arbitrary polynomials over GF(2) and do not have to be in reduced canonical representation. A special case of Equation (1), used for reduction, is $$t^m \equiv M-t^m \bmod M \quad (2)$$

Reduction of a product $c_0=a*b$, $a, b \in GF(2^m)$, can be computed iteratively as follows. Since the degree of $c_0$ is less than $2m-1$, $c_0$ can be split up into two polynomials $c_{0,h}$ and $c_{0,l}$ with $\deg(c_{0,h})<m-1$, $\deg(c_{0,l})<m$ such that $$c_0=a*b=c_{0,h}*t^m+c_{0,l} \quad (3)$$

Using (2), the following congruency is obvious $$c_1=c_{0,h}*(M-t^m)+c_{0,l} \equiv c_0 \bmod M \quad (4)$$

Given that $\deg(c_{0,h})<m-1$ and $\deg(M-t^m)<m$, it follows that $\deg(c_1)<2m-2$. By iteratively splitting up $c_j$ into polynomials $c_{j,h}$ and $c_{j,l}$ such that $$c_{j+1}=c_{j,h}*(M-t^m)+c_{j,l} \quad (5)$$

until $$c_{j,h}=0 \quad (6)$$

the reduced result $c=c_i$ can be computed in a maximum of $i \leq m-1$ reduction iterations. The minimum number of required iterations depends on the second highest term of the irreducible polynomial M. For $$M = t^m + t^k + \left(\sum_{j=1}^{k-1} M_j t^j\right) + 1, 1 \leq k < m \quad (7)$$

it follows that a better upper bound for $\deg(c_1)$ is $\deg(c_1)<m+k-1$. Applying (5), $\deg(c_j)$ gradually decreases such that $$\deg(c_{j+1,h}) = \begin{cases} \text{if } \deg(c_{j,h}) > m-k: \\ \deg(c_{j,h})+k-m \\ \text{if } \deg(c_{j,h}) \leq m-k: \\ 0 \end{cases} \quad (8)$$

The minimum number of iterations i is given by $$m - 1 - i(m - k) \leq 0 \Leftrightarrow, i \geq \left\lceil \frac{m-1}{m-k} \right\rceil \quad (9)$$

To enable efficient implementations, M is often chosen to be either a trinomial $M_t$ or pentanomial $M_p$:

$$M_t=t^m+t^{k3}+1$$

$$M_p=t^m+t^{k3}+t^{k2}+t^{k1}+1$$

$$m>k_3>k_2>k_1>1$$

Choosing M such that $$k_3 < \frac{m+1}{2}$$

apparently limits the number of reduction iterations to two. This is the case for all irreducible polynomials recommended by NIST and SECG. Furthermore, the multiplications $c_{j,h}*(M-t^m)$ can be optimized if $(M-t^m)$ is a constant sparse polynomial.

Figure 13:
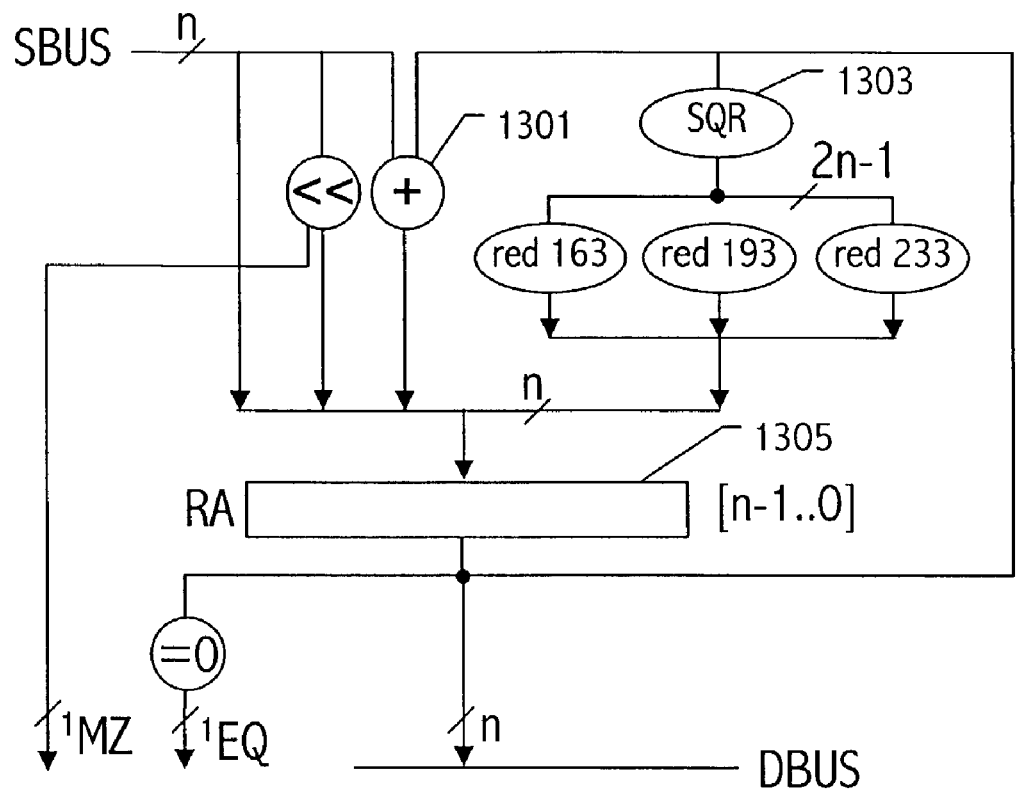
FIG. 13 illustrates an arithmetic logic unit for squaring, additions, and shifting.

Now that some of the underlying mathematics has been presented, the additional details can be presented about the arithmetic units. The ALU 209 (FIG. 2A) is shown in an exemplary embodiment in more detail in FIG. 13. The ALU 209 implements the two arithmetic instructions ADD and SQR and the logic instruction shift left (SL). The ADD logic 1301 may be implemented as a bit-wise XOR of the two source operands. The SQR operation implemented in squarer logic 1303 requires the insertion of zeroes between the bits of the source operand and the subsequent reduction of the expanded source operand. In the implementation illustrated in FIG. 13, the ALU implements squaring with hardwired reduction, described further herein, for field degrees of 163, 193, and 233, with corresponding irreducible polynomials of $t^{163}+t^7+t^3+1$, $t^{193}+t^{15}+1$, and $t^{233}+t^{74}+1$, respectively. Other embodiments may implement hardwired reduction for additional (or fewer) named curves, which may have different field degrees and different irreducible polynomials. To execute squaring, the operand is first loaded into register RA 1305. Next, squaring, including reduction is executed in a single clock cycle and the result is stored back into register RA 1305. Addition of two operands is executed by loading the first operand into RA and XORing it with the second operand. A shift left is performed by loading RA with a left-shifted version of the operand. The ALU also sets the EQ flag if the result of the operation is zero and it sets the MZ flag if the MSB of the operand of the shift left is zero. EQ and MZ are used by the branch instructions BEQ and BMZ, respectively, described previously.

As described above, the multiplication function takes two elements X(t) and Y(t) as inputs and generates an element P(t) of $GF(2^m)$ as an output. The modular multiplication includes a polynomial multiplication and a polynomial modulo operation. The polynomial modulo operation Z(t) mod M(t) is defined as the residue of the polynomial division Z(t) by M(t). The modulo operation is also referred to herein as a reduction operation. The product Z(t) of X(t) and Y(t) is a polynomial of degree less than 2m-1. The reduction reduces Z(t) by the irreducible polynomial M(t) to polynomial P(t). M(t) is a polynomial of degree m.

FIG. 14 illustrates polynomial multiplication using a serial shift-and-add algorithm. It takes m iterations to calculate the product. In the example shown in FIG. 14, m=4. The polynomials used in the example are $X(t)=t^3+t+1$ (X is represented as the binary string 1 0 1 1) and $Y(t)=t^3+1$ (Y is represented as the binary string 1 0 0 1). The pseudo code for the shift and add operation is as follows:

```
Z := 0;   (* initialize Z to 0*)
for I := 0 to m−1 do
```

-continued

```
Z := shift_right(Z) + shift_left(X[0]*Y,m-1);
X := shift_right(X);
```

Referring to the pseudocode above and FIG. 14, first Z is initialized to 0. An iteration includes testing the LSB of X and, if the bit is a "1", adding Y to the right-shifted version of Z. An iteration ends with shifting X to the right. For polynomial fields, the addition operation is defined as a bit-wise XOR of the operands. Considering a hardware implementation, one iteration typically corresponds to one clock cycle. The result is $Z(t)=t^6+t^4+t+1$.

FIG. 15 illustrates how modular reduction of the multiplication result Z is performed. First $Z_h$ is multiplied by M' where $Z_h$ represents the terms of $Z(t)$ of degree$\geq$m and M' represents the irreducible polynomial $M(t)-t^m$. Next the result is added to $Z_1$ where $Z_1$ represents the terms of $Z(t)$ of degree<m. The outlined procedure of adding $Z_h*M'$ is repeated until $Z_h=0$. In the illustrated example $Z(t)=t^6+t^4+t+1$. Thus, Z is represented as 1010011. $M(t)=t^4+t^3+1$. Thus M is represented as the digital string 11001. $M'=M(t)-t^m=t^3+1$. Thus, M' is represented as the digital string 1001. The reduced result $P(t)=t^2+1$. The example of the reduction shown in FIG. 15 requires m−1=3 iterations. The pseudo code for the operation is shown below:

```
while Z_h ≠ 0 do
    Z := Z_l + Z_h * M';
```

Figure 16:
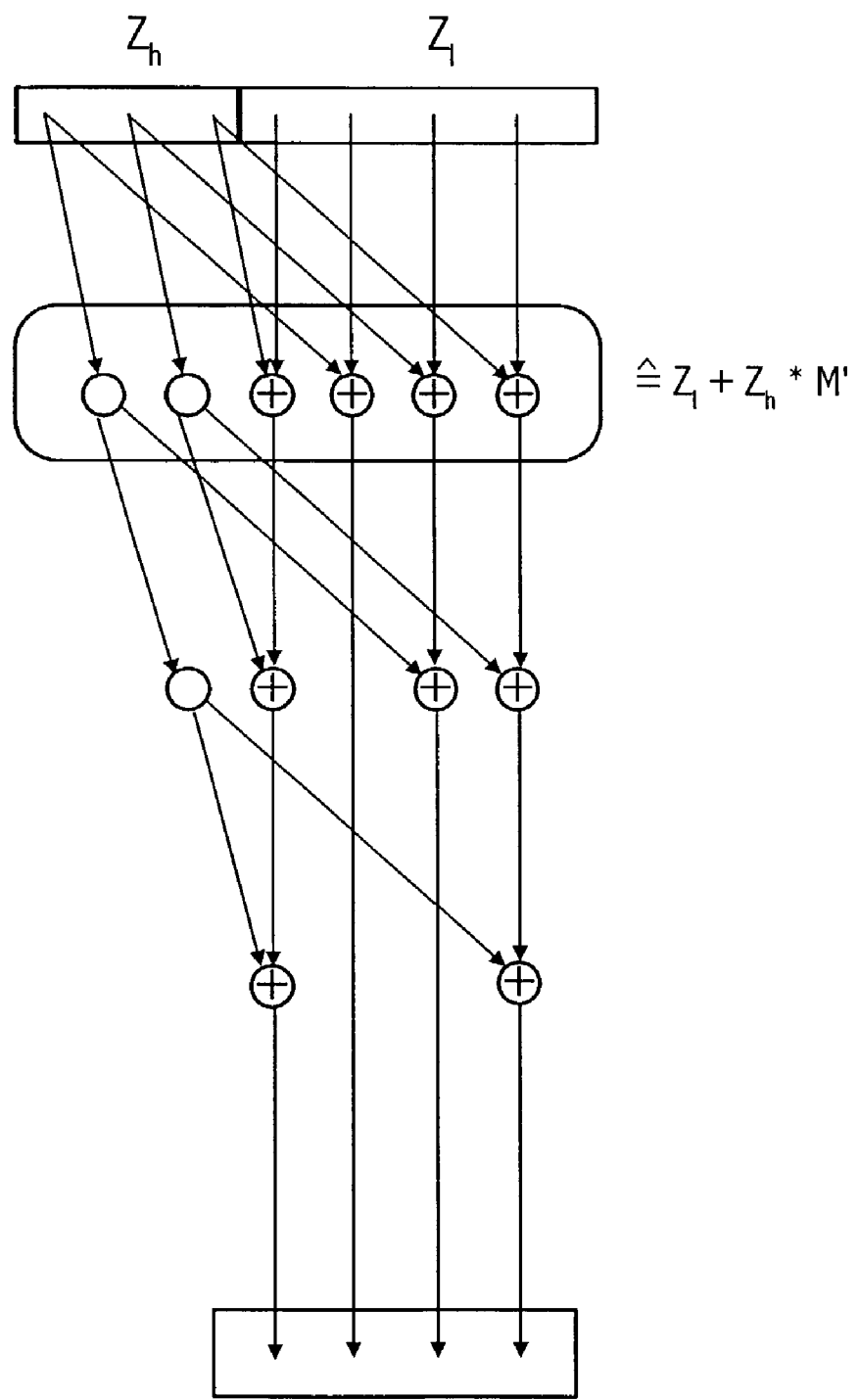
FIG. 16 illustrates an example of hardwired reduction.

While the reduction can be implemented with the help of a general-purpose multiplier that calculates $Z_h *M'$, it is also possible to hardwire the reduction by treating M' as a constant. This is shown in FIG. 16. An iteration of the reduction is performed by adding a shifted version of $Z_h$ to $Z_l$ whenever the corresponding bit of M' is a 1. Since M'(t) typically contains only a few terms represented by 1s, the number of additions needed is small.

Figures 30, 31:
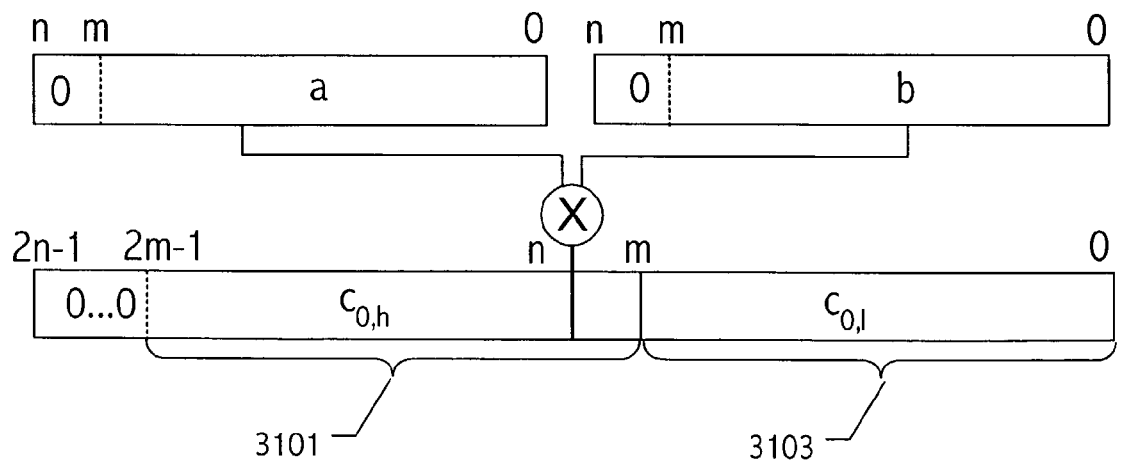
FIG. 30 illustrates a reduction iteration for a pentanomial.
FIG. 31 illustrates a result of a multiplication for arbitrary curves that requires reduction.

To efficiently support ECC in hardware, $GF(2^m)$ arithmetic needs to be implemented for large operands. Design choices depend on the number of supported elliptic curves and irreducible polynomials. For a single field $GF(2^m)$ with a given field degree m and a given irreducible polynomial M, the reduction steps of field multiplications and squarings can be optimized. Choosing M as a trinomial or pentanomial reduces the cost of reduction from a full multiplication to two additions per iteration for a trinomial, and four additions per iteration for a pentanomial. An example of a reduction iteration for a pentanomial $M_p=t^m+t^{k3}+t^{k2}+t^{k1}+1$ is shown in FIG. 30. The simplified multiplication typically allows for implementing circuitry that can perform reduction in a single clock cycle as illustrated in FIG. 16. After multiplying, the result is reduced to a congruent polynomial $c \in GF(2^m)$.

The serial shift-and-add algorithms take as many iterations as there are bits in the operands. The number of iterations can be reduced by considering more than one bit per iteration. The number of bits examined during an iteration is the digit size d. This way, the number of iterations needed is reduced to $\lceil m/d \rceil$.

Figure 17:
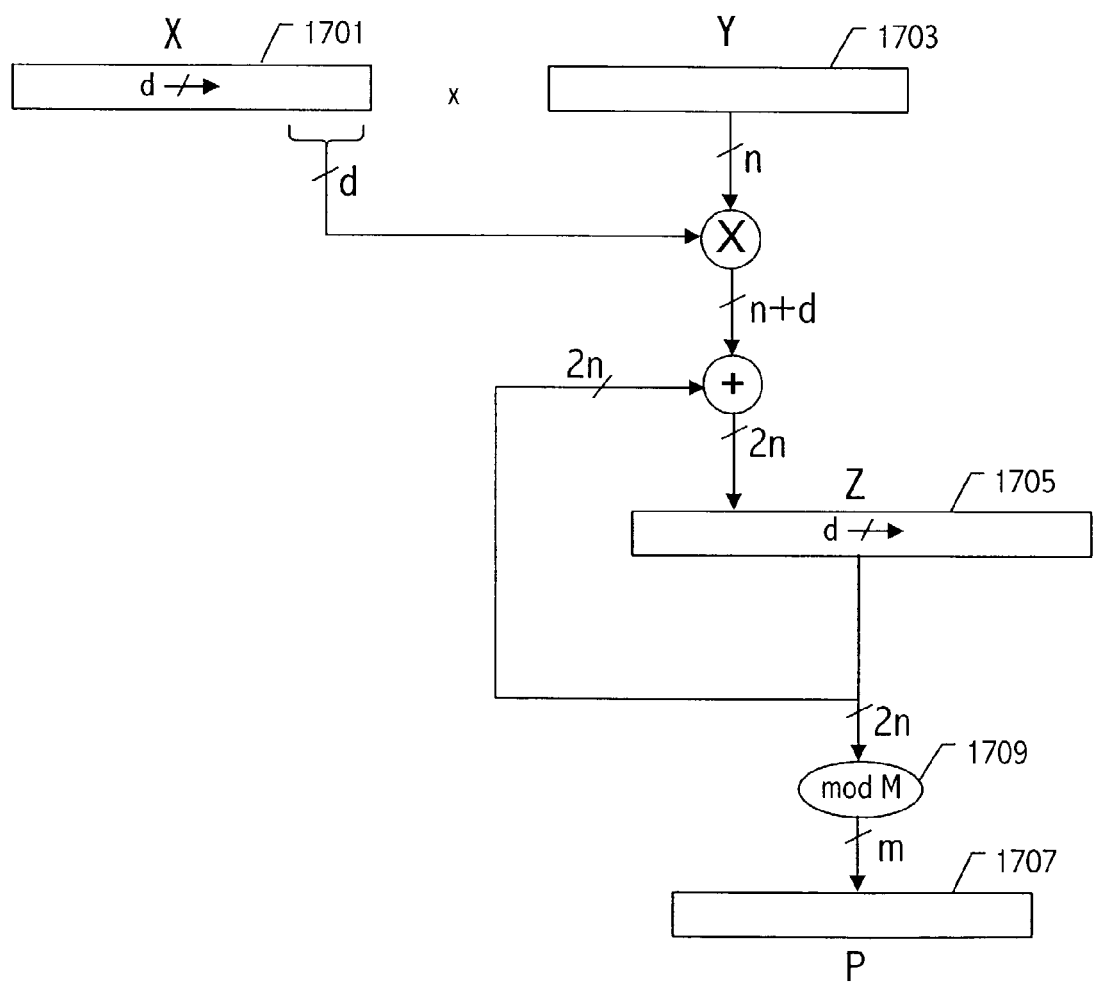
FIG. 17 shows a block diagram of a circuit performing modular multiplication with digit size d.

FIG. 17 shows a block diagram of a circuit performing modular multiplication with digit size d. The circuit includes registers 1701, 1703, 1705, and 1707 holding respectively X, Y, Z, and P. Registers 1701 and 1703 are n bits wide and register Z (1705) holding the multiplication result X*Y is 2n bits wide. Register P (1707) holding the reduced result is n bits wide where n>m. That is, rather than customizing the multiplier for a given field degree m, the modular multiplier circuit allows for performing modular multiplications for any field degree m <n.

The pseudo code for operation of the modular multiplier shown in FIG. 17 is as follows:

```
Z := 0;
for I := 0 to (n/d)−1 do
    Z := shift_right(Z, d) + shift_left(X[d−1..0]*Y,n−d);
    X := shift_right(X, d);
P := Z mod M;
```

The for loop takes n/d cycles while the modular reduction step takes 1 cycle. It is assumed that n is a multiple of d. Looking at an iteration, the d low-order bits of X are examined, and for each bit set to 1 the correspondingly shifted version of Y is added to Z. After n/d clock cycles, register Z contains the multiplication result. Once Z is calculated, a reduction is performed by the reduction logic 1709 and the result is stored in register P.

Figure 18:
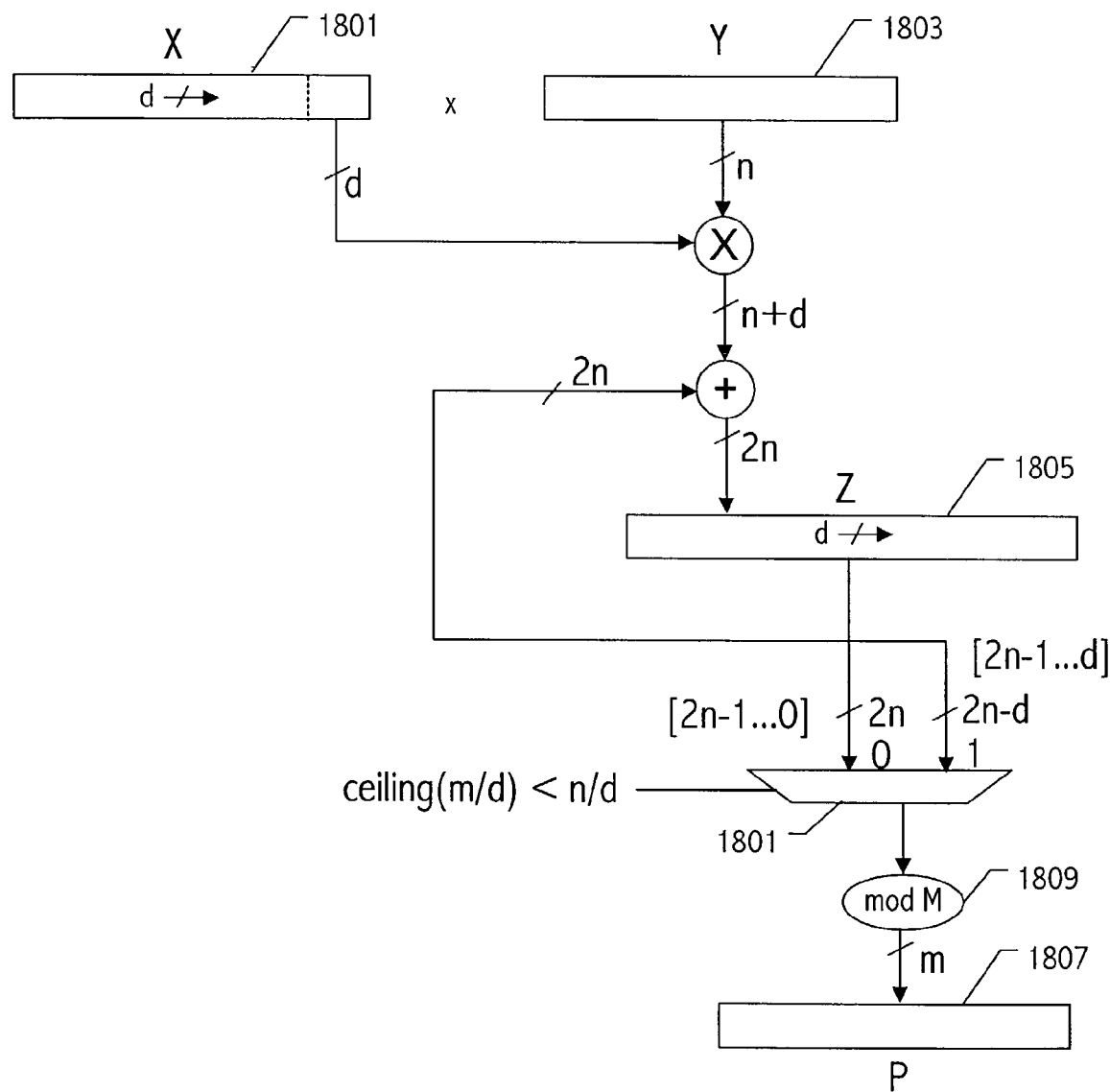
FIG. 18 illustrates a multiplier shown in FIG. 17 optimized by considering the field size.

Referring now to FIG. 18, the execution time of the multiplier shown in FIG. 17 can also be improved by considering the field size. If the field degree m is significantly smaller than n such that the high order digits contain only 0s, there is no need to execute all n/d iterations. That is, the number of iterations required to calculate the product is ceiling m/d ($\lceil m/d \rceil$). The modular multiplier circuit illustrated in FIG. 18 saves iterations if m<n−d. The pseudo code for the operation of the modular multiplier illustrated in FIG. 18 is as follows:

```
Z := 0;
for I := 0 to ceiling(m/d) − 1 do
    Z := shift_right(Z,d) + shift_left(X[d−1..0] * Y, n−d);
    X := shift_right (X, d);
if (ceiling(m/d) < n/d) then
    Z := shift_right (Z, n−(ceiling(m/d) * d));
P := Z mod M;
```

Applied to the modular multiplier circuit illustrated in FIG. 17, three iterations are needed for m=113, 131, 163 and four iterations are needed for m=193, 233, and 239. Note that an additional shift operation is needed if less than n/d iterations are performed. The illustrated modular multiplier circuit in FIG. 18 implements the extra shift operation utilizing multiplexer 1801 coupled to the output of register Z (1805). If $\lceil m/d \rceil$<n/d then the extra shift operation is accomplished by selecting the bits [2n−1 ... d]. Otherwise the multiplexer 1801 selects the full 2n bit result. Note that while the illustrated modular multiplier requires n/d or (n/d−1) iterations, other embodiments might chose to further improve the number of iterations required for field degrees m<(n−ud) by performing only (n/d−u) iterations, where u=0 ... (n/d−1).

Figure 24:
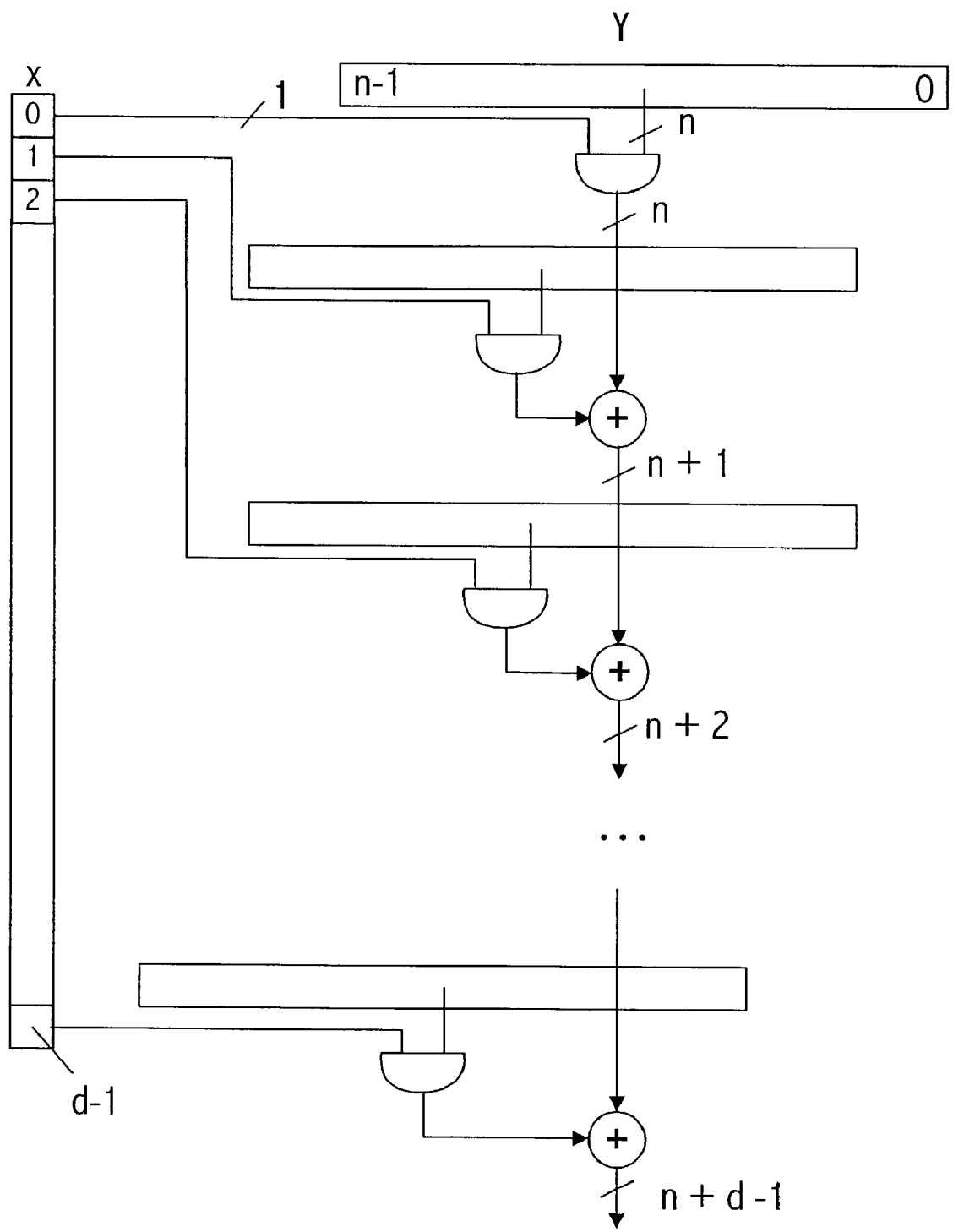
FIG. 24 illustrates how the partial product is calculated during a multiplication iteration of the modular multiplier illustrated in FIG. 18.

FIG. 24 illustrates how the partial product X[d−1 ... 0]*Y is calculated during a multiplication iteration of the modular multiplier illustrated in FIG. 18, which is obtained by applying the shift-and-add algorithm.

Figure 19:
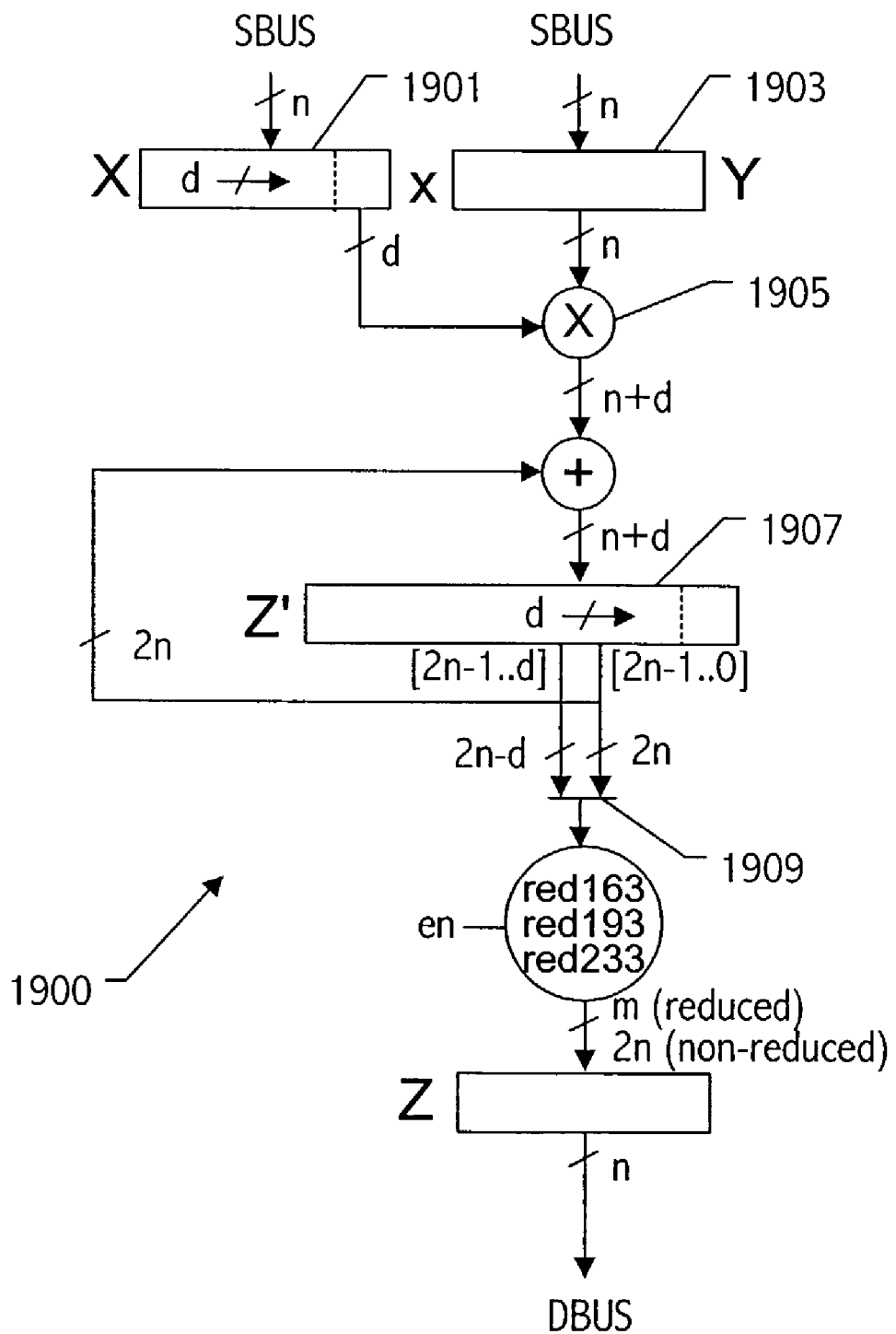
FIG. 19 illustrates a digit serial shift and add multiplier circuit that can be used with hardwired reduction.

Another exemplary multiplier circuit 1900 that supports hardwired reduction for multiple named curves is shown in FIG. 19, which illustrates a digit serial shift and add multiplier. The result is computed in two steps. First, the product of the polynomial multiplication is computed by iteratively multiplying a digit of operand X with Y, and accumulating the partial products in register Z' (1907). In the case of MUL, the product Z' is reduced by an irreducible polynomial $M_m$. In one embodiment, the input operands X and Y can have a size up to n=256 bits, and the reduced result $P=X*Y \mod M_m$ has a size of m=113, 131, 163, 193, 233, 239 bits according to the named curve. The digit size d in an exemplary embodiment is 64. Of course other digit sizes may be used. Note that the number of iterations needed to computer the product Z is four for a full 256 bit multiplication (digit size=64). The four iterations are only executed for m=193, 233, and 239, whereas three iterations are utilized for m=113, 163, and 131. However, for m=113, 131, and 163, a shift operation is missing in register Z'. Accordingly, a multiplexer 1909 selects the bits of Z' to be reduced according to the particular named curve being utilized. In the exemplary embodiment, the hardwired reduction takes another clock cycle. Note that in the case of MULNR, the reduction logic is disabled and bypassed, that is the 2n bit result in Z' is transferred into Z.

Figure 20:
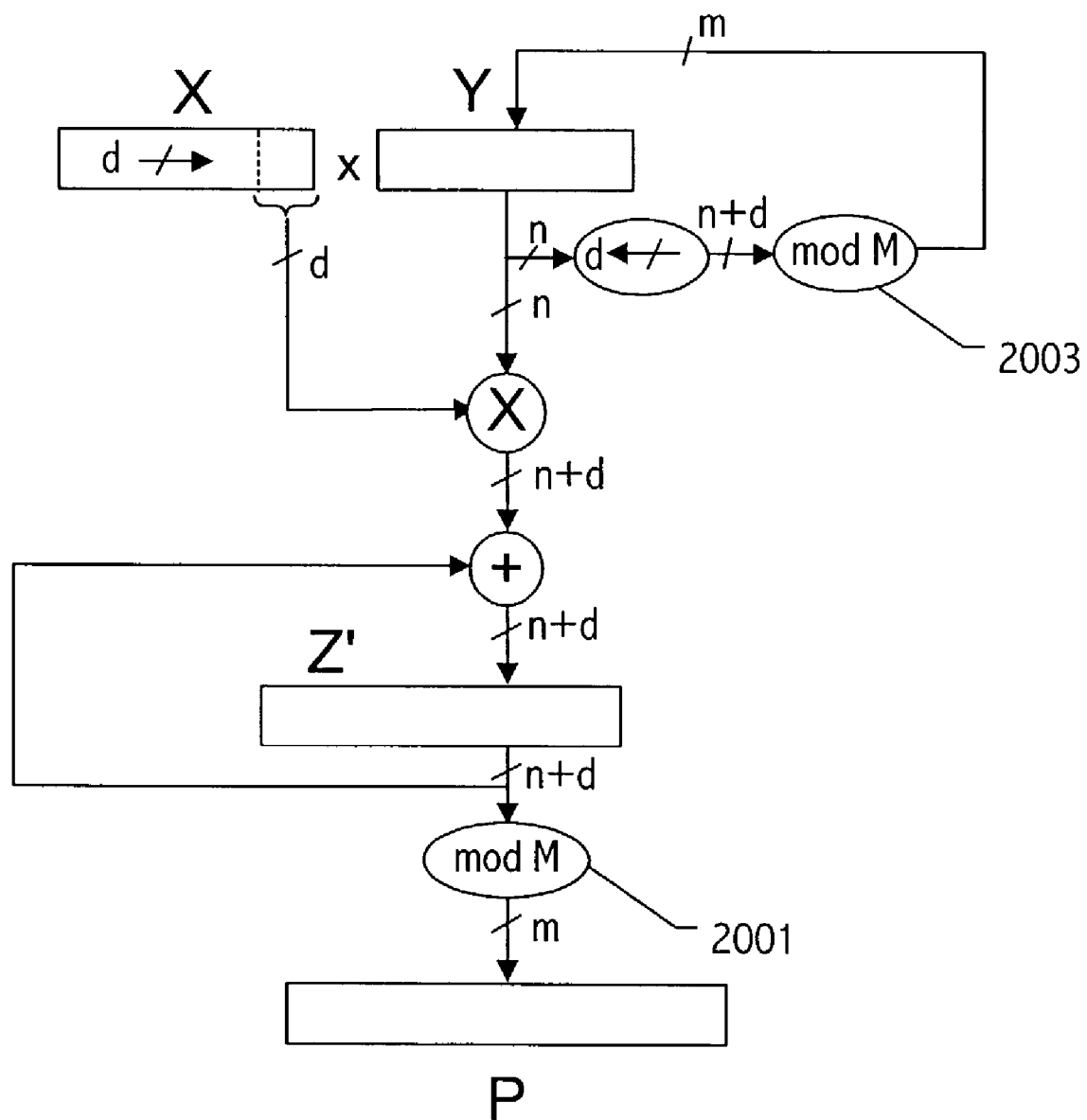
FIG. 20 illustrates an embodiment of an LSD modular multiplier.

FIG. 20 illustrates an embodiment of an LSD modular multiplier for field degrees <n. Similar to FIG. 18, the modular multiplier circuit is optimized such that only ceiling (m/d) iterations rather than n/d iterations are required. In FIG. 20, the optimization only requires the finite state machine controlling the multiplier to stop after ceiling (m/d) iterations. There is no additional multiplexer needed as was the case for the modular multiplier circuit illustrated in FIG. 18. Given two polynomials of field degree m, the irreducible polynomial M, digit size d, and operand size n, the multiplication result Z using a least significant digit (LSD) multiplier such as shown in FIG. 20, is obtained according to the following pseudo code:

```
Z' := 0;
for  I := 0 to ceiling (m/d) –1 do
    Z' := Z' + X[d–1..0] * Y;
    Y := shift_left (Y, d) mod M;
    X := shift_right (X, d);
P : = Z' mod M;
```

In each iteration, the following computation steps are performed: (i) the least significant digit (LSD) of X is multiplied with Y; (ii) X is shifted to the right by d bits; (iii) Y is shifted to the left by d bits and subsequently reduced. After ⌈m/d⌉ iterations have been performed, one more step is needed to obtain the result P by reducing the accumulated value Z'. Note that two reduction circuits 2001 and 2003 are utilized in the embodiment shown in FIG. 20.

The least significant digit (LSD) multiplier is attractive since it limits the size of the register used to accumulate the partial product to n+d bits. Thus, this type of multiplier is particularly interesting for small d's in that the size of the register is approximately n bits rather than approximately 2n bits. The following equation describes the underlying math for LSD multiplication for d=1.

$$X(t)*Y(t) \bmod M = \underbrace{\left(\sum_{i=0}^{m} X_i t^i * Y(t)\right)}_{Z(t)} \bmod M$$

$$= \underbrace{\left(\sum_{i=0}^{m} X_i^* (Y(t)*t^i \bmod M)\right)}_{Z'(t)} \bmod M$$

$$= \sum_{i=0}^{m} \underbrace{(X_i (Y(t)*t^i \bmod M)) \bmod M}_{Z''(t)}$$

Figure 21:
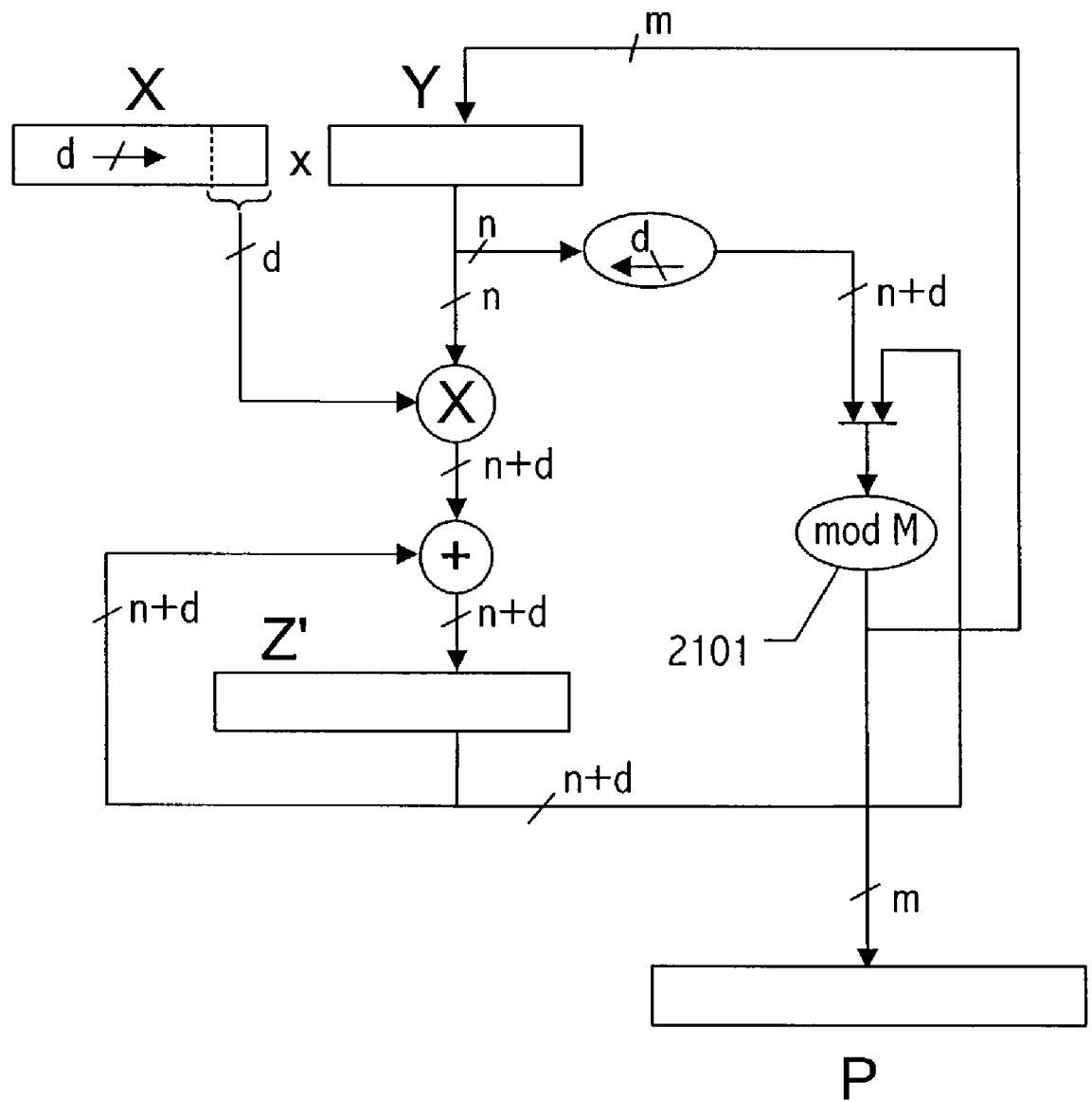
FIG. 21 illustrates an embodiment of an LSD modular multiplier circuit with shared reduction logic.

FIG. 21 illustrates another embodiment of an LSD modular multiplier circuit. In the illustrated embodiment, a single reduction circuit, 2101 is used to calculate (shift_left (Y,d) mod M) and (Z' mod M). Calculating the reductions at different times allows the single reduction circuit to be used for both reductions.

Figure 22:
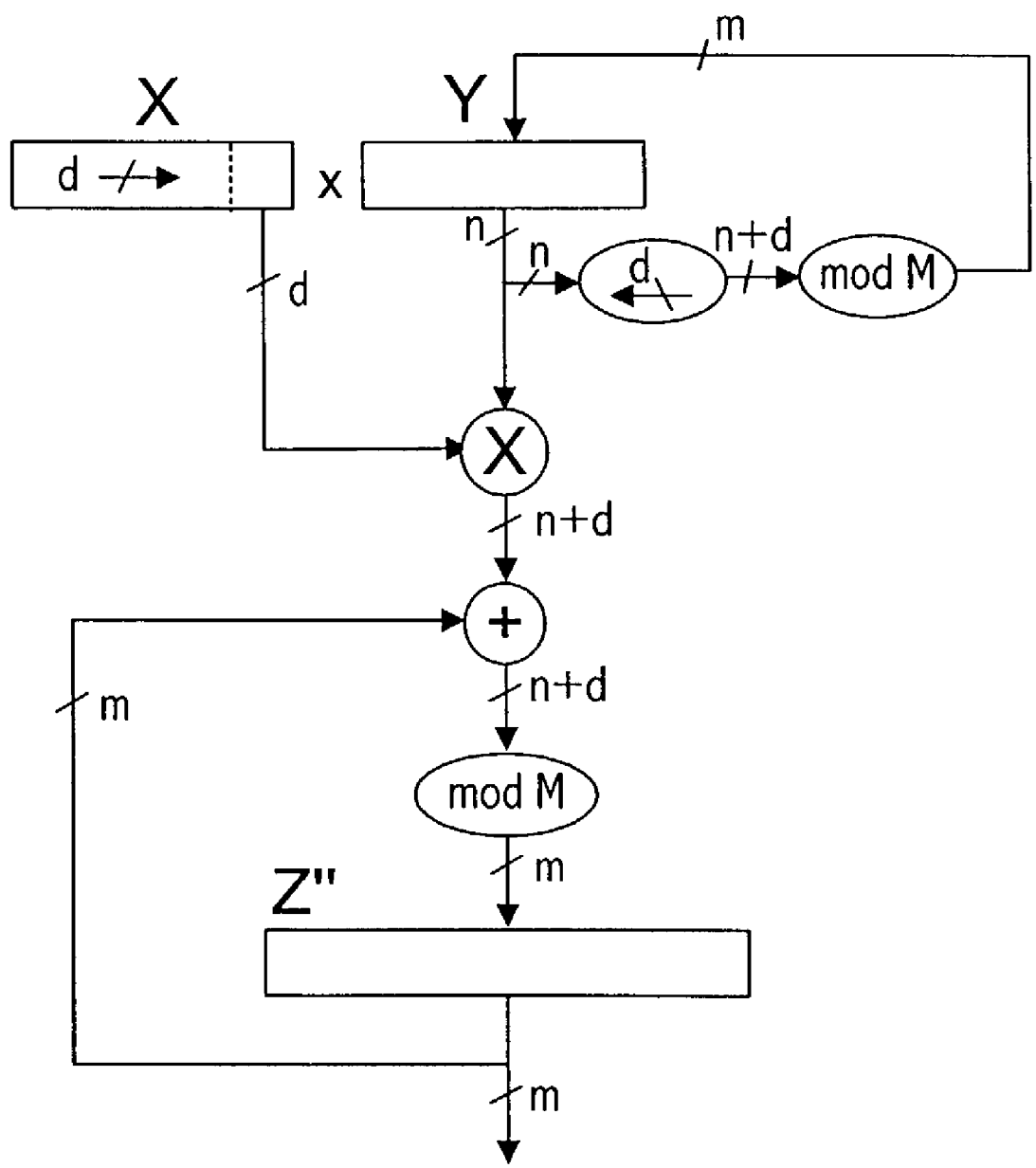
FIG. 22 illustrates another embodiment of a modular multiplier circuit.

FIG. 22 illustrates another embodiment of a modular multiplier circuit in which the final reduction is moved into the cycle performing a multiplication iteration. While this makes the critical path longer, it reduces the overall execution time to ceiling (m/d) cycles. The pseudo code illustrating operation of the circuit in FIG. 22 is as follows:

```
Z" := 0;
for  I := 0 to ceiling (m/d) –1 do
    Z" := (Z" + X[d–1..0] * Y) mod M;
    Y := shift_left(Y, d) mod M;
    X := shift_right (X, d);
```

In one embodiment, the modular multiplier can handle different field degrees as part of a hardware accelerator. The multiplier width in one embodiment is n=256 and the hardwired reduction circuit can handle in an exemplary embodiment field degrees of m=113, 131, 163, 193, 233 and 239. Since the irreducible polynomial M is different for each field, the hardwired reduction circuit supporting those field degrees is more complicated than the reduction circuit 1709 illustrated in FIG. 17 since that circuit only supported a single field degree. More specifically, different versions of $Z_h*M$ need to be calculated and subtracted from Z based on the field-specific M in a hardwired reduction circuit supporting multiple field degrees.

Figure 23:
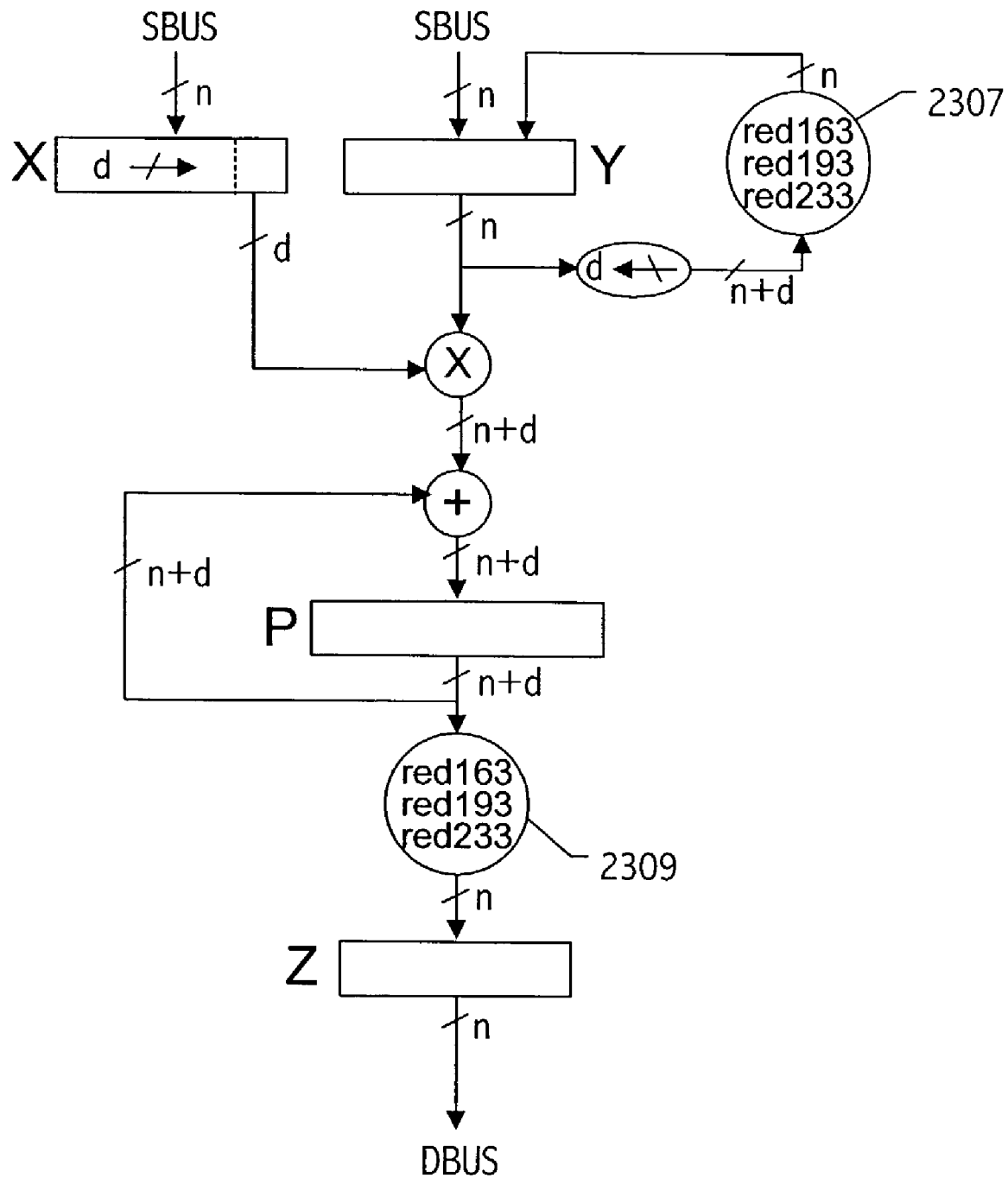
FIG. 23 shows a block diagram of an LSD multiplier supporting hardwired reduction for multiple named curves.

In one embodiment, the LSD multiplier supports different field degrees m≦n. FIG. 23 shows a block diagram of an LSD multiplier, similar to the one shown in FIG. 20, that supports hardwired reduction for multiple named curves of field degrees 163, 193, and 233. As this implementation shows, all three computation steps of an iteration and, in particular, the multiplication and the reduction operations can be performed in parallel. Thus, the synchronous circuit shown requires ⌈m/d⌉+1 clock cycles to perform the modular multiplication. The embodiment illustrated in FIG. 23 utilizes two reduction circuits 2307 and 2309. Reduction circuit 2307 functions to reduce Y and reduction circuit 2309 functions to reduce P. Note that reduction circuits supporting different field degrees can also be applied to the embodiments illustrated in FIGS. 21 and 22.

Note that in the digit serial multiplication illustrated, the execution time of the multiplier can be decreased by increasing the digit size d. As d is increased, the number of resources needed to implement the d×n partial product generator increases. In one embodiment, with n=256 and d=64, it is the 64×256 partial product generator that uses the majority of the chip resources and, consequently, determines the size of the implementation.

Figure 25:
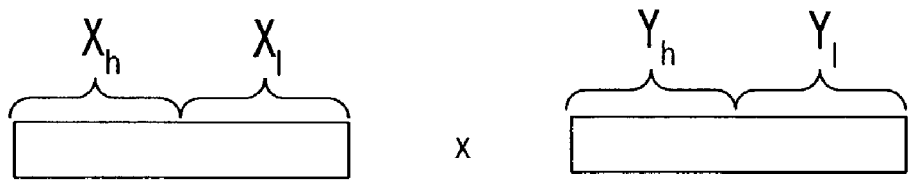
FIG. 25 illustrates an alternative way to calculate partial products by applying the Karatsuba algorithm.

FIG. 25 illustrates an alternative way to calculate partial products by applying the Karatsuba algorithm. While the Karatsuba method was originally proposed for integer multiplication, it is here applied to binary polynomials. While traditional long-word arithmetic requires the calculation of four partial products $X_h*Y_h$, $X_h*Y_l$, $X_l*Y_h$, $X_l*Y_l$, utilizing the Karatsuba algorithm only requires the calculation of three partial products $X_h*Y_h$, $X_l*Y_l$, and $(X_h-X_l)*(Y_h-Y_l)$ and addition/subtraction operations. Thus, the Karatsuba algorithm reduces the number of multiplications from 4 to 3. Reducing the number of multiplication operations is attractive if multiplications are more costly than additions and subtractions. The Karatsuba algorithm can be applied recursively, that is, each one of the three partial products can be computed again by applying the Karatsuba algorithm.

Similar to the shift-and-add algorithm, the Karatsuba algorithm can be serialized as well. The serialization can be done in different ways as shown in the embodiments illustrated in FIGS. 26 and 27. FIG. 26 illustrates use of the Karatsuba algorithm to calculate the 64 bit by 256 bit multiplication shown, e.g., in FIGS. 17 and 18. In the example, X[d−1 . . . 0] and Y[n−1 . . . 0] are being multiplied where n=256 and d=64. Each partial product X0*Y0, X0*Y1, X0*Y2, X0*Y3 is calculated by applying the method described in FIG. 25. Again the Karatsuba algorithm can be applied recursively in that each partial product P0, P1, P2, and P3 shown in FIG. 26 is obtained by applying the Karatsuba algorithm. The application of the Karatsuba algorithm to obtain one of the partial products P0, P1, P2, and P3 is illustrated in FIG. 26.

Figure 27A:
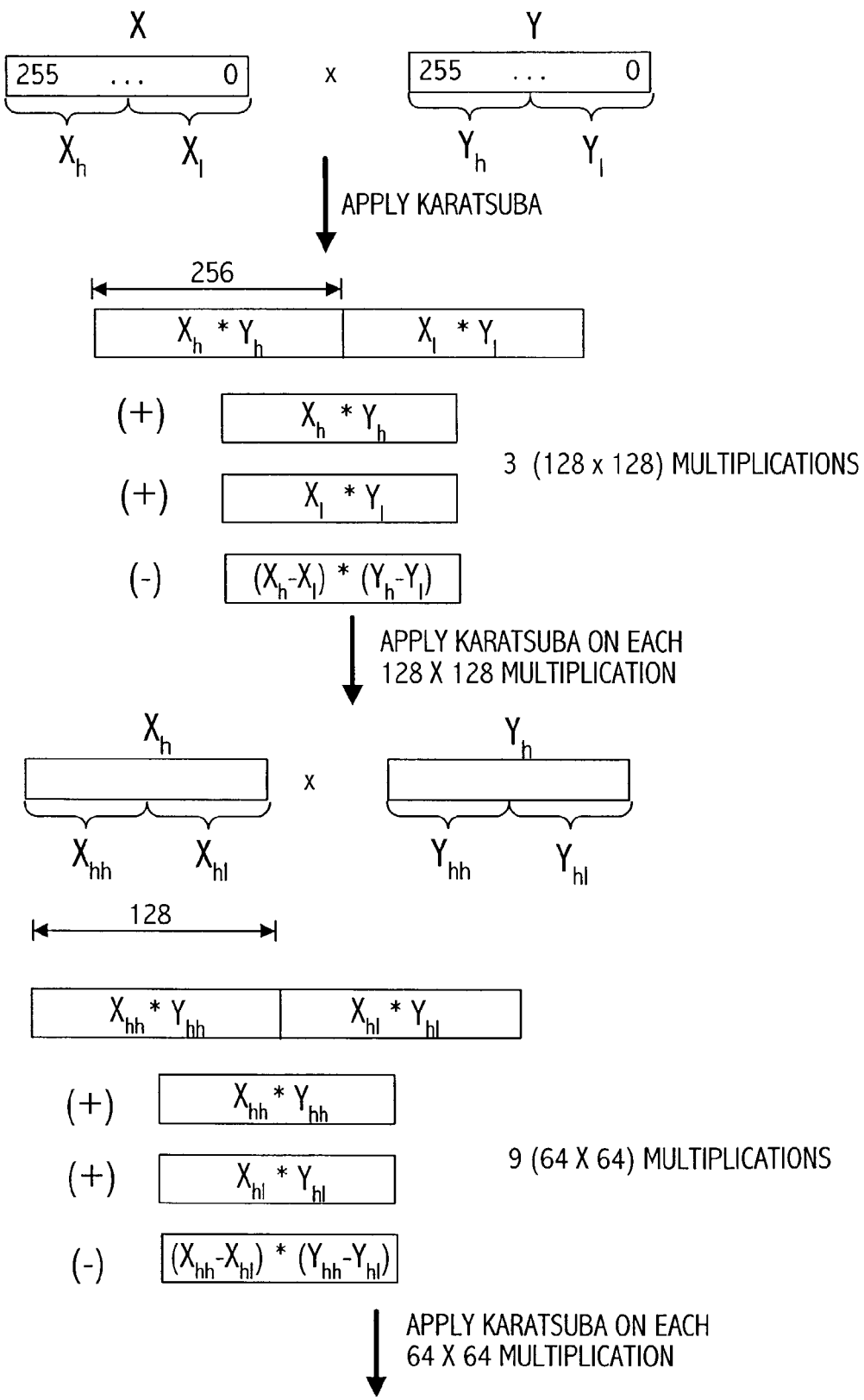
FIGS. 27A and 27B illustrate recursive application of the Karatsuba algorithm.
Figure 27B:
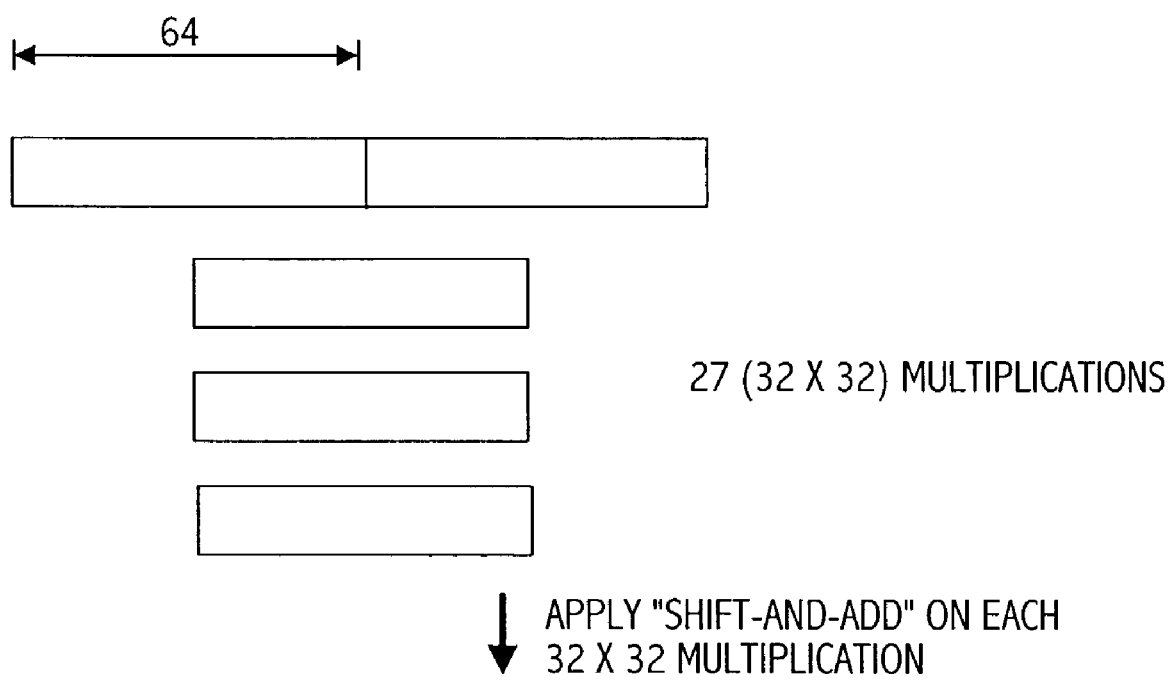
Figure 28:
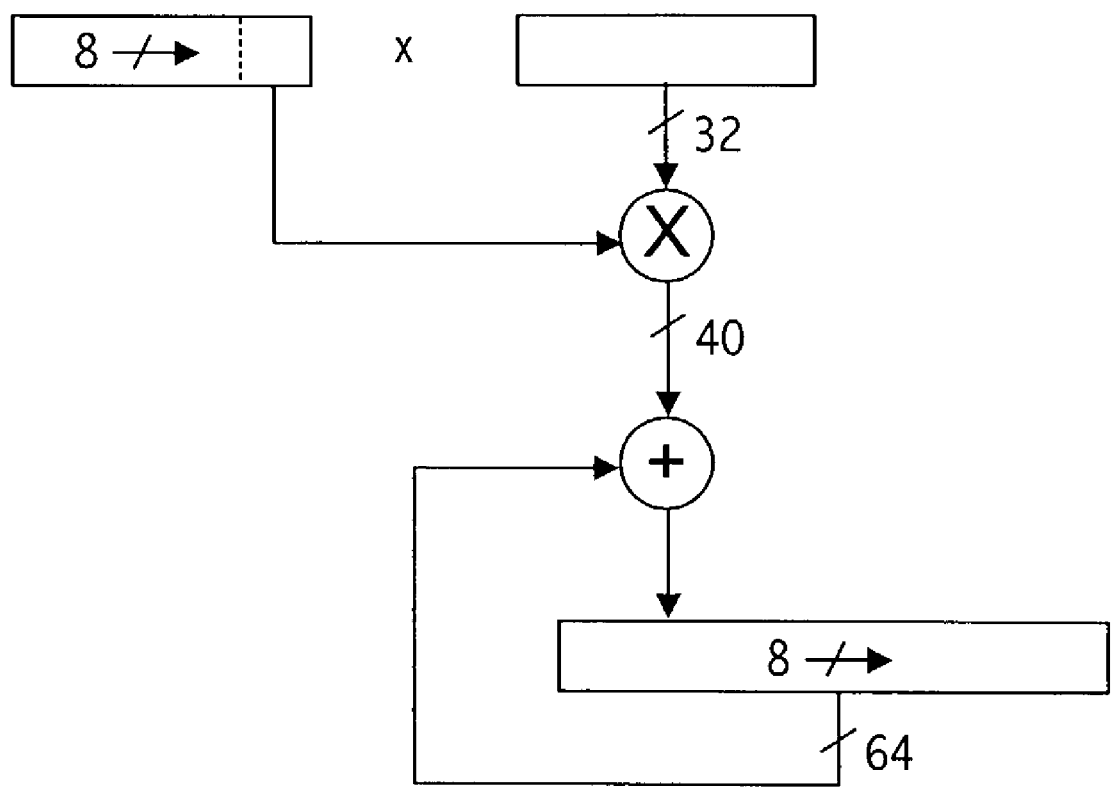
FIG. 28 illustrates a serial shift and add multiplier.

While FIG. 26 shows how to first serialize and then apply the Karatsuba algorithm, FIGS. 27A and 27B illustrate how to reverse the order of these operations. As illustrated in FIG. 27A, the 256 bit by 256 bit multiplication is recursively split up into smaller operand sizes up to the point where, in FIG. 27B, 32 bit by 32 bit multiplications need to be performed. In the example illustrated, there are 27 of these multiplications which are calculated by serially performing four 8 bit by 32 bit multiplications. The serial shift and add multiplier illustrated in FIG. 28 can be used to perform the 27 32 bit by 32 bit multiplications.

Figure 29:
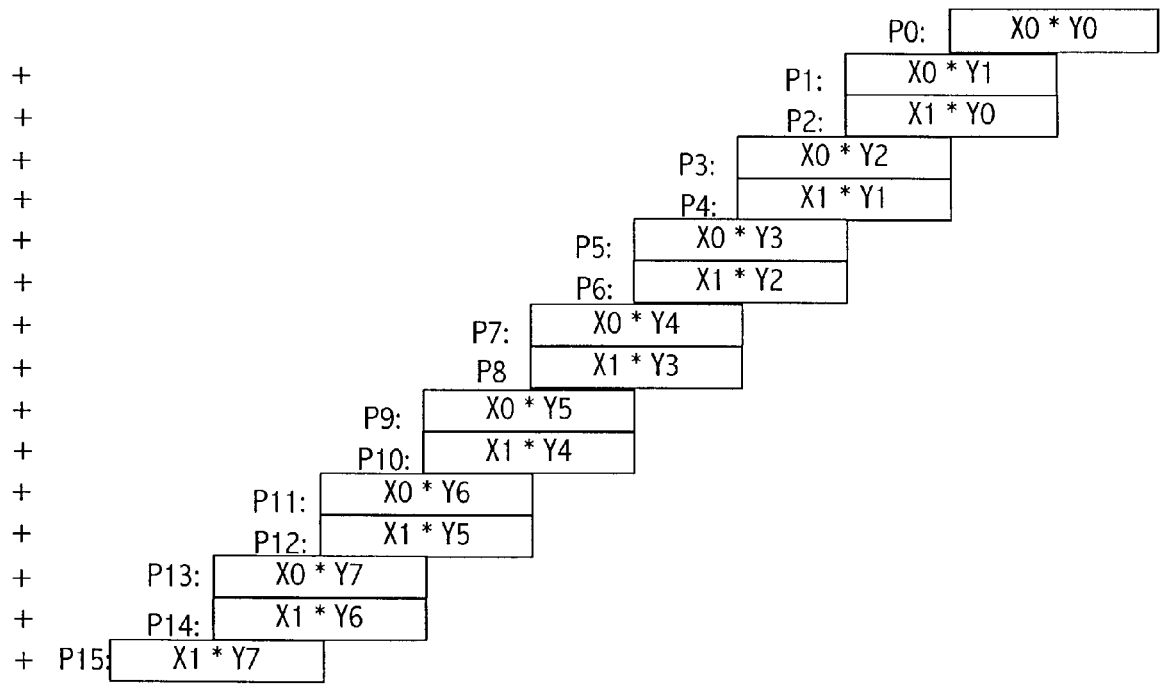
FIG. 29 shows another utilization of the Karatsuba algorithm.

The Karatsuba algorithm is attractive for use in the polynomial multiplications described herein because it reduces the bit complexity from order $n^2$ for the shift-and-and algorithm to order $n^{log3}$ with the log3 approximately 1.58. Note however, that bit complexity may have to be traded off against added complexity in wiring the modular multiplier circuit. The wiring irregularities can be partially avoided by applying standard long-word multiplication techniques at the "higher levels" and the Karatsuba algorithm at the "lower levels". Such an approach is illustrated in FIG. 29 in which standard long-word multiplication is used at the highest level. The example shown in FIG. 29 is a 64 bit×256 bit multiplication (X[d−1 . . . 0]*Y[n−1 . . . 0], where d=64 and n=256). The high level multiplication generates 16 partial products P0 through P15. The partial products P0 through P15 are generated using the Karatsuba algorithm.

The Karatsuba algorithm may be applied to the LSD multipliers shown, e.g., in FIG. 20 or to other of the MSD multipliers, described further herein. That is, the techniques illustrated in FIGS. 26 and 27A and 27B can be applied to the circuit of FIG. 20 or other LSD or MSD multipliers. Note that any combination of the techniques described herein including the Karatsuba algorithm, the shared reduction circuit and the combined multiplication/reduction iteration is possible.

In the case of squaring, both polynomial multiplication and reduction can typically be combined and executed in a single clock cycle. Since squaring only requires the insertion of zeros, no intermediate result $c_0$ needs to be computed making it possible to perform squaring and reduction in the same cycle.

For implementations of a small number of fields $GF(2^m)$ with given irreducible polynomials $\{M_1, M_2, \ldots, M_r\}$ it is a viable solution to add dedicated reduction logic for each irreducible polynomial as described in relation to, e.g., FIG. 16. Note that the register size n is chosen according to the largest field degree m. Depending on the underlying field, the appropriate reduction logic can be selected by a multiplexer.

While various embodiments shown above, e.g., in FIGS. 17-23, are suitable for utilization with named curves, in the case of arbitrary curves, however, M is unknown, and the multiplications $c_{j,h}*(M-t^m)$ as described in the paragraph defining equations 3-9 cannot be optimized. In addition, for an n×n-bit multiplier returning a (2n−1) bit result, data word $c_0$ may span both n-bit result registers depending on m as shown in FIG. 31. Extracting $c_{0,h}$ 3101 and subsequently $c_{j,h}$ to perform reduction requires complex multiplexer logic given that m may assume a range of values.

An alternative approach is shown in FIG. 32 in which an operand a is multiplied by an operand b. It is assumed that deg(a) and deg(b) are both less than m. First, operand a is multiplied by the constant factor $t^{n-m}$ to provide $r:=a*t^{n-m}$, which is used to left-align operands to register boundaries. Second, the multiplication $c_0=a*b$ is executed, that is, $r:=r_1*b=c_0*t^{n-m}$ such that register $r_h$ contains $c_{0,h}$. Reduction is performed until the condition $r_h=c_{j,h}=0$ is met. That is, while $(r_h<>0)$, $r:=r_h*(M-t^m)*t^{n-m}+r_1$. Note that $(M-t^m)*t^{n-m}$ is a constant throughout the point multiplication and needs to be computed only once. Finally, the left-aligned reduction result in $r_1$ is multiplied by $t^m$, $(r:=r_1*t^m)$ such that the reduced result $c \equiv c_0 \mod M$, deg(c)<m can be read from $r_h$. FIG. 32 describes multiplication and reduction. If only reduction is to be executed, b is not used, i.e., the second step $r:=r_1*b$ is omitted. Note that the first and last multiplication can be omitted if the result is used as operand a in a subsequent multiplication. The multiplications in FIG. 32 correspond to MULNR instructions, i.e., the multiplications:

$$r:=a*t^{n-m},$$

$$r:=r_1*b,$$

$$r:=r_h*(M-t^m)*t^{n-m}+r_1,$$

$$r:=r_1*t^m$$

all require one MULNR each, while the multiplication $r:=r_h*(M-t^m)*t^{n-m}+r_1$, also requires one ADD instruction.

Rather than using the technique described in FIG. 32, the utilization of partial reduction eliminates the two multiplications used for operand alignment described above. First, the mathematical basis for partial reduction will be provided. Then, various embodiments of techniques to implement partial reduction will be provided.

Polynomials $c \in GF(2^m)$ can be represented in reduced canonical form, i.e. deg(c)<m, or in non-reduced canonical form with deg(c)≧m. Using polynomials in both reduced and non-reduced form is the idea underlying partial reduction. For a chosen integer n≧m, a polynomial $c \in GF(2^m)$ is defined to be in partially-reduced representation if deg(c)<n. For hardware implementations, n could, for example, be the maximum operand size of a multiplier. All computations for a point multiplication in $GF(2^m)$ can be executed on polynomials in partially-reduced representation. Reduction of the results to canonical form only needs to be done in a last step.

For a multiplication $c_0=a*b$ with a; $b \in GF(2^m)$, deg(a)<n, deg(b)<n, $c_0$ can be partially reduced to $c \equiv c_0 \mod M$, deg(c)<n as follows: For an integer n≧m, $c_0$ can be split up into two polynomials $c_{0,h}$ and $c_{0,1}$ with deg($c_{0,h}$)<n−1, deg($c_{0,1}$)<n. Subsequent polynomials $c_{j+1}$, can be computed similar to equations 5 and 6 above, by setting $$c_{j+1}=c_{j,h}*t^{n-m}*(M-t^m)+c_{j,1}=c_{j+1,h}*t^n+c_{j+1,1} \text{ until}$$
$$c_{j,h}=0, \deg(c_j)<n$$

The result $c=c_i$, deg(c)<n can be computed in at most i≦n−1 reduction steps. Given M as defined in equation 7 above, the minimum number of iterations i is given by $$n-1-i(m-k) \leq 0 \Leftrightarrow i \geq \left\lceil \frac{n-1}{m-k} \right\rceil.$$

A second, mathematically identical way to compute subsequent polynomials $c_{j+1}$ is to set $c_{j+1}=c_{j,h}*t^{n-m}*M+c_j=c_{j+1,h}*t^n+c_{j+1,1}$ until $c_{j,h}=0$. Implementations may prefer the first way to compute $c_{j+1}$ since it only requires adding the low portion $c_{j,1}$ of $c_j$ instead of the entire $c_j$.

NIST and SECG recommend curves over fields $GF(2^m)$ with m being a prime number. Examples are m=113, 131, 163, 193, 233, 239, 283, 409 and 571. On computer systems, polynomials of these fields can be efficiently represented by bit strings. The size of the bit strings is preferably a power of 2, i.e., n bits with $n=2^u \geq m$ for a positive integer u, or multiples of a power of 2, i.e., $n=v*w$ bits for positive integers v, w with $w=2^u$ and $n \geq m$. For general purpose processor architectures, w corresponds to the word size and v to the number of words. For example, on a 32-bit processor a polynomial a $\in GF(2^{163})$ could be represented with v=6 words each w=32 bit wide. Partial reduction allows for a single implementation that can handle curves over any $GF(2^m)$ with $m \leq n$.

Using partial reduction eliminates the two multiplications used for operand alignment shown in FIG. 32. This is illustrated in FIG. 33 for operand polynomials a', b', deg(a')<n, deg(b')<n and an arbitrary irreducible polynomial M, deg(M) $\leq$n. Reduction of a partially reduced polynomial c', deg(c')<n to a congruent c≡c' mod M, deg(c)<m can be performed with the approach of FIG. 32 by setting a=c' and omitting the second step ($r:=r_1*b$). First $r:=c_0=c'*t^{n-m}$. Then, while ($r_h$<>0), $r:=r_h*(M-t^m)*t^{n-m}+r_1$. Finally, $r_1$ is multiplied by $t^m$.

Note that hardwired reducers such as shown in FIG. 19 only work for named curves. One alternative to reduction is to add a path in FIG. 19 to bypass the reducer, i.e. the product of the polynomial multiplication Z=X*Y can be written back into two result registers. Then the reduction operations can be implemented as shown in FIG. 32 using instructions ADD and MULNR.

Figure 34:
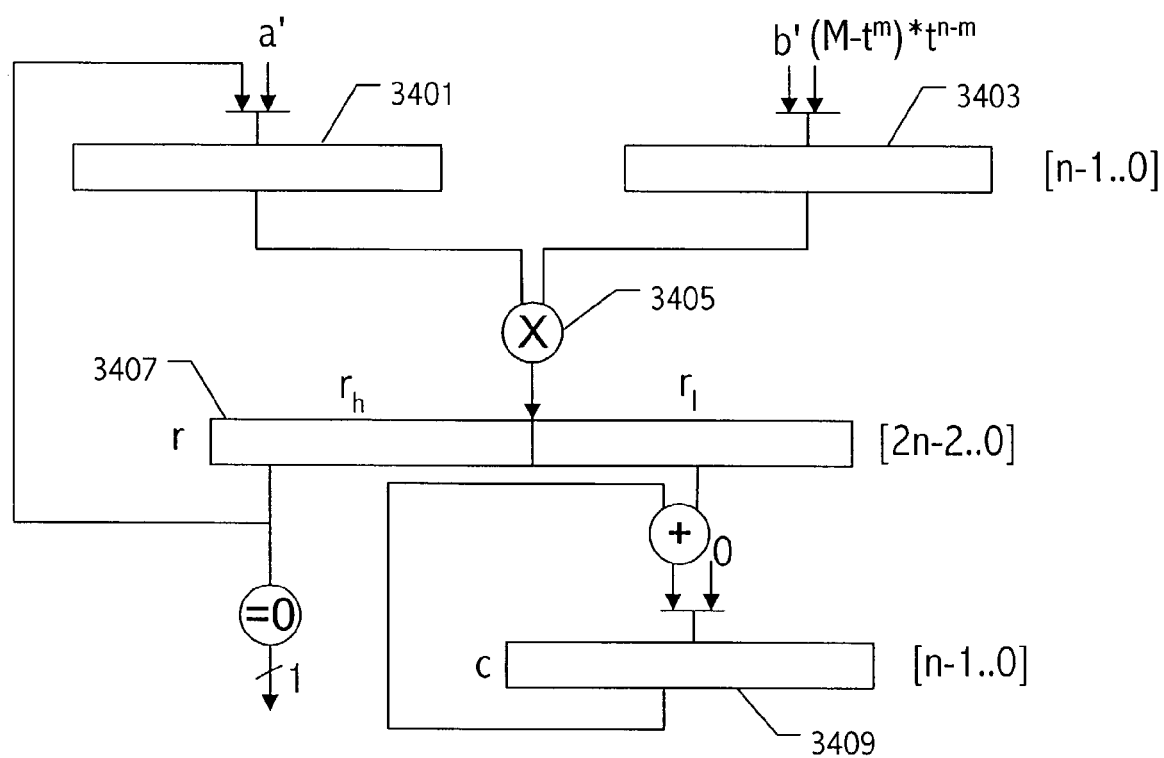
FIG. 34 shows a multiplier with data paths customized for partial reduction.

To better support partial reduction, dedicated multiplier circuitry can be used. FIG. 34 shows an n×n-bit multiplier with data paths customized for partial reduction. Initially, the operand registers 3401 and 3403 are loaded with n-bit operands a' and b'. The operands are multiplied using the multiplier logic 3405. Depending on the design constraints, the multiplier logic can be implemented in a variety of ways, e.g., serial, digit-serial or parallel polynomial multiplication. The result of the multiplication $c_0=a'*b'$ is stored in register r 3407, which has a width of 2n-1 bits and is split into high word $r_h$ and low word $r_1$. Note that $c_{j,h}$ and $c_{j,1}$ are aligned to the register boundaries of $r_h$ and $r_1$ as in FIG. 33. A reduction iteration can be performed by loading the operand registers 3401 and 3403 with $c_{j,h}$ and $(M-t^m)*t^{n-m}$. The sum of low words $c_{j,1}$ is accumulated in result register c 3409. Register c contains the reduced result one cycle after $r_h$ becomes 0.

Partial reduction can also be employed in the implementation of a compact and complete ECC software library. Besides high performance, a design goal for a software library may be to support arbitrary curves that are not known at implementation time. In one embodiment, in addition to hardcoded implementations for known curves, a generic point multiplication routine using partial reduction is provided. Calls to the library can be dispatched according to whether or not an accelerated implementation exists. Furthermore, partial reduction can be useful in verifying implementations optimized for known curves. On today's general purpose processors, polynomial multiplication is commonly implemented through a sequence of shift and XOR instructions. Partial reduction allows for operating on word-sized operands without having to extract bit fields. For example, to implement point multiplication over $GF(2^{163})$ on a 32-bit processor it may be more efficient to operate on n=6*32=192 bits aligned to 32-bit word boundaries than to extract bits from non-aligned m=163-bit bit strings. By applying partial reduction, all interim computations would include partial reduction to 192 bits. Only in the last step of a point multiplication, the operands would be reduced to 163 bits.

Further advantages of implementations using partial reduction include a small memory footprint and code that can be easily verified.

Figure 35:
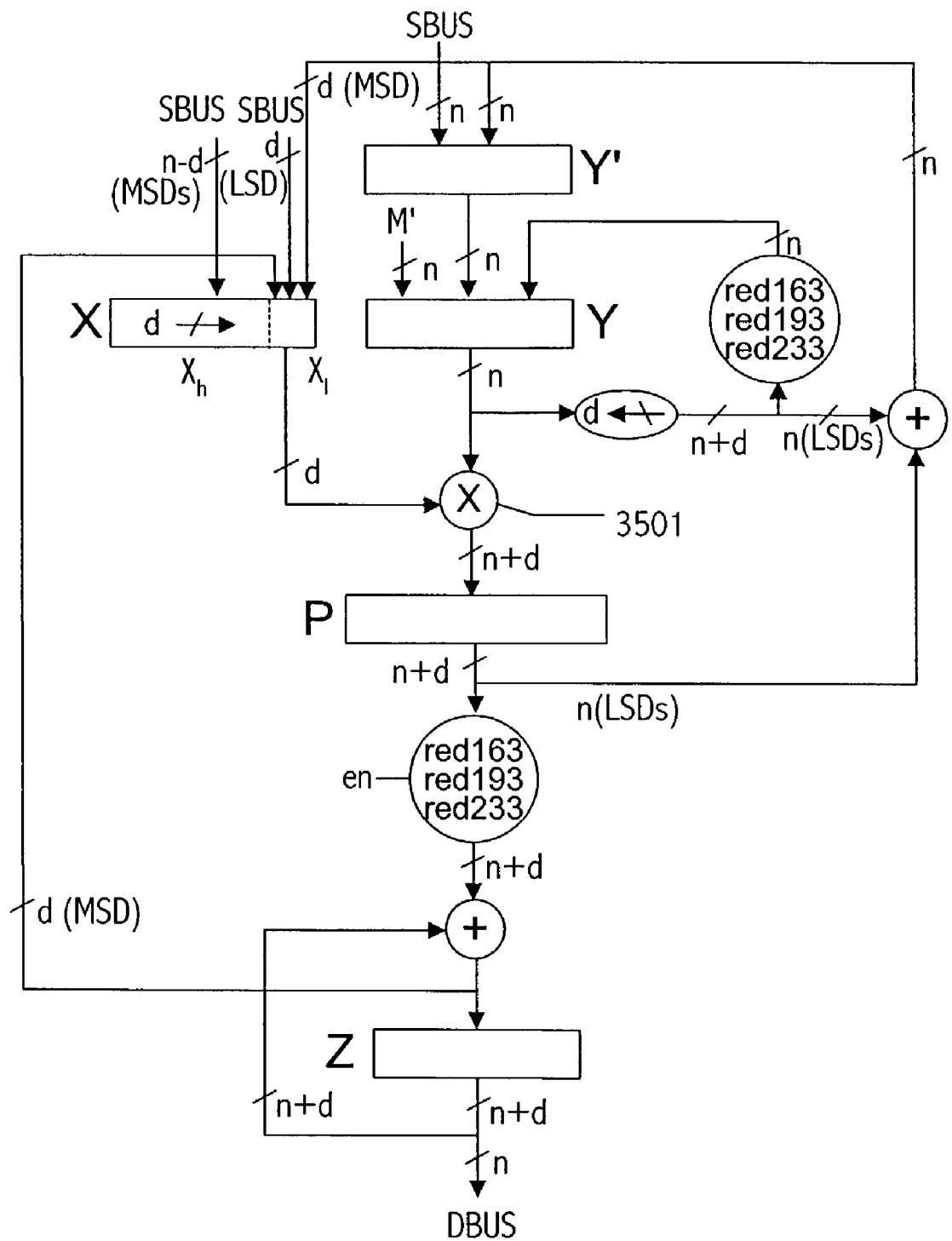
FIG. 35 illustrates an embodiment of a multiplier circuit providing optimized performance for named curves and at the same time support for generic curves.

As illustrated in FIG. 35, another embodiment provides optimized multiplication performance for named curves and at the same time support for generic curves. The LSD multiplier as shown in FIG. 23 was modified as shown in FIG. 35 to allow for operating on generic curves in addition to named curves in that the d×n partial product generator P (3501) can be additionally used to perform partial reduction. Such a design is attractive if the resources are not available to add a separate multiplier to implement reduction for generic curves, such as the separate multiplier illustrated in FIG. 34. The corresponding pseudo code for operating on generic curves in the embodiment illustrated in FIG. 35 is as follows:

```
X[n-1..0] := x; Y[n-1..0] := y;
P[n+d-1..0] := 0;
for i := 0 to n/d - 1 do
    P[n+d-1..0] := P[n+d-1..0] + X[d-1..0] * Y[n-1..0];
    X[n-1..0] := shift_right(X[n-1..0],d);
    Y[n-1..0] := shift_left(Y[n-d-1..0],d) +
                 Y[n-1..n-d] * (M - t^m) * t^{n-m};
end;
Z[n-1..0] := P[n-1..0] + P[n+d-1..n] * (M - t^m) * t^{n-m};
```

Using partial reduction to reduce to the register size n rather than to the field degree m simplifies the design of a generic LSD multiplier significantly. With partial reduction, the operand bits that go into the multiplier do not depend on the field degree m. As the pseudo code illustrates, partial reduction takes the d most significant bits of Y and Z, respectively, and multiplies them with $M'=(M-t^m)*t^{n-m}$. If full reduction had been implemented, bits (m+d-1 . . . m) of Y and Z, respectively, would have to be considered. As m is variable, full reduction would require costly multiplexer logic.

Note that the multiplier in FIG. 35 always takes ⌈n/d⌉ iterations since partial reduction reduces the multiplication result P to n bits. For smaller field degrees, the LSD multiplier shown in FIG. 35 could be optimized such that it only executes ⌈m/d⌉ iterations and reduces the result to ⌈m/d⌉*d bits. Doing this requires multiplexers to extract the MSD of Y and the MSD of P+Z. However, increasing the fan-out of Y may be undesirable in certain embodiments as it is a critical timing path in at least some embodiments.

As there is only one partial product generator 3501 in the embodiment illustrated in FIG. 35, it is alternately used to perform a multiplication iteration and a partial reduction operation. Since the partial product generator constitutes the critical path, it is desirable to limit its fan-out in the illustrated embodiment and only connect it to a single register P. Referring to the pseudo code above describing the operation of the embodiment illustrated in FIG. 35, if P and Y were computed in the order $\{P_i; Y_i\}$ with i=0 . . . (n/d)-1, the output of the partial product generator 3501 would have to be made available for the multiplication in the next clock cycle ($P_i$ depends on $Y_{i-1}$). The computations of $\{P_i; Y_i\}$ can be reordered to $\{Y_i; P_i\}$ such that $Y_i$ is only needed two cycles later when $P_{i+1}$ is calculated. That way, the output of the partial product generator 3501 needs to be connected to one register only. As shown in FIG. 35, critical path timing may also be improved by accumulating the intermediate multiplication results in Z rather than in P. Note that the pseudo code above shows accumulation in P. Note also that in other embodiments, it may not be necessary to limit fan-out.

FIG. 36 shows the state diagram for the generic LSD multiplier. Separate control flows are given for named and generic curves.

For named curves, the source operands are loaded from the SBUS in states S0 and S1; the partial products are computed in states S2, S3, S4 and S5; the accumulation and reduction of these results happens in states S3, S4, S5 and S6; finally, the result is transferred over the DBUS into the register file in state S7 (not shown). For named curves with field degree $m \leq 192$, state S5 is skipped.

Looking at generic curves, the state diagram is specified as follows as shown in FIG. 36. The source operands are loaded from the SBUS in states S0 and S1; the multiplication results are computed in states S2, S4, S6 and S8 and the accumulation of these results is done in states S3, S5, S7 and S9; the reduction of Y takes place in states S1, S3 and S5; the reduction of the accumulated sum is done in states S10 and S11; finally, the result is transferred over the DBUS into the register file in state S12 (not shown). Since the multiplier is alternately used for a multiplication step and a reduction step, register X alternately supplies the LSD of x and the MSD of the shifted version of y to the multiplier, and register Y alternately supplies y and M' where $M'=(M-t^m)*t^{n-m}$. Note that the shift operations in FIG. 36 denote shift operations by d bits.

In one embodiment, the modified LSD multiplier illustrated in FIG. 35 takes a total of seven cycles to perform a modular multiplication for named curves with $m \leq 192$, eight cycles for named curves with $192 < m \leq 255$, and 13 cycles for generic curves with $m \leq 255$. The cycle counts include two cycles needed for loading the source operands and one cycle needed for storing the destination operand. Similar to named curves, the cycle count could be optimized for generic curves. Doing this requires an additional multiplexer connected to Y that increases the length of the critical path.

In one embodiment some restrictions are imposed on the irreducible polynomial. More particularly, when reducing shift_left(Y) and P, it was assumed that the partially reduced result of the multiplications $Y[n-1 \ldots n-d]*(M-t^m)*t^{n-m}$ and $P[n+d-1 \ldots n]*(M-t^m)*t^{n-m}$, respectively, can be stored in an n-bit register. That requirement is equivalent to the partial reduction being executable in a single iteration.

Given a partial product generator that multiplies d×n bits and m,k, as described in the paragraph describing equations 3-9 above, the number of reduction iterations i is $$d - i(m-k) \leq 0 \Leftrightarrow i \geq \left\lceil \frac{d}{m-k} \right\rceil$$

For limiting partial reduction to a single iteration it follows that $d \leq m-k$. For $d=64$ this limits irreducible polynomials P to those with $m-k \geq 64$. All polynomials recommended by NIST and SECG satisfy this condition. In another embodiment, polynomials with $m-k \leq 64$ are accommodated by allowing for multiple reduction iterations. However, in such an embodiment, multiplier performance may be significantly reduced.

Figure 37:
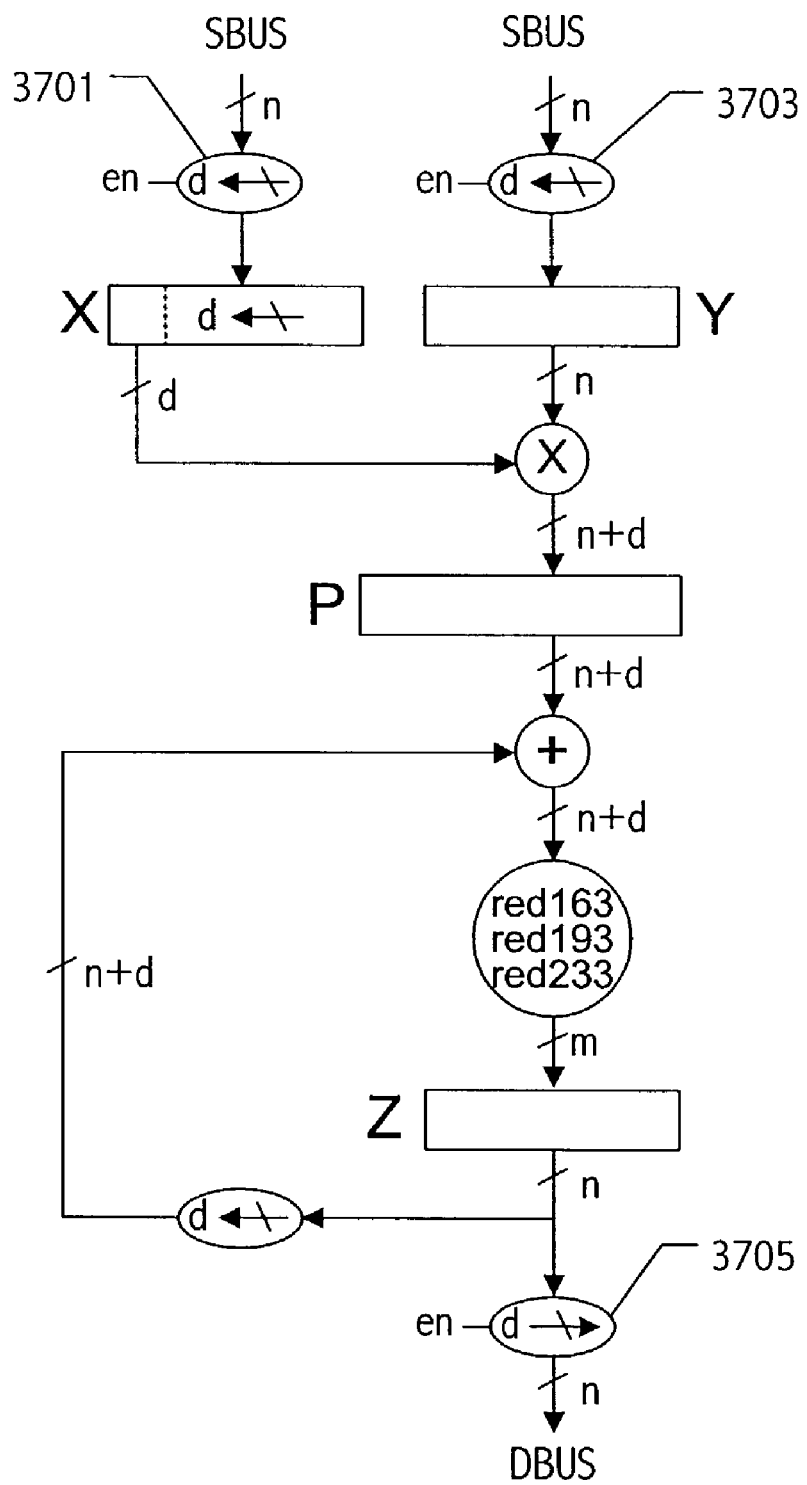
FIG. 37 shows a block diagram of an MSD multiplier for named curves.

In another embodiment, shown in FIG. 37, a most significant digit (MSD) multiplier is utilized rather than an LSD multiplier, which provides a performance improvement over the LSD multiplier. The corresponding pseudo code looks as follows:

```
X[n-1..0] := x*t^{d*⌊(n-m)/d⌋}; Y[n-1..0] = y*t^{d*⌊(n-m)/d⌋};
P[n+d-1..0] := 0; Z[n-1..0] := 0;
for i := 0 to ⌈m/d⌉ -1 do
    P[n+d-1..0] := X[n-1..n-d] * Y[n-1..0];
    X[n-1..0] := shift_left(X[n-d-1..0],d);
    Z[n-1..0] := (shift_left(Z[n-1..0],d) + P[n+d-1..0]) mod
                 M*t^{d*⌊(n-m)/d⌋};
end;
```

The MSD multiplier performs the following three computation steps in parallel: (i) the most significant digit (MSD) of X is multiplied with Y; (ii) X is shifted to the left by d bits; (iii) Z is shifted to the left by d bits, added to P, and subsequently reduced.

FIG. 37 shows a block diagram of an MSD multiplier for named curves of field degrees 163, 193, and 233. It takes $\lceil m/d \rceil + 1$ clock cycles to perform the modular multiplication, that is, the number of multiplication steps executed depends on m. This optimization requires that the registers X and Y are loaded with the operands shifted to the left by $d*\lfloor (n-m)/d \rfloor$ bits. In one embodiment, only a shift by d bits is supported. That is, for $n=256$ and $d=64$, the modular multiplication takes five clock cycles for $m > 192$ and four clock cycles for $m \leq 192$. Note that the operands are left aligned by shifters 3701 and 3703. The enable signal (en) on the shifters are enabled as needed for the shift operation. Note that the result from register Z is right justified in shifter 3705 by a factor of $t^{d*\lfloor (n-m)/d \rfloor}$, before being provided to the DBUS.

Comparing embodiments using the LSD multiplier and embodiments using the MSD multiplier, notice that each embodiment has its advantages. The LSD multiplier is simpler with respect to optimizing the number of multiplication steps based on the field degree as the operands do not have to be shifted. On the other hand, the MSD multiplier simplifies reduction in that it only requires one reduction circuit. Looking at a multiplication iteration, the LSD multiplier reduces Y, while the MSD multiplier reduces P. After all iterations have been performed, a final reduction of P is needed. Thus, the LSD multiplier requires a reducer in two places while MSD requires a reducer in one place.

Figure 38:
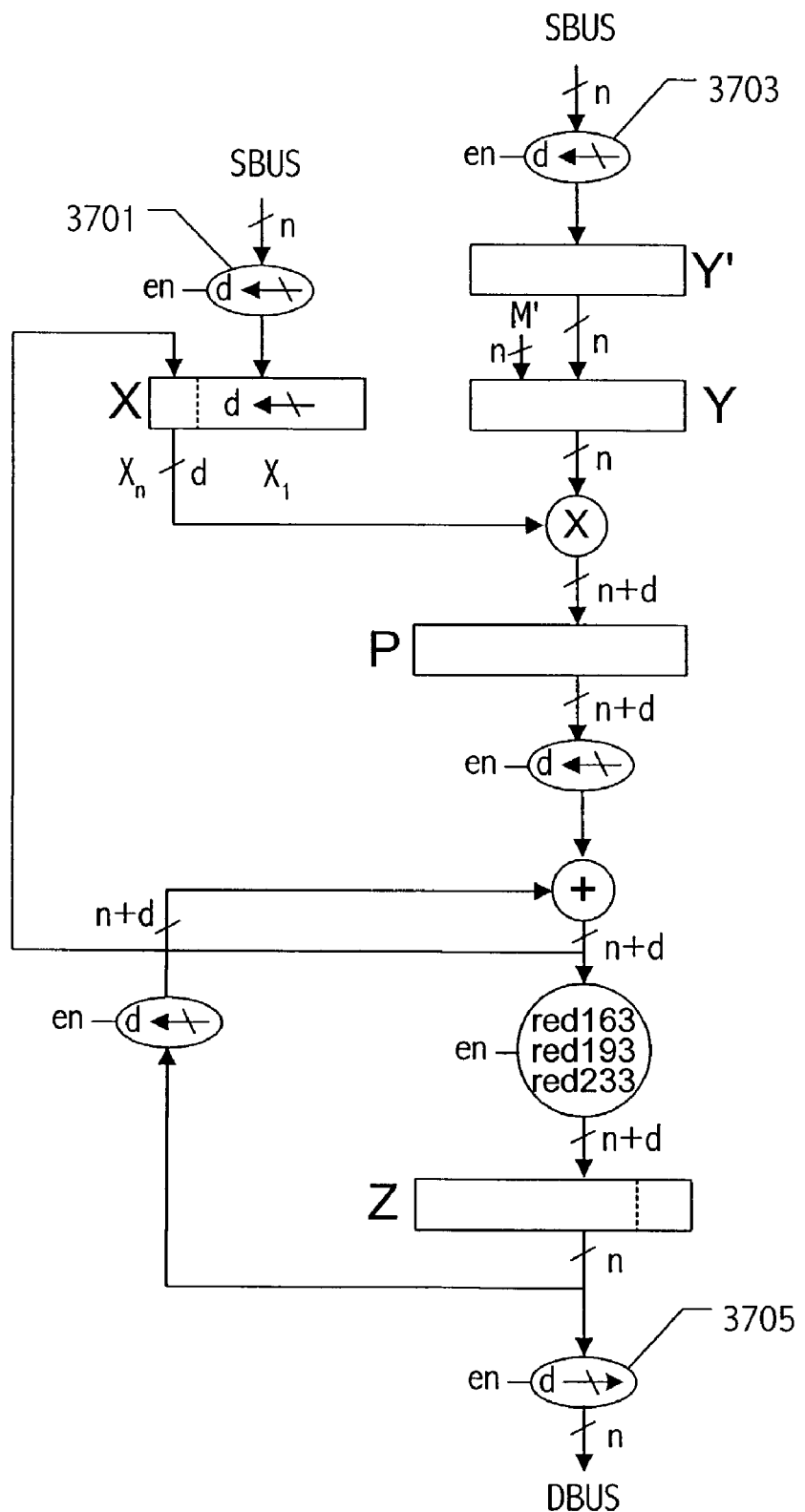
FIG. 38 illustrates a generic MSD multiplier that can handle both named and generic curves.

Referring now to FIG. 38, a generic MSD multiplier is illustrated that can handle both named and generic curves. The pseudo code for performing modular multiplication on generic curves looks as follows:

```
X[n-1..0] := x*t^{d*⌊(n-m)/d⌋}; Y[n-1..0] := y*t^{d*⌊(n-m)/d⌋};
P[n+d-1..0] := 0;
for i := 0 to ⌈m/d⌉ -1 do
    P[n+d-1..0] := X[n-1..n-d] * Y[n-1..0];
    X[n-1..0] := shift_left(X[n-1..0],d);
    r[n+d-1..0] := shift_left(Z[n-1..0],d) + P[n+d-1..0];
    Z[n-1..0] := r[n-1..0] + r[n+d-1..n] * (M - t^m) * t^{n-m};
end;
```

Similar to the generic LSD multiplier, there is one partial product generator that is alternately used to perform a multiplication step and a reduction step. Compared with the LSD multiplier illustrated in FIG. 35, the pipelining of the MSD multiplier works out more efficiently saving one clock cycle. Rather then reordering the multiplication and reduction steps to remove data dependencies, the computation can begin with executing two multiplication steps before the first reduction step is executed. That is, P and Z are computed in the order $\{P_0; P_1; Z_0; P_2; Z_1; \ldots\}$ such that $P_i$ is only needed two cycles later when $Z_{i+1}$ is calculated.

FIG. 39 shows the state diagram for the generic MSD multiplier. Separate control flows are given for named and generic curves. The state diagram for named curves looks as follows. The source operands are loaded from the SBUS in states S0 and S1; the partial products are computed in states S2, S3, S4 and S5–S3, S4 and S5 also accumulate and reduce the partial results; S6 performs a final accumulation and reduction. Finally, the result is transferred over the DBUS into the register file in state S7 (not shown). The shown states are executed for curves with field degree $192 < m \leq 255$. For $m \leq 192$, state S4 is skipped. Note that the shift operations in FIG. 39 denote shift operations by d bits.

Looking at generic curves, the state diagram is specified as follows. The source operands are loaded from the SBUS in states S0 and S1; the partial products are computed in states S2, S3, S5 and S7; the reduction of the accumulated multiplication results happens in states S4, S6, S8 and S9; S10 performs a final accumulation and reduction. Finally, the result is transferred over the DBUS into the register file in state S11 (not shown). Since the multiplier is alternately used for a multiplication step and a reduction step, register X alternately supplies the MSD of x and the MSD of the accumulated result and register Y alternately supplies y and M' where $M' = (M - t^m) * t^{n-m}$. The state machine for generic curves is again optimized such that states are skipped for smaller field degrees: States S5 and S6 are skipped for $m \leq 192$.

Table 1 below gives the cycle counts for the generic LSD multiplier and the generic MSD multiplier. The cycle counts include the time needed to load and store the operands. As pointed out, the more efficient pipelining of the MSD multiplier saves one cycle when operating on generic curves. Note that it is assumed that it takes a single multiplication to execute a reduction step. As explained previously, this is true for $d \leq m - k.$

TABLE 1

|  | Named Curve | Generic Curves |
| --- | --- | --- |
| Generic LSD Multiplier |  |  |
| m > 192 | 8 | 13 |
| m ≦ 192 | 7 | 13 |
| Generic MSD Multiplier |  |  |
| m > 192 | 8 | 12 |
| m ≦ 192 | 7 | 10 |

While various multipliers have been described, a variety of multipliers may be utilized to perform modular multiplication. Note that while the examples of modular multiplication may be based on binary polynomial fields, the examples of modular multiplication provided herein may also apply to integer fields.

Figure 40:
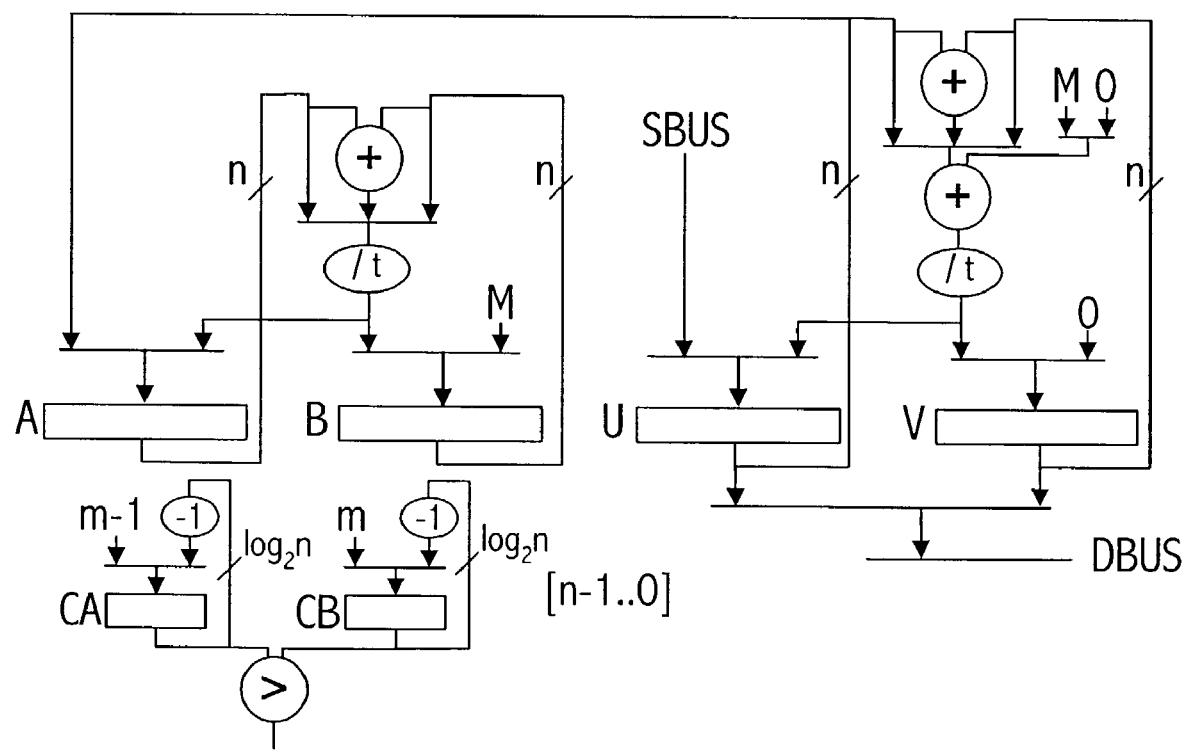
FIG. 40 illustrates a divider circuit.

The ECC processor implements a modular divider based on an algorithm described in application Ser. No. 10/091,962 filed Mar. 5, 2002 which is incorporated herein by reference, that has similarities to Euclid's GCD algorithm. The divider is illustrated in FIG. 40 and includes four 256-bit registers A, B, U, and V and a fifth register holding the irreducible polynomial M. It can compute division for arbitrary irreducible polynomials M and field degrees up to m=255.

Initially, A is loaded with the divisor X, B with the irreducible polynomial M, U with the dividend Y, and V with 0. Throughout the division, the following invariants are maintained:

$$A * Y \equiv U * X \bmod M \qquad \text{(invariant 1)}$$

$$B * Y \equiv V * X \bmod M \qquad \text{(invariant 2)}$$

Through repeated additions and divisions by t, A and B are gradually reduced to 1 such that U (respectively V) contains the quotient Y/X mod M. Note that a polynomial is divisible by t if it is even, i.e. the least significant bit of the corresponding bit string is 0. Division by t can be efficiently implemented as a shift right operation. Two counters, CA and CB, are used to test for termination of the algorithm. For named curves, CB is initialized with the field degree m and CA with m−1. For generic curves, CB is initialized with the register size n and CA with n−1. CA and CB represent the upper bound for the order of A and B. This is due to the fact that the order of A+B is never greater than the order of A if CA>CB and never greater than the order of B if CA≦CB. The following pseudo code describes the operation of the divider:

```
A:=X; B:=M; U:=Y; V:=0;
if named_curve then {CA:=m−1; CB:=m}
             else {CA:=n−1; CB:=n};
while (even(A) and CA>=0) do {
        A:=shiftr(A); CA:=CA−1;
        if even(U) then U:=shiftr(U)
                   else U:=shiftr(U+M);}
while (CA>=0 and CB>=0) do {
        if (CA>CB) then {
           A:=A+B; U:=U+V;
           while (even(A) and CA>=0) do {
                A:=shiftr (A) ; CA:=CA−1;
                if even(U) then U:=shiftr (U)
                           else U:=shiftr(U+M);}
        } else {
           B=A+B; V:=U+V;
           while (even(B) and CB>=0) do {
                B:=shiftr(B); CB:=CB−1;
                if even(V) then V:=shiftr(V)
                           else V:=shiftr(V+M);}
        }
if (CA<0) then return V
          else return U;
```

A modular division can be computed in a maximum of 2m clock cycles for named curves and in a maximum of 2n clock cycles for generic curves. Note that the divider fully reduces the result to the field degree. In particular, divisions by 1 can be used to reduce a polynomial of degree less than n to a polynomial of degree less than m.

Reduction of a partially reduced polynomial c', deg(c')<n to a congruent polynomial c≡c' mod M, deg(c)<m can be performed utilizing the approach illustrated in FIG. 32.

Referring again to FIG. 34, the final reduction of c' could also be performed with the multiplier illustrated in FIG. 34 by setting a'=c' and b'=$t^{n-m}$. The reduced result appears left-aligned in register c (3409). That corresponds to performing the algorithm illustrated in FIG. 32 but omitting the last step ($r:=r_1 * t^m$).

Another option to reduce the partially reduced polynomial c', deg(c')<n to a congruent polynomial c≡c' mod M, deg(c) <m is to use the divider circuit illustrated in FIG. 40. The divider circuit can be initialized with register A=1, B=M, U=c', V=0, CA=n−1 CB=n. The division is then performed as described above.

A point multiplication kP using Montgomery's algorithm can be computed with $\lfloor \log_2(k) \rfloor$ point additions and doublings. Referring now to FIG. 41, an example is shown of how to program an exemplary elliptic curve accelerator described herein. A code fragment of assembly code implementing projective point doubling and point addition and its execution for named and generic curves is shown. The computation requires storage for two intermediate points $P_1 = (X_1, Z_1)$ and $P_2 = (X_2, Z_2)$ and is done as follows. The bits of the binary representation of k are examined from left $k_{\lfloor \log_2(k) \rfloor}$ to right ($k_0$). For the first non-zero bit of k, $P_1$ and $P_2$ are initialized with $P_{1, \lfloor \log_2(k) \rfloor} = P$ and $P_{2, \lfloor \log_2(k) \rfloor} = 2P$:

$X_{1, \lfloor \log_2(k) \rfloor} = x$
$Z_{1, \lfloor \log_2(k) \rfloor} = 1$
$X_{2, \lfloor \log_2(k) \rfloor} = x^4 + b$
$Z_{2, \lfloor \log_2(k) \rfloor} = x^2$ For all following bits of k, with $k_i = 0$, $P_{1,i}$ is set to $2P_{1,i+1}$, as given by equations (1) and (2) below, and $P_{2,i}$ is set to $P_{1,i+1} + P_{2,i+1}$ as given by equations (3) and (4) below.

$$X_{1,i} = X_{1,i+1}^4 + bZ_{1,i+1}^4 \qquad (1)$$

$$Z_{1,i} = X_{1,i+1}^2 * X_{1,i+1}^2 \qquad (2)$$

$$X_{2,i} = xZ_{2,i} + (X_{1,i+1}Z_{2,i+1})(X_{2,i+1}Z_{1,i+1}) \qquad (3)$$

$$Z_{2,i} = (X_{1,i+1} * Z_{2,i+1} + X_{2,i+1} * Z_{1,i+1})^2 \qquad (4)$$

Similarly, for $k_i = 1$, $P_{1,i}$ is set to $P_{1,i+1} + P_{2,i+1}$ and $P_{2,i}$ is set to $2P_{2,i+1}$. The Y-coordinate of kP can be retrieved from its X- and Z-coordinates using the curve equation. The result kP= $(x_{kP}, y_{kP})$ in affine coordinates is given by $$x_{kP} = \frac{X_{1,0}}{Z_{1,0}}$$

$$y_{kP} = \left(\frac{X_{1,0}}{Z_{1,0}} + x\right) * \frac{\left(\frac{X_{1,0}}{Z_{1,0}} + x\right)\left(\frac{X_{2,0}}{Z_{2,0}} + x\right) + x^2 + y}{x} + y$$

$kP = 0$ if $Z_{1,0} = 0$ $kP = (x, x+y)$ if $Z_{2,0} = 0$

The computation of the four equations shown above for $X_{1,i}, Z_{1,i}, X_{2,i}, Z_{2,i}$ is interleaved in the example given in FIG. 41 to achieve a higher degree of instruction-level parallelism. Named curves and generic curves use a single code base. That is accomplished by executing MUL and SQR instructions according to the curve type. For named curves, MUL denotes a multiplication with hardwired reduction. The same instruction is executed as a multiplication with partial reduction for generic curves. The execution of an SQR instruction is slightly more complicated. For named curves, SQR is executed by the ALU. And for generic curves, the SQR instruction is transformed into a MUL instruction that is executed as a multiplication followed by partial reduction. We use the BNC instruction in the few places where the program code differs for the two curve types. The fact that the multiplier and the ALU can operate in parallel is exploited. That is, if there are no data dependencies, the MUL instruction can be executed in parallel with either an ADD or a SQR instruction. Since the SQR instruction is executed by the ALU for named curves and by the multiplier for generic curves, the order in which instructions are executed differs depending on the curve type even though the same code base is used.

Data dependencies may be detected in different ways. The assembler checks for dependencies that would prevent overlapped instruction execution. In those cases, the programmer needs to resolve the dependencies by reordering operands or inserting NOP instructions. With respect to parallel instruction execution, the control unit examines dependencies and decides whether instructions can be executed in parallel or not.

The code fragment in FIG. 41 shows no data dependencies for any MUL/SQR or MUL/ADD instruction sequence. Hence, for named curves, all MUL/SQR and MUL/ADD sequences are executed in parallel. Furthermore, since there are no data dependencies between subsequent arithmetic instructions, instruction execution can be overlapped, thus, saving one cycle per instruction.

Code execution looks different for generic curves as illustrated. In this case, all MUL/SQR sequences have to be executed sequentially as SQR instructions are now executed as MUL instructions. However, there still is one SQR/ADD sequence and one MUL/ADD sequence left that can be executed in parallel. Similar to the previous trace, overlapped execution saves one cycle per instruction.

Assembly code for point multiplication on an exemplary crypto accelerator (CRAC) described herein based on Montgomery Scalar Multiplication is shown in Appendix A. The same code base is used for named and generic curves. Curve-dependent branches (BNC instructions) control the execution based on whether a named or generic curve is used.

The embodiments described above are presented as examples and are subject to other variations in structure and implementation within the capabilities of one reasonably skilled in the art. For examples, while certain embodiments show particular named curves, the embodiments described above using named curves may use any or all of the named curves with field degrees of 113, 131, 163, 193, 233, or 239 or may use named curves of different field degrees in addition to or instead of the named curves identified herein. The details provided above should be interpreted as illustrative and not as limiting. Variations and modifications of the embodiments disclosed herein, may be made based on the description set forth herein, without departing from the scope and spirit of the invention as set forth in the following claims.

APPENDIX A

```c
/*
*/ void pmm_unified(void)
{
  /* load data from call frame into registers or move it to separate
     memory locations to allow loading of the next call frame
(pipelining) */
  ld_crac(data_mem_conf, RC);        /* RC = (field degree, named
curve) */
  ld_crac(data_mem_b, R5);           /* R5 = b */
  ld_crac(data_mem_M, R3);           /* R3 = M */
  ld_crac(data_mem_Px, R0);          /* R0 = x1 = x */
  ld_crac(data_mem_Py, R4);          /* R4 = y */
  ld_crac(data_mem_k, R2);           /* R2 = k */
  ld_crac(data_mem_t_n_m, R7);       /* R7 = t^(n-m) */
  add_crac(R5, R5, RM);              /* RM = 0 */
  st_crac(R3, data_mem_M_c);
  st_crac(R4, data_mem_Py_c);
  st_crac(R5, data_mem_b_c);

/* left-align k through multiplication with t^(n-m) */
  mulpr_crac(R7, R2, R6);            /* R6 = k, left-aligned to the
n-bit register */
  bnc_crac(18);
  /* calculate M' = (M-t^m) * t^(n-m) */
  mulpr_crac(R7, R3, R4);            /* R4 = M' = (M-t^m) * t^(n-m)
*/
  st_crac(R7, data_mem_t_n_m_c);
  st_crac(R4, data_mem_M_prime);
  add_crac(R3, R3, R3);              /* R3 = 0 */
  ld_crac(data_mem_M_prime, RM);     /* RM = (M-t^m) * t^(n-m)
(initialize RM for multiplication) */

/* initialization code to calculate P, 2P */
  label_crac(&18);
  ld_crac(data_mem_1, R1);           /* R1 = z1 = 1 */
  sqr_crac(R0, R3);                  /* R3 = z2 = x^2, R0 contains x
*/
  st_crac(R0, data_mem_Px_c);
  sqr_crac(R3, R2);                  /* R2 = x^4 */
  add_crac(R5, R2, R2);              /* R2 = x2 = x^4 + b, R5 contains
b */

/* search for the MSB of k */
  label_crac(&10);                   /* L0  come back to here to keep
on looking for first 1 in k */
  sl_crac(R6, R6);                   /* shift k to find the MSB */
  bmz_crac(11);                      /* if not found, decrement
counter and try again */

/* at this point we have reached the first non-zero bit of k */

/* the counter is being decremented by shifting a 1 left until it
falls off the left side into cc */
  label_crac(&13);                   /* L3  Now we decrement counter
until we reach the end of k */
```

```
    sl_crac(R7, R7);                    /* decrement counter to go to end
of k */
    bmz_crac(14);                       /* if counter hasn't expired,
examine the bits of k */

/* at this point a 1 was shifted out of the counter, meaning it has
expired
        that means we are done with shift-and-add and we can start
completing the operation */

/* Mxy_crac();
        registers should be set up correctly from last operation
        if counter has expired, then perform final routine and store the
result
        assumes R0, R1, R2, R3
        hold    x1, z1, x2, z2
    */ bnc_crac(19);                       /* branch to Mxy code for
named curves */
    mul_crac(R3, R1, R4);               /* 5.   R4 = T3 */
    ld_crac(data_mem_t_n_m_c, R6);      /*      R6 = t^(n-m)*/
    mul_crac(R4, R6, R7);               /*      R7 = T3 * t^(n-m),
used to check for T3==0 */
    ld_crac(data_mem_Px_c, R5);         /* 5a.  R5 = T1 */
    add_crac(R6, R6, R6);               /*      R6 = 0 */
    add_crac(R7, R6, R7);               /*      R7 = T3 * t^(n-m)
*/
    ld_crac(data_mem_Py_c, R7);         /* 12a. R7 = T2 (y)*/
    beq_crac(16);                       /* T3 == 0, i.e. case (0,0)
or (x,x+y) */
    mul_crac(R1, R5, R1);               /* 6.   R1 = Z1 */
    mul_crac(R5, R3, R3);               /* 8.   R3 = Z2 */
    add_crac(R0, R1, R1);               /* 7.   R1 = Z1 */
    mul_crac(R0, R3, R0);               /* 9.   R0 = X1 */
    add_crac(R3, R2, R3);               /* 10.  R3 = Z2 */
    mul_crac(R1, R3, R3);               /* 11.  R3 = Z2 */
    sqr_crac(R5, R6);                   /* 12.  R6 = T4 */
    add_crac(R7, R6, R6);               /* 13.  R6 = T4 */
    mul_crac(R4, R6, R6);               /* 14.  R6 = T4 */
    mul_crac(R5, R4, R4);               /* 16.  R4 = T3 */
    add_crac(R3, R6, R6);               /* 15.  R6 = T4 */
    ld_crac(data_mem_M_c, RM);          /*      RM = M */
    div_crac(R4, R0, R2);               /* 17.  R2 = X2 */
    ld_crac(data_mem_M_prime, RM);      /*      RM = (M-t^m) *
t^(n-m) */
    add_crac(R2, R5, R3);               /* 18.  R3 = Z2 */
    mul_crac(R6, R3, R3);               /* 19.  R3 = Z2 */
    ld_crac(data_mem_M_c, RM);          /*      RM = M */
    div_crac(R4, R3, R3);               /* 20.  R3 = Z2 */
    add_crac(R7, R3, R3);               /* 21.  R3 = Z2 */
    st_crac(R2, data_mem_kPx);          /*      kpx = X2 */
    st_crac(R3, data_mem_kPy);          /*      kpy = Z2 */
    end_crac();                         /* the end */ label_crac(&19);
    ld_crac(data_mem_Px_c, R5);         /* 5a.  R5 = T1 */
    ld_crac(data_mem_Py_c, R7);         /* 12a. R7 = T2 */
    mul_crac(R3, R1, R4);               /* 5.   R4 = T3 */
    ld_crac(data_mem_M_c, RM);          /*      RM = M   */
```

```
  add_crac(R6, R6, R6);         /*      R6 = 0  */
  mul_crac(R1, R5, R1);         /* 6.   R1 = Z1 */
  add_crac(R4, R6, R4);         /*      R4 = T3 */
  beq_crac(16);                 /* T3 == 0, i.e. case (0,0)
or (x,x+y) */
  mul_crac(R5, R3, R3);         /* 8.   R3 = Z2 */
  add_crac(R0, R1, R1);         /* 7.   R1 = Z1 */
  mul_crac(R0, R3, R0);         /* 9.   R0 = X1 */
  add_crac(R3, R2, R3);         /* 10.  R3 = Z2 */
  mul_crac(R1, R3, R3);         /* 11.  R3 = Z2 */
  sqr_crac(R5, R6);             /* 12.  R6 = T4 */
  add_crac(R7, R6, R6);         /* 13.  R6 = T4 */
  mul_crac(R4, R6, R6);         /* 14.  R6 = T4 */
  mul_crac(R5, R4, R4);         /* 16.  R4 = T3 */
  add_crac(R3, R6, R6);         /* 15.  R6 = T4 */
  ld_crac(data_mem_1, R1);      /*      R1 = 1  */
  div_crac(R4, R1, R4);         /* 17.  R4 = T3 */
  mul_crac(R6, R4, R6);         /* 18.  R6 = T4 */
  mul_crac(R0, R4, R2);         /* 19.  R2 = X2 */
  add_crac(R5, R2, R3);         /* 20.  R3 = Z2 */
  mul_crac(R6, R3, R3);         /* 21.  R3 = Z2 */
  add_crac(R7, R3, R3);         /* 22.  R3 = Z2 */
  st_crac(R2, data_mem_kPx);    /*      kpx = X2 */
  st_crac(R3, data_mem_kPy);    /*      kpy = Z2 */
  end_crac();                   /* the end */

/* cases z1==0 and z2==0 */ label_crac(&16);
  ld_crac(data_mem_1, R0);      /* R0 = 1 */
  ld_crac(data_mem_M_c, RM);    /* RM = M */
  div_crac(R0, R1, R1);         /* R1 = Z1/1 (reduction to field
size) */
  sl_crac(R2,R2);               /* dummy instruction */
  add_crac(R1, R6, R1);         /* R1 = Z1/1 */
  beq_crac(17);                 /* z1 == 0 ? */

/* z2 == 0 */
  add_crac(R7, R5, R7);         /* R7 = x+y */
  st_crac(R5, data_mem_kPx);    /* kpx = x */
  st_crac(R7, data_mem_kPy);    /* kpy = x+y */
  end_crac();                   /* the end */ label_crac(&17);              /* z1 == 0 */
  st_crac(R6, data_mem_kPx);    /* kpx = 0 */
  st_crac(R6, data_mem_kPy);    /* kpy = 0 */
  end_crac();                   /* the end */

/* this instruction will never follow the one above because that
contains a end. */
  label_crac(&14);              /* come back here to examine bits of k
*/
  sl_crac(R6, R6);
  bmz_crac(15);                 /* if the bit of k is 0 then perform
the second double-and-add */

/*
   M_add()
     if the bit of k is 1 then perform the first type of double and
add
```

```
    note that the double operation is combined with the add
operation to reuse terms
    assume  R0, R1, R2, R3
    contain x1, z1, x2, z2
 */ mul_crac(R0, R3, R0);          /* R0 = h1  = x1 * z2 */
  sqr_crac(R3, R3);              /* R3 = h4  = z2^2 */
  mul_crac (R1, R2, R4);         /* R4 = h2  = z1 * x2 */
  sqr_crac(R2, R2);              /* R2 = h3  = x2^2 */
  add_crac(R0, R4, R1);          /* R1 = h5  = h1 + h2 */
  mul_crac(R0, R4, R0);          /* R0 = h6  = h1 * h2 */
  sqr_crac(R3, R4);              /* R4 = h8  = h4^2 */
  mul_crac(R2, R3, R3);          /* R3 = h9  = h3 * h4 */
  sqr_crac(R1, R1);              /* R1 = h10 = h5^2 */
  ld_crac(data_mem_b_c, R5);     /* R5 = b */
  mul_crac(R4, R5, R4);          /* R4 = h11 = b * h8 */
  sqr_crac(R2, R2);              /* R2 = h7  = h3^2 */
  ld_crac(data_mem_Px_c, R5);    /* R5 = x */
  mul_crac(R1, R5, R5);          /* R4 = h12 = x*h10 */
  add_crac(R4, R2, R2);          /* R2 = h13 = h7 + h11 */
  add_crac(R0, R5, R0);          /* R0 = h14 = h12 + h6 */
  jmp_crac(13);                  /* go back to decrementing the counter
*/

/* these instructions can only be reached through a jump or branch
*/
  label_crac(&15);               /* do second type of double and
add when k bit is 0 */
  /* assume  R0, R1, R2, R3
     contain x1, z1, x2, z2
     note that the double operation is combined with the add
operation to reuse terms
  */
  mul_crac(R1, R2, R2);          /* R2 = h1  = z1*x2 */
  sqr_crac(R1, R1);              /* R1 = h4  = z1^2 */
  mul_crac(R0, R3, R4);          /* R4 = h2  = x1*z2 */
  sqr_crac(R0, R0);              /* R0 = h3  = x1^2 */
  add_crac(R2, R4, R3);          /* R3 = h5  = h1 + h2 */
  mul_crac(R2, R4, R2);          /* R2 = h6  = h1*h2 */
  sqr_crac(R1, R4);              /* R4 = h8  = h4^2 */
  mul_crac(R0, R1, R1);          /* R1 = h9  = h3*h4 */
  sqr_crac(R3, R3);              /* R3 = h10 = h5^2 */
  ld_crac(data_mem_b_c, R5);     /* R5 = b */
  mul_crac(R4, R5, R4);          /* R4 = h11 = b* h8 */
  sqr_crac(R0, R0);              /* R0 = h7  = h3^2 */
  ld_crac(data_mem_Px_c, R5);    /* R5 = x */
  mul_crac(R3, R5, R5);          /* R4 = h12 = x*h10 */
  add_crac(R4, R0, R0);          /* R0 = h13 = h11 + h7 */
  add_crac(R2, R5, R2);          /* R2 = h14 = h12 + h6 */
  jmp_crac(13);

/* these instruction can only be reached through a jump or branch
*/
  label_crac(&11);               /* used to decrement the counter
while searching for start of k */
  sl_crac(R7, R7);               /* decrement the counter */
  bmz_crac(10);                  /* if not the end go back to
shifting out 0's from the front of k */
  add_crac(R0, R0, R0);          /* R0 = 0 */
```

```
  sl_crac(R7, R7);              /* dummy instruction */
  st_crac(R0, data_mem_kPx);    /* if k was 0, then store 0 in kPx */
  st_crac(R0, data_mem_kPy);    /* if k was 0, then store 0 in kPy */
  end_crac();
}
```

What is claimed is:

1. An elliptic curve processing apparatus comprising a plurality of functional units;
 wherein at least one of the plurality of functional units is configured to perform at least one operation on elliptic curves specified over binary polynomial fields; and
 wherein at least one of the plurality of functional units comprises a digit serial multiplier with a digit size of at least two bits, wherein the digit serial multiplier is configured to:
  perform a multiplication step of the at least one operation for one or more named curves, wherein each named curve implicitly specifies an irreducible polynomial to be used in a reduction step of the at least one operation;
  perform a partial reduction operation for a generic curve using an arbitrary irreducible polynomial to produce an intermediate reduction result, the arbitrary irreducible polynomial corresponding to the generic curve having been explicitly specified for the at least one operation on the generic curve; and
  provide one or more of: a result of the multiplication step and the intermediate reduction result as an input to an elliptic curve cryptography application.

2. The elliptic curve processing apparatus as recited in claim 1, wherein the functional unit comprising the digit serial multiplier further comprises hardwired reduction circuits included in the functional unit for use with respective named curves.

3. The elliptic curve processing apparatus as recited in claim 2 further comprising at least one storage location specifying whether an operation is for one of the named curves or for the generic curve.

4. The elliptic curve processing apparatus as recited in claim 1 further comprising at least one storage location storing the specified irreducible polynomial associated with the generic curves.

5. The elliptic curve processing apparatus as recited in claim 3 wherein a configuration register comprises the at least one storage location.

6. The elliptic curve processing apparatus as recited in claim 5 wherein the configuration register includes a field identifying a named curve and a field specifying a field degree of a binary polynomial field over which the elliptic curves are defined.

7. The elliptic curve processing apparatus as recited in claim 6 wherein a predetermined value in the named curve field specifies a generic curve.

8. The elliptic curve processing apparatus as recited in claim 1 wherein the operation is at least one of a point multiplication, a point addition, and a point doubling.

9. The elliptic curve processing apparatus as recited in claim 2 further comprising an instruction decoder that translates a square instruction into a multiply instruction when a generic curve is being utilized, the square instruction being decoded to utilize hardwired logic for square operations on named curves.

10. The elliptic curve processing apparatus as recited in claim 2 further comprising a squarer circuit operable to perform a squaring operation and including respective hardwired reduction circuits for named curves.

11. The elliptic curve processing apparatus as recited in claim 2, wherein the hardwired reduction circuits are selected for use with a corresponding named curve according to a value of a storage location identifying the corresponding named curve.

12. An elliptic curve processing apparatus, comprising hardwired reduction logic and a generic reduction circuit;
 wherein the apparatus is responsive to a first arithmetic instruction to utilize the hardwired reduction logic for reduction of a named curve and responsive to a second arithmetic instruction to utilize the generic reduction circuit for reduction of a generic curve;
 wherein the named curve implicitly specifies an irreducible polynomial to be used in the reduction;
 wherein the generic reduction circuit is configured to perform reduction for the generic curve using an arbitrary irreducible polynomial corresponding to the generic curve having been explicitly specified for the second arithmetic instruction; and
 wherein the apparatus is configured to provide a reduction result as an input to an elliptic curve cryptography application.

13. An elliptic curve processing apparatus comprising a plurality of hardwired reduction circuits and a multiplier circuit;
 wherein the elliptic curve processing apparatus is responsive to an arithmetic instruction to utilize a respective one of the hardwired reduction circuits for reduction for a respective named curve and the multiplier circuit for reduction for a plurality of generic curves; and
 wherein the respective named curve implicitly specifies an irreducible polynomial to be used in the reduction;
 wherein the multiplier is configured to perform reduction for respective generic curves using arbitrary irreducible polynomials, the arbitrary irreducible polynomials being explicitly specified for reduction of respective ones of the generic curves; and
 wherein the elliptic curve processing apparatus is configured to provide a reduction result as an input to an elliptic curve cryptography application.

14. The elliptic curve processing apparatus as recited in claim 13 wherein the arithmetic instruction specifies a first and second source operand and a single destination operand.

15. The elliptic curve processing apparatus as recited in claim 13 wherein the arithmetic instruction specifies a single source operand and a single destination operand.

16. The elliptic curve processing apparatus as recited in claim 13 wherein the arithmetic instruction specifies a first and second source operand and a first and second destination operand.

17. The elliptic curve processing apparatus as recited in claim 13 wherein the arithmetic instruction specifies a multiplication and the multiplication utilizes one of the hardwired reduction circuits for reduction for a named curve and the multiplier for reduction for a generic curve, according to a stored value, the stored value indicating whether the curve being processed is the generic curve or the named curve.

18. The elliptic curve processing apparatus as recited in claim 13 further wherein the elliptic curve processing apparatus is further responsive to a conditional branch instruction causing a branch according to the stored value.

19. The elliptic curve processing apparatus as recited in claim 17, wherein the apparatus is responsive to a second arithmetic instruction to utilize generic reduction logic regardless of the stored value.

20. The elliptic curve processing apparatus as recited in claim 17, wherein the apparatus is responsive to a second arithmetic instruction to not perform reduction.

21. The elliptic curve processing apparatus as recited in claim 17 wherein the hardwired reduction logic, which represents an irreducible polynomial corresponding to a particular named curve, is selected according to the stored value that identifies the particular named curve.

22. The elliptic curve processing apparatus as recited in claim 21 wherein the hardwired reduction logic is an XOR network.

23. The elliptic curve processing apparatus as recited in claim 13 wherein for a particular generic curve, the multiplier circuit utilizes an irreducible polynomial stored in a storage location, the irreducible polynomial corresponding to the particular generic curve.

24. The elliptic curve processing apparatus as recited in claim 13 wherein the elliptic curve processing apparatus utilizes one of the plurality of hardwired reduction circuits for reduction for named curves and the generic multiplier for reduction for generic curves according to a value of a parameter indicating whether a generic curve or a named curve is being processed.

25. The elliptic curve processing apparatus as recited in claim 13 further comprising a register indicating either that a generic curve is being utilized or identifying a named curve when a named curve is being utilized, the elliptic curve processing apparatus being responsive to the arithmetic instruction according to contents of the register.

26. The elliptic curve processing apparatus as recited in claim 13 wherein the arithmetic instruction is a square instruction.

27. The elliptic curve processing apparatus as recited in claim 13 wherein the arithmetic instruction is a multiply instruction.

28. A method for performing at least one arithmetic operation on elliptic curves specified over binary polynomial fields, comprising:
performing the arithmetic operation on respective named curves using respective hardwired reduction logic for reduction operations, wherein the named curves implicitly specify respective irreducible polynomials to be used in the reduction;
performing the arithmetic operation on generic curves using a multiplier circuit for reduction using explicitly specified arbitrary irreducible polynomials; and
providing a reduction result as an input to an elliptic curve cryptography application.

29. The method as recited in claim 28 farther comprising determining whether the arithmetic operation is for one of the named curves or for one of the generic curves according to a value of at least one storage location.

30. The method as recited in claim 29 wherein the at least one storage location is part of a configuration register.

31. The method as recited in claim 30 wherein the configuration register includes a first field identifying a named curve if used and a second field specifying a field degree of the binary polynomial field.

32. The method as recited in claim 31 wherein a predetermined value in the first field specifies a generic curve.

33. The method as recited in claim 28 wherein the arithmetic operation is one of a point doubling, a point addition, and a point multiplication.

34. The method as recited in claim 28 wherein the arithmetic unit is a multiplier.

35. The method as recited in claim 28 farther comprising decoding a square instruction into one or more multiply instructions when a generic curve is being utilized.

36. A computer-implemented method, comprising:
determining a value of a storage location indicating whether a curve being processed in an elliptic curve processing apparatus is a generic or a named curve;
performing a conditional branch instruction in an elliptic curve cryptography application according to the value of the storage location; and
providing either a result of a multiplication operation or a result of a reduction operation as an input to the elliptic curve cryptography application dependent on an outcome of the conditional branch instruction.

37. The method as recited in claim 36 wherein performing the conditional branch instruction further comprises branching when the storage location specifies a generic curve and not branching when the storage location specifies a named curve.

38. The method as recited in claim 36 wherein performing the conditional branch instruction further comprises not branching when the storage location specifies a generic curve and branching when the storage location specifies a named curve.

39. An apparatus for performing at least one operation on elliptic curves specified over binary polynomial fields, comprising:
means for performing an arithmetic operation using hardwired reduction logic for a named curve, wherein the named curve implicitly specifies an irreducible polynomial to be used in the reduction; and
means for performing the arithmetic operation using generic reduction logic for generic curve using an explicitly specified arbitrary irreducible polynomial; and
means for providing a reduction result as an input to an elliptic curve cryptography application.

40. An apparatus for performing operations on elliptic curves specified over binary polynomial fields, comprising:
means for storing a value indicating a polynomial to be used for reduction in an elliptic curve cryptography application;
means responsive to a divide instruction to perform a divide operation on elliptic curves using the polynomial indicated by the stored value; and
means for providing a result of the divide operation as an input to the elliptic curve cryptography application.

41. A computer-readable storage medium, comprising program instructions computer-executable to implement:
an arithmetic instruction causing an elliptic curve processing apparatus to utilize, according to whether a curve being processed is a generic curve or a named curve, hardwired reduction logic for the arithmetic operation for named curves and to utilize a multiplier operable to perform reduction for respective generic curves using arbitrary irreducible polynomials, the arbitrary irreducible polynomials corresponding to respective ones of the generic curves having been explicitly specified for the arithmetic instruction; and
providing a reduction result as an input to an elliptic cryptography application;
wherein named curves implicitly specify respective irreducible polynomials to be used in the reduction.

42. A computer-readable storage medium, comprising program instructions executable by an elliptic curve processor to implement:
a first arithmetic instruction causing an elliptic curve processor to utilize respective hardwired reduction logic for respective named curves, wherein named curves implicitly specify respective irreducible polynomial to be used in the reduction; and
a second arithmetic instruction causing the elliptic curve processor to utilize a multiplier for reduction for a plurality of generic curves, the multiplier operable to perform reduction for respective generic curves using arbitrary irreducible polynomials corresponding to respective ones of the generic curves having been explicitly specified for the second arithmetic instruction; and providing a reduction result as an input to an elliptic cryptography application.

43. The storage medium as recited in claim 41 wherein the arithmetic instruction specifies a first and second source operand and a destination.

44. The storage medium as recited in claim 41 further comprising a conditional branch instruction causing a branch according to whether the curve being processed is a generic curve or a named curve.

45. The storage medium as recited in claim 41 further comprising a second arithmetic instruction, the second arithmetic instruction causing the elliptic curve processor to utilize the multiplier for reduction regardless of the value of a parameter indicating whether the curve being processed is a generic curve or a named curve.

46. The storage medium as recited in claim 41 wherein the arithmetic instruction is a square instruction.

47. The storage medium as recited in claim 41 wherein the arithmetic instruction is a multiply instruction.

48. A computer-readable storage medium, comprising program instructions executable by an elliptic curve processing apparatus to implement:

determining if an elliptic curve being processed is a generic curve or a named curve;

a conditional branch instruction in an elliptic curve cryptography application causing a branch according to whether the elliptic curve being processed is a generic curve or a named curve; and providing either a result of a multiplication operation or a result of a reduction operation as an input to the elliptic curve cryptography application dependent on an outcome of the conditional branch instruction 49. The storage medium as recited in claim method 48 wherein the elliptic curve is specified over a binary polynomial field.

50. The storage medium as recited in claim method 48 wherein the elliptic curve is specified over a prime integer field.

51. The storage medium as recited in claim method 48 wherein the conditional branch instruction branches according to a value of a storage location indicating whether a curve being processed is the generic curve or the named curve.

52. The storage medium as recited in claim 51 wherein performing the conditional branch instruction further comprises branching when the storage location specifies the generic curve and not branching when the storage location identified the named curve.

53. The storage medium as recited in claim 51 wherein performing the conditional branch instruction further comprises not branching when the storage location specifies the generic curve and branching when the storage location identified the named curve.

* * * * *